United States Patent
Sengoku

(10) Patent No.: US 9,904,637 B2
(45) Date of Patent: Feb. 27, 2018

(54) IN-BAND INTERRUPT TIME STAMP

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 14/949,534

(22) Filed: Nov. 23, 2015

(65) Prior Publication Data

US 2016/0147684 A1 May 26, 2016

Related U.S. Application Data

(60) Provisional application No. 62/085,220, filed on Nov. 26, 2014.

(51) Int. Cl.

| | |
|---|---|
| *G06F 13/24* | (2006.01) |
| *G06F 13/42* | (2006.01) |
| *G06F 1/14* | (2006.01) |
| G06F 13/366 | (2006.01) |
| G06F 13/362 | (2006.01) |
| G06F 13/40 | (2006.01) |

(52) U.S. Cl.
CPC ............ *G06F 13/24* (2013.01); *G06F 1/14* (2013.01); *G06F 13/4282* (2013.01); *G06F 13/366* (2013.01); *G06F 13/3625* (2013.01); *G06F 13/4004* (2013.01)

(58) Field of Classification Search
CPC ........ G06F 13/24; G06F 13/4282; G06F 1/14; G06F 9/327; G06F 11/1679; G06F 1/1687
See application file for complete search history.

(56) References Cited

U.S. PATENT DOCUMENTS

| | | | |
|---|---|---|---|
| 7,089,338 B1 | 8/2006 | Wooten et al. | |
| 2005/0091554 A1* | 4/2005 | Loukianov | G06F 1/14 713/500 |
| 2014/0089546 A1 | 3/2014 | Machnicki et al. | |
| 2015/0134996 A1* | 5/2015 | Pitigoi-Aron | G06F 1/329 713/400 |

(Continued)

FOREIGN PATENT DOCUMENTS

JP H09114541 A 5/1997

OTHER PUBLICATIONS

International Search Report and Written Opinion—PCT/US2015/062496—ISA/EPO—dated Feb. 16, 2016.

*Primary Examiner* — Thomas J Cleary
(74) *Attorney, Agent, or Firm* — Loza & Loza LLP

(57) ABSTRACT

System, methods and apparatus are described that facilitate transmission of data, particularly between two devices within an electronic apparatus. A method performed by a slave device coupled to a serial bus includes detecting an event related to a function of the slave device, initiating a first counter in the slave device, asserting an in-band interrupt request by driving at least one signal on the serial bus, and transmitting content of the first counter to a bus master coupled to the serial bus during an interrupt handling procedure. The first counter may count cycles of a clock used by the slave device or occurrences of a signaling state or condition on the serial bus. The content of the first counter may be used to determine a time stamp for the event.

30 Claims, 48 Drawing Sheets

(56) References Cited

U.S. PATENT DOCUMENTS

2015/0317230 A1* 11/2015 Le Grand .......... G06F 11/3476
                                                702/187
2016/0124875 A1*  5/2016 Griffis ................. G06F 13/24
                                                710/269
2017/0161096 A1*  6/2017 Loh .................... G06F 13/24

* cited by examiner

IN-BAND INTERRUPT TIME STAMP

CROSS-REFERENCE TO RELATED APPLICATIONS

This application claims the benefit of U.S. Provisional Application Ser. No. 62/085,220 filed in the U.S. Patent Office on Nov. 26, 2014, the entire content of which being incorporated herein by reference and for all applicable purposes.

TECHNICAL FIELD

The present disclosure pertains to interrupt handling for serial bus interfaces, and more particularly to in-band interrupts in time-sensitive applications.

BACKGROUND

The Inter-Integrated Circuit serial bus, which may also be referred to as the I2C bus or the I²C bus, is a serial single-ended computer bus that was intended for use in connecting peripherals to a processor. The I2C bus is a multi-master bus in which each device can serve as a master and a slave for different messages transmitted on the I2C bus. The I2C bus can transmit data using only two bidirectional open-drain connectors, including a Serial Data Line (SDA) and a Serial Clock Line (SCL). The connectors typically include signal wires that are terminated by pull-up resistors.

Protocols governing I2C bus operations define basic types of messages, each of which begins with a START and ends with a STOP. The I2C bus uses 7-bit addressing and defines two types of nodes. A master node is a node that generates the clock and initiates communication with slave nodes. A slave node is a node that receives the clock and responds when addressed by the master. The I2C bus is a multi-master bus, which means any number of master nodes can be present. Additionally, master and slave roles may be changed between messages (i.e., after a STOP is sent).

In the context of a camera implementation, unidirectional transmissions may be used to capture an image from a sensor and transmit image data to memory in a baseband processor, while control data may be exchanged between the baseband processor and the sensor as well as other peripheral devices. In one example, a Camera Control Interface (CCI) protocol may be used for such control data between the baseband processor and the image sensor (and/or one or more slave nodes). In one example, the CCI protocol may be implemented over an I2C serial bus between the image sensor and the baseband processor.

Interrupts may be used by slave devices to request attention from a bus master. Interrupt capabilities on conventional serial bus interfaces generally have limited capabilities particularly when slave devices of varying capabilities are supported. Improved serial bus interrupt capabilities are needed as the sophistication of systems increases.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to certain aspects disclosed herein, in-band interrupt time stamps may be employed to reliably identify the time of occurrence of a slave-detected event. The time stamp associated with the slave-detected event can be provided to a bus master device during interrupt servicing. The bus master device may combine time stamp information with other timing available to the bus master to calculate a time of occurrence of the slave-detected event.

In certain aspects of the invention, a method performed by a slave device coupled to a serial bus includes detecting an event related to a function of the slave device, initiating a first counter in the slave device, asserting an in-band interrupt request by driving at least one signal on the serial bus, and transmitting content of the first counter to a bus master coupled to the serial bus during an interrupt handling procedure. The first counter may count cycles of a clock used by the slave device or occurrences of a signaling state on the serial bus. The content of the first counter may be used to determine a time stamp for the event.

In one aspect, the slave device may stop the first counter when the in-band interrupt request is asserted.

In one aspect, asserting the in-band interrupt request includes winning an interrupt arbitration process. At least one other in-band interrupt request may be asserted concurrently with the in-band interrupt request.

In one aspect, the first counter counts cycles of an internal free-running clock of the slave device. The slave device may be configured to continually or continuously use the first counter to determine the duration of one or more signaling states or conditions on the serial bus by counting the number of cycles of the internal free-running clock. The slave device may provide measured durations of one or more signaling states or conditions to a bus master. In some instances, the slave device may determine and/or provide measurements of the duration of the one or more signaling states in response to a command from the bus master. The command may be a calibration command or one of a plurality of commands that implement a calibration process. In one example, the command may cause the slave device to start the first counter upon detecting a first signaling state on the serial bus, stop the first counter upon detecting a second, subsequent signaling state on the serial bus. The slave device may report the content of the first counter to the bus master after stopping the first counter. The content of the first counter may be used to calibrate the internal free-running clock. Values corresponding to the content of the first counter provided in response to a plurality of commands may be averaged to obtain an estimate of period of the internal free-running clock. The first counter may count a number of cycles of the internal free-running clock of the slave device between the event and the assertion an in-band interrupt request. The first counter counts a number of cycles of the internal free-running clock of the slave device between the event and a heartbeat pulse transmitted on the serial bus.

The first counter may count cycles of an internal free-running clock between symbols transmitted on the serial bus. The first counter may count cycles of the internal free-running clock between start conditions transmitted on the serial bus. The first counter may count cycles of the internal free-running clock between transitions on a serial clock line (SCL) of the serial bus.

In one aspect, the first counter counts cycles on an SCL of the serial bus, where the cycles may commence and terminate on a rising edge of the SCL, commence and terminate on a falling edge of the SCL, or commence and terminate on either a rising edge or falling edge of the SCL.

In one aspect, the method includes initiating a second counter in the slave device. The first counter may count cycles of a receive clock generated by the slave device from transitions between symbols transmitted on the serial bus, and the second counter may count a signaling state on the serial bus. For example, the second counter may count start conditions transmitted on the serial bus, and/or the second counter may count symbols transmitted on the serial bus.

In certain aspects of the invention, a method performed by a master device coupled to a serial bus includes receiving an in-band interrupt request from a slave device, wherein the in-band interrupt request corresponds to an event detected by the slave device, receiving a first counter value from the slave device while servicing the in-band interrupt request, and calculating a time stamp representative of a time of occurrence of the event using the first counter value. The first counter value may relate to a number of cycles of a clock counted after detection of the event. For example, the first counter value may count cycles of a receive clock used to sample the symbols. The first counter value may relate to a number of occurrences of a signaling state on the serial bus after the detection of the event.

In one aspect, calculating the time stamp includes determining a time of assertion of the in-band interrupt request, and calculating the time stamp using the time of assertion of the in-band interrupt and an offset based on the first counter value. The first counter value may represent a number of cycles of an internal free-running clock of the slave device. The first counter value may represent a number of symbols transmitted on the serial bus after the detection of the event. The first counter value may represent a number of cycles of an SCL of the serial bus observed after detection of the event. The first counter value may represent a number of start conditions observed on the serial bus after detection of the event. The first counter value may represent a number of cycles of a receive clock generated by the slave device from transitions between symbols transmitted on the serial bus. A cycle time of a serial bus clock transmitted on the SCL may be adjusted by the bus master to obtain a consistent period of the serial bus clock.

In one aspect, the method includes receiving a second counter value from the slave device while servicing the in-band interrupt request, determining a time of assertion of the in-band interrupt request, and calculating the time stamp using the time of assertion of the in-band interrupt and an offset based on the first counter value and the second counter value. The first counter value represents a number of cycles of a receive clock generated by the slave device from transitions between symbols transmitted on the serial bus.

In one aspect, the method includes stretching transmission of one or more symbols transmitted on the serial bus, recording for each symbol of the one or more symbols a number of transmit clock cycles used to stretch transmission of the each symbol, and calculating the time stamp using the time of assertion of the in-band interrupt and an offset based on the first counter value and a number of transmit clock cycles used to stretch transmission of the one or more symbols. Calculating the time stamp includes averaging the number of transmit clock cycles used to stretch transmission of the one or more symbols to obtain an average symbol transmission time. Calculating the time stamp may include calculating a total number of additional transmit clock cycles used after detection of the event and before receipt of the in-band interrupt request.

In one aspect, start times for a plurality of symbols transmitted on the serial bus may be recorded. The start times may be determined using a real-time clock circuit. The time stamp may be calculated using a start time identified by the first counter value. A second counter value may be from the slave device while servicing the in-band interrupt request. The second counter value may be used as an offset when calculating the time stamp. In one example, the offset may correspond to a time between the occurrence of the event and the assertion of the in-band interrupt request.

In certain aspects of the invention, a slave device coupled to a serial bus includes means for detecting an event related to a function of the slave device, means for initiating a first counter in the slave device, means for asserting an in-band interrupt request by driving at least one signal on the serial bus, and means for transmitting content of the first counter to a bus master coupled to the serial bus during an interrupt handling procedure. The first counter may count cycles of a clock used by the slave device or occurrences of a signaling state on the serial bus. The content of the first counter may be used to determine a time stamp for the event.

In certain aspects of the invention, a computer readable storage medium has instructions stored thereon. The storage medium may include transitory or non-transitory storage media. The instructions may be executed by a processor such that the processer is caused to detect an event related to a function of the slave device, initiate a first counter in the slave device, assert an in-band interrupt request by driving at least one signal on the serial bus, and transmit content of the first counter to a bus master coupled to the serial bus during an interrupt handling procedure. The first counter may count cycles of a clock used by the slave device or occurrences of a signaling state on the serial bus. The content of the first counter may be used to determine a time stamp for the event.

In certain aspects of the invention, a master device coupled to a serial bus includes means for receiving an in-band interrupt request from a slave device, means for receiving a first counter value from the slave device while servicing the in-band interrupt request, and means for calculating a time stamp representative of a time of occurrence of the event using the first counter value. The in-band interrupt request may correspond to an event detected by the slave device. The first counter value may relate to a number of cycles of a clock counted after detection of the event, or to a number of occurrences of a signaling state on the serial bus after the detection of the event.

In certain aspects of the invention, a computer readable storage medium has instructions stored thereon. The storage medium may include transitory or non-transitory storage media. The instructions may be executed by a processor of a processing circuit such that the processing circuit is caused to receive an in-band interrupt request from a slave device, receive a first counter value from the slave device while servicing the in-band interrupt request, and calculate a time stamp representative of a time of occurrence of the event using the first counter value. The first counter may count cycles of a clock used by the slave device or occurrences of a signaling state on the serial bus. The content of the first counter may be used to determine a time stamp for the event.

DRAWINGS

Various features, nature, and advantages may become apparent from the detailed description set forth below when taken in conjunction with the drawings in which like reference characters identify correspondingly throughout.

DETAILED DESCRIPTION

Figure 1:
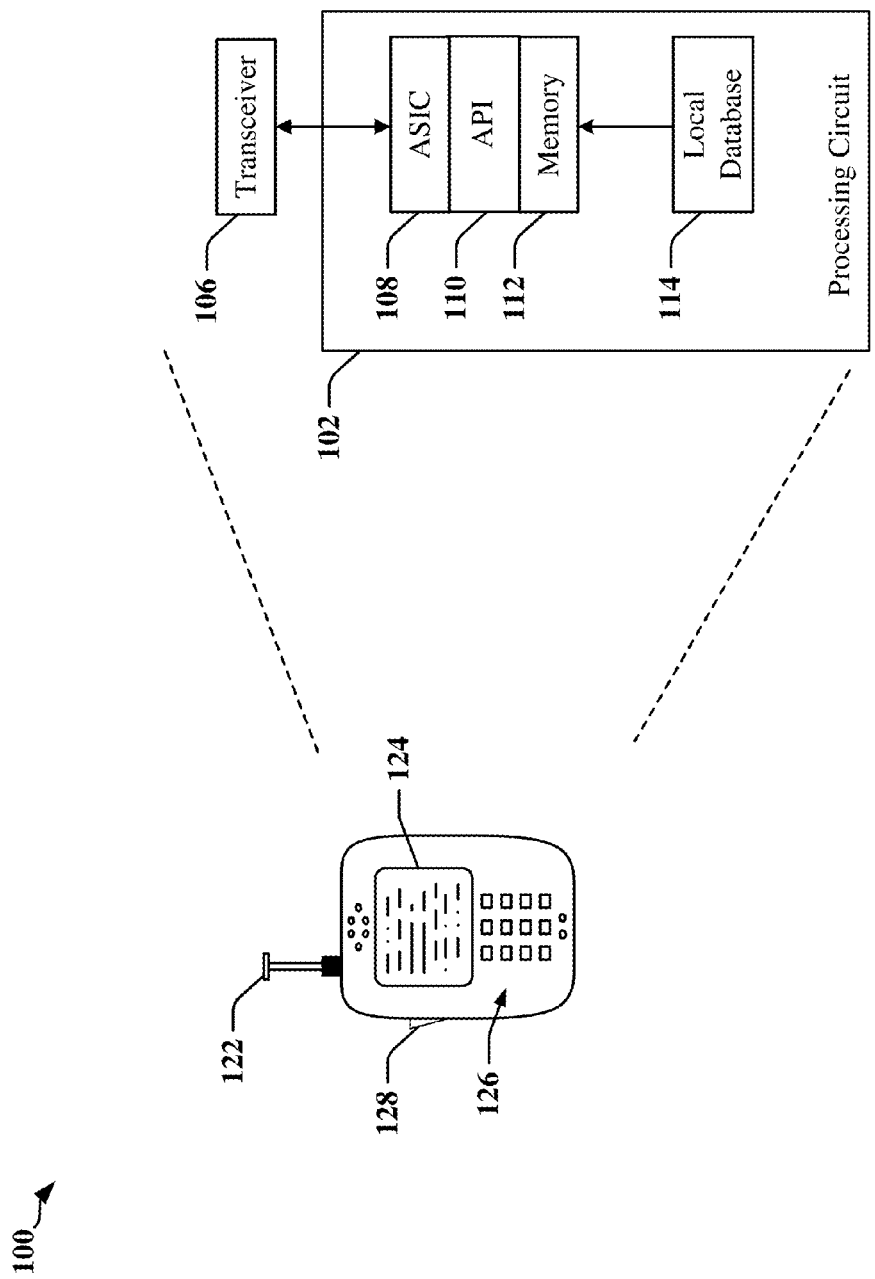
FIG. 1 depicts an apparatus employing a data link between integrated circuit devices that selectively operates according to one of plurality of available standards.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.

Various features, nature, and advantages may become apparent from the detailed description set forth below when taken in conjunction with the drawings in which like reference characters identify correspondingly throughout.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview

According to certain aspects disclosed herein, in-band interrupt time stamps may be employed to reliably identify the time of occurrence of a slave-detected event. The time stamp associated with the slave-detected event can be provided to a bus master device during interrupt servicing. The bus master device may combine time stamp information with other timing available to the bus master to calculate a time of occurrence of the slave-detected event. The time stamp may be generated relative to a bus timing event known to the slave device and the bus master. The bus master may calculate the time of occurrence of the slave-detected event using the time stamp to offset or otherwise adjust a system time or real-time value associated with the bus timing event.

Certain aspects disclosed herein may be employed in a wide variety of communication interfaces, including where a variable time lag exists between occurrence of event and acknowledgement or servicing of an interrupt generated in response to the event, and/or where accurate determination of the time of occurrence of an event is required or desired. For example, multiple sensor devices coupled to a common serial interface may use interrupts to indicate occurrence of time-sensitive or time-critical events. Multiple devices may assert interrupts concurrently, and a processing device that services the interrupts may be unable to determine times of occurrence for each event, or sequence of occurrence of the events. In some instances, time-sensitive interrupts may be generated by devices coupled to a multi-wire serial bus.

Certain embodiments disclosed herein provide systems, methods and apparatus that can improve the performance of a communications interface of a camera control interface (CCI) bus, which is based on the I2C bus, and its protocols and configurations, and on other serial bus technologies that relate to, are compatible with, or extend the I2C bus. The CCI provides a two-wire, bi-directional, half duplex, serial interface configured as a bus connecting a master and one or more slaves. CCI operations may be compatible with I2C bus operations.

Certain aspects disclosed herein are applicable to various and/or different serial bus technologies. In one example, an I2C serial bus may support I3C protocols, which permit higher data rates than can be accomplished using I2C protocols, while permitting certain I2C devices and certain I3C devices to coexist on the same bus. In another example, a serial bus may be operated such that symbols are transmitted over the SDA and SCL, with a receive clock being derived from transitions observed in the SCL and/or the SDA. For the purposes of describing certain aspects, the example of a CCI extension (CCIe) bus may be employed to illustrate certain features that apply to a symbol-based interface and/or to transition-encoding protocols. In some instances, certain techniques described herein may be used in conjunction with a serial bus that supports transmissions according to different protocols in different time intervals, where the different protocols may include protocols such as I2C, CCI, and I3C, as well as other protocols that provide for transmission of a clock signal on the SCL. The different protocols may include symbol-based and/or transition encoding protocols such as CCIe, which is used herein as an example that illustrates certain aspects that are applicable to a multi-wire serial bus that includes two or more wires/connectors. The use of symbol-based and/or transition-encoding protocols can extend the capabilities of a conventional I2C or CCI bus. For example, CCIe protocols may support a higher bit rate than I2C or CCI protocols over a 2-wire serial bus. According to certain aspects disclosed herein, some versions of the CCIe protocols may be configured or adapted to support bit rates of 16.7 megabits per second (Mbps) or more, and some versions of the serial bus 330 may be configured or adapted to support data rates of at least 23 Mbps. CCIe protocols and/or other symbol-based protocols may enable devices to communicate over an I2C bus in one or more modes that support a two-wire, bi-directional, half-duplex, serial interface that can operate at data rates that are significantly greater than the data rates obtained using I2C or CCI modes of operation.

Slave devices coupled to a serial bus such as the I2C bus, the CCI bus, or the CCIe bus may be adapted to respond to a plurality of identifiers. In one example, two or more slave devices may be responsive to a common, group identifier such that a master device can address commands and data to the two or more slave devices simultaneously in order to produce synchronized control of certain operational aspects of the slave devices. The slave devices may be equipped with individualized, or unique identifiers that permit one-to-one communication between a slave device and a bus master.

Examples of Systems and Apparatus

Certain aspects disclosed herein may be applicable to communications links deployed between electronic devices that can include subcomponents of an apparatus such as a telephone, a mobile computing device, an appliance, automobile electronics, avionics systems, wearable computing devices, appliances, etc. FIG. 1 depicts an apparatus that may employ a communication link between IC devices. In one example, the apparatus 100 may include a wireless communication device that communicates through a radio frequency (RF) transceiver with a radio access network (RAN), a core access network, the Internet and/or another network. The apparatus 100 may include a communications transceiver 106 operably coupled to processing circuit 102. The processing circuit 102 may include one or more IC devices, such as an application-specific integrated circuit (ASIC) 108. The ASIC 108 may include one or more processing devices, logic circuits, and so on. The processing circuit 102 may include and/or be coupled to processor readable storage such as a memory device 112 that may maintain instructions and data that may be executed by the processing circuit 102. The processing circuit 102 may be controlled by one or more of an operating system or an application programming interface (API) 110 layer that supports and enables execution of software modules residing in storage media, such as the memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate apparatus 100. The local database 114 may be implemented using one or more of a database module, flash memory, magnetic media, EEPROM, optical media, tape, soft or hard disk, or the like. The processing circuit 102 may also be operably coupled to external devices such as antenna 122, display 124, operator controls, such as a button 128 and a keypad 126 among other components.

Figure 2:
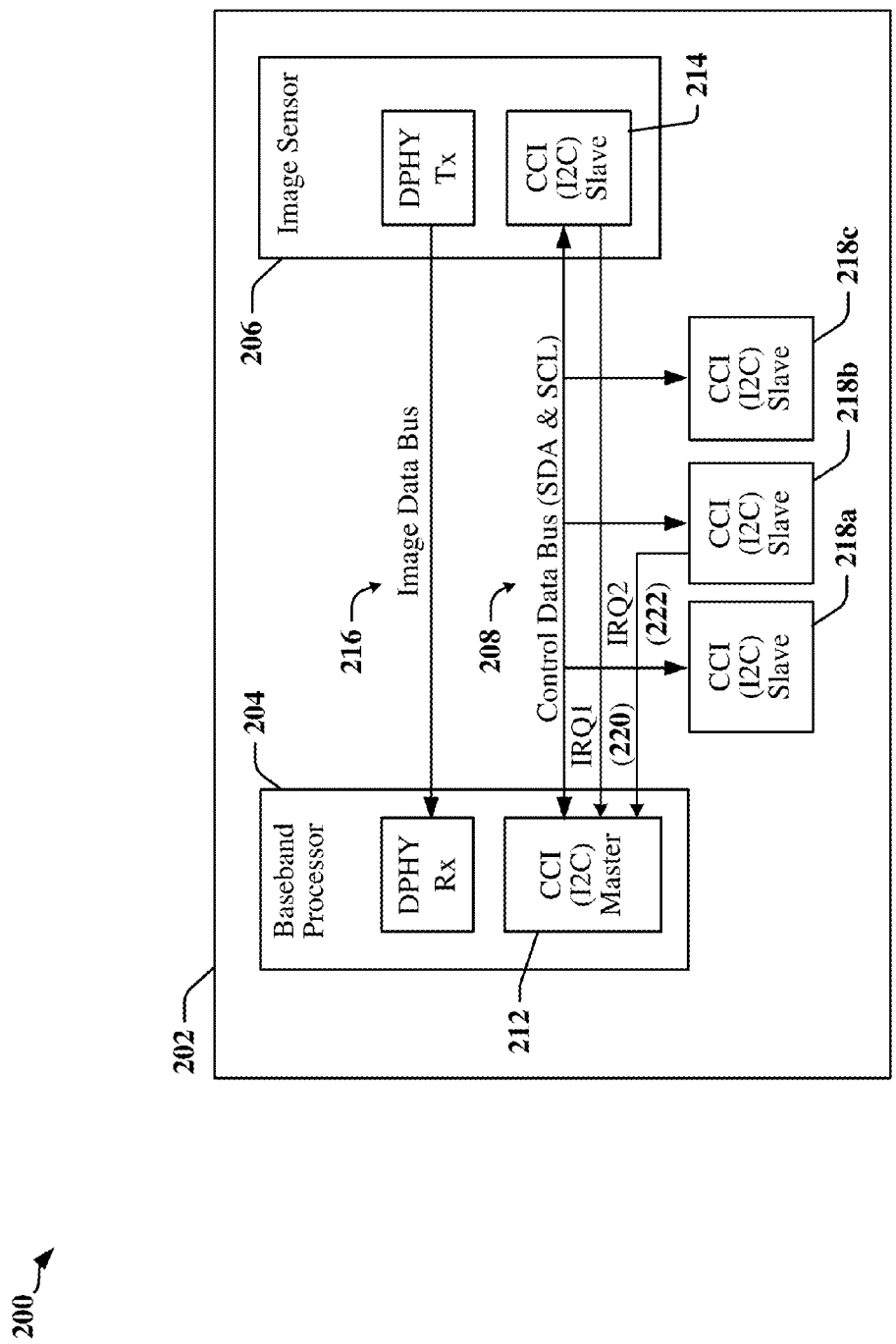
FIG. 2 is a block diagram illustrating a device having a baseband processor and an image sensor and implementing an image data bus and a control data bus.

FIG. 2 is a block diagram 200 illustrating a simplified example of a device 202 that has a baseband processor 204 and an image sensor 206. An image data bus 216 and a multi-mode control data bus 208 may be implemented in the device 202. The diagram 200 illustrates a camera device 202 by way of example only, and various other devices and/or different functionalities may implement, operate and/or communicate using the control data bus 208. In the depicted example, image data may be sent from the image sensor 206 to the baseband processor 204 over an image data bus 216, such as the "DPHY" high-speed differential link defined by the Mobile Industry Processor Interface (MIPI) Alliance. In one example, the control data bus 208 may have two wires that are configurable for operation in an I2C bus mode. Accordingly, the control data bus 208 may include an SCL and an SDA. The SCL may carry a clock signal that may be used to synchronize data transfers over the control data bus 208 according to I2C protocols. The data line SDA and clock line SCL may be coupled to multiple devices 212, 214, and 218 on the control data bus 208. In the example, control data may be exchanged between the baseband processor 204 and the image sensor 206 as well as other peripheral devices 218 via the control data bus 208. According to I2C protocols, clock speeds on the SCL wire may be up to 100 KHz for normal I2C operation, up to 400 KHz for I2C fast mode, and up to 1 MHz for I2C fast mode plus (Fm+). These operating modes over an I2C bus may be referred to as a CCI mode when used for camera applications.

Figure 3:
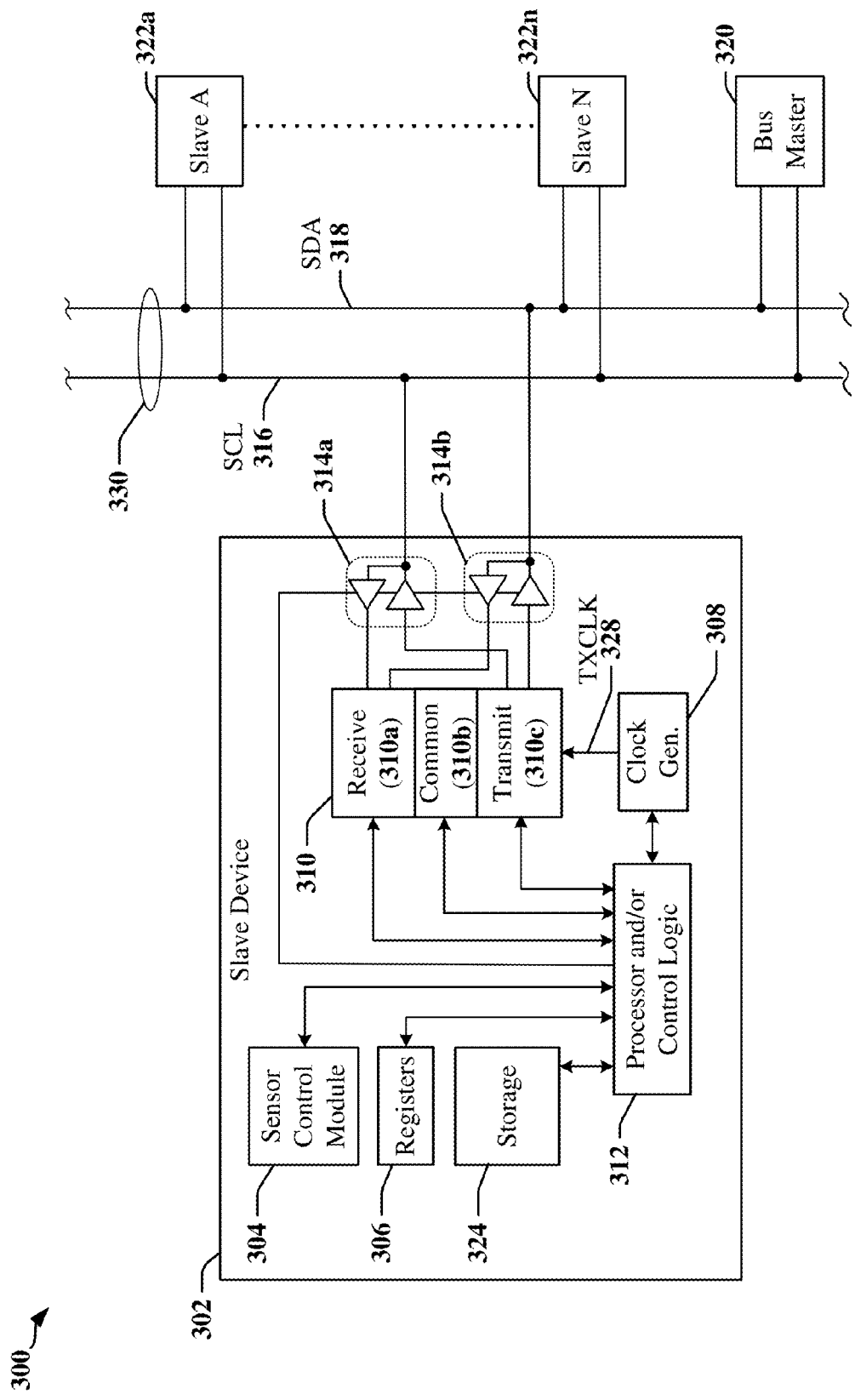
FIG. 3 is a diagram that illustrates a simplified system architecture for an apparatus employing a data link between integrated circuit (IC) devices according to certain aspects disclosed herein.

FIG. 3 is a block schematic diagram illustrating certain aspects of an apparatus 300 that includes a slave device 302 that has an image sensor and/or image sensor control module 304, where the slave device 302 is coupled to a serial bus 330. The apparatus 300 may be embodied in one or more of a wireless mobile device, a mobile telephone, a mobile computing system, a wireless telephone, a notebook computer, a tablet computing device, a media player, a gaming device, a wearable computing device, an appliance, or the like. The apparatus 300 may include multiple devices 302, 320, and/or 322a-322n that communicate using a serial bus 330.

According to certain aspects disclosed herein, two or more of the devices 302, 320 and/or 322a-322n may be configured or adapted to use the serial bus 330 in a I3C, CCIe, or other mode of operation that provides higher data transfer rates between devices 302, 320 and/or 322a-322n. In one example, the devices 302, 320 and/or 322a-322n may attain higher data rates when communicating with each other by encoding data as symbols transmitted on both the SCL 316 and the SDA 318 of a conventional CCI or I2C serial bus 330. Two or more devices 302, 320 and/or 322a-322n may communicate using different protocols and coexist on the same serial bus 330. For example, data may be transmitted using I3C encoding in a first time interval, and other data may be transmitted according to I2C signaling conventions in a different time interval. The use of different protocols can extend the capabilities of a conventional serial bus 330 for devices that are configured for enhanced features provided by advanced protocols.

In the example illustrated in FIG. 3, an imaging device is configured to operate as the slave device 302 on the serial bus 330. The imaging slave device 302 may be adapted to provide a sensor control module 304 that includes or manages an image sensor, for example. In addition, the imaging slave device 302 may include configuration registers 306 and/or other storage devices 324, a processing circuit and/or control logic 312, a transceiver 310 and line drivers/receivers 314a and 314b. The processing circuit and/or control logic 312 may include a processor such as a state machine, sequencer, signal processor or general-purpose processor. The transceiver 310 may include a receiver 310a, a transmitter 310c and certain common circuits 310b, including timing, logic and storage circuits and/or devices. In some instances, the transceiver 310 may include encoders and decoders, clock and data recovery circuits, and the like.

A transmit clock (TXCLK) signal 328 may be provided to the transmitter 310c, where the TXCLK signal 328 can be used to determine data transmission rates for various communication modes. In one example, the TXCLK signal 328 may be embedded within sequences of symbols transmitted on the serial bus 330, when both the SDA 318 and the SCL 316 are used to encode transmitted data according to a transition-encoded protocol (such as CCIe protocols). In this example, the TXCLK signal 328 may be embedded using transition clock transcoding, whereby data to be transmitted over the physical link (serial bus 330) is transcoded such that a change of state of at least one wire 316 and/or 318 occurs between each pair of consecutive symbols transmitted on the serial bus 330.

The serial bus 330 may include two wires 316, 318 of a control data bus connecting the devices 302, 320, and/or 322a-322n. In one example, the two-wire serial bus 330 may support CCIe bi-directional, half-duplex modes of communication that can provide significantly greater data rates than the data rates supported by I2C or CCI modes of operation. Certain of the devices 302, 320, and/or 322a-322n may be configured to transmit data on both the SCL 316 and the SDA 318 of the serial bus 330, with clock information embedded in a sequence of symbols transmitted on the two-wire serial bus 330. One or more devices 320 may be configured as a bus master, and other devices 302, and/or 322a-322n may be configured as slave devices. The devices 302, 320, and/or 322a-322n may be compatible with, or coexist with I2C, I3C, and/or CCI devices coupled to the serial bus 330, such that a device 302, 320, or 322a-322n may communicate with one or more other devices 302, 320, and/or 322a-322n using CCIe protocols and signaling specifications, even when I2C and/or I3C devices are monitoring the serial bus 330. One example disclosed herein provides an interface that can handle multiple slave devices 302, and/or 322a-322n coupled to the bus, with a single master device 320, when multiple protocols are used on the same bus.

Figure 4:
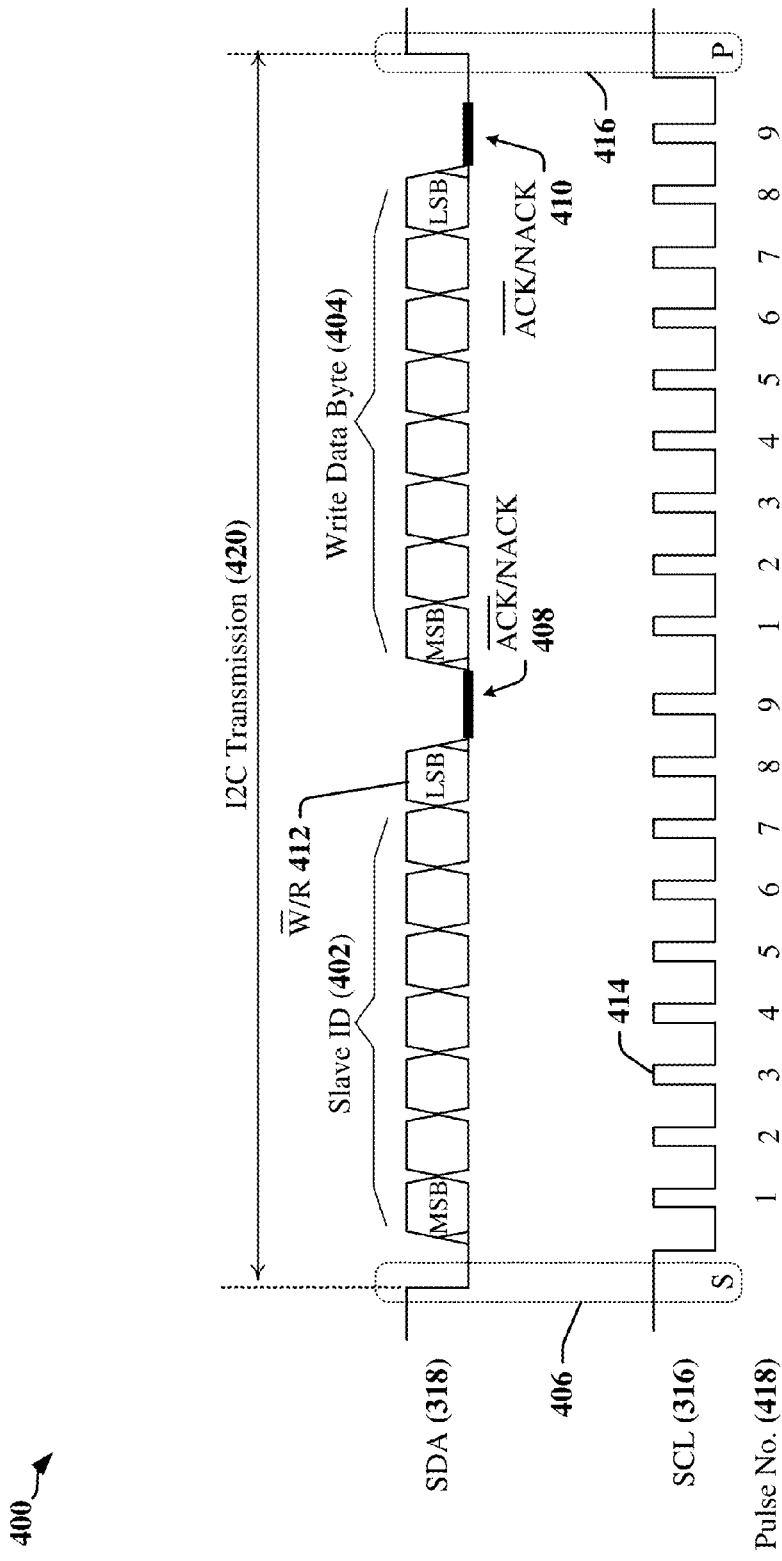
FIG. 4 is a timing diagram illustrating an I2C one-byte write data operation.

FIG. 4 is a timing diagram 400 illustrating an example of single-byte write data operation when a serial bus 330 is operated in accordance with I2C protocols. This example may relate to one or more of the devices 302, 320, 322a-322n coupled to the serial bus 330 of FIG. 3. Each I2C transmission 420 commences with a start condition 406 that is asserted on the serial bus 330, and terminates when a stop condition 416 is asserted on the serial bus 330. The start condition 406 is asserted when the SDA 318 transitions low while the SCL 316 is held in a high state. The stop condition 416 is asserted when the SDA 318 transitions high while the SCL 316 is held in a high state. According to I2C protocols, transitions on the SDA 318 occur when the SCL 316 is low, except for start condition 406 and stop conditions 416.

In typical I2C operations, an I2C master device 320 sends a 7-bit slave ID 402 on the SDA 318 to indicate which slave device 302, 322a-322n on the I2C serial bus 330 the master device 320 wishes to access, followed by a Read/Write bit 412 that indicates whether the operation is a read or a write operation. In one example, the Read/Write bit 412 is at logic 0 to indicate a write operation. In another example, the Read/Write bit 412 is at logic 1 to indicate a read operation. Only the slave device 302, 322a-322n whose ID matches with the 7-bit slave ID 402 is permitted respond to the write (or any other) operation. The 7-bit slave ID 402 permits 128 addresses for use on the I2C/CCI serial bus 330. In order for an I2C slave device 302, 322a-322n to detect a transmitted slave ID 402 that matches its own ID, the master device 320 may transmit at least 8-bits on the SDA 318, together with 8 clock pulses on the SCL 316. This behavior may be exploited to transmit data in other communication modes in order to prevent legacy I2C slave devices from reacting to higher speed operations.

Figure 5:
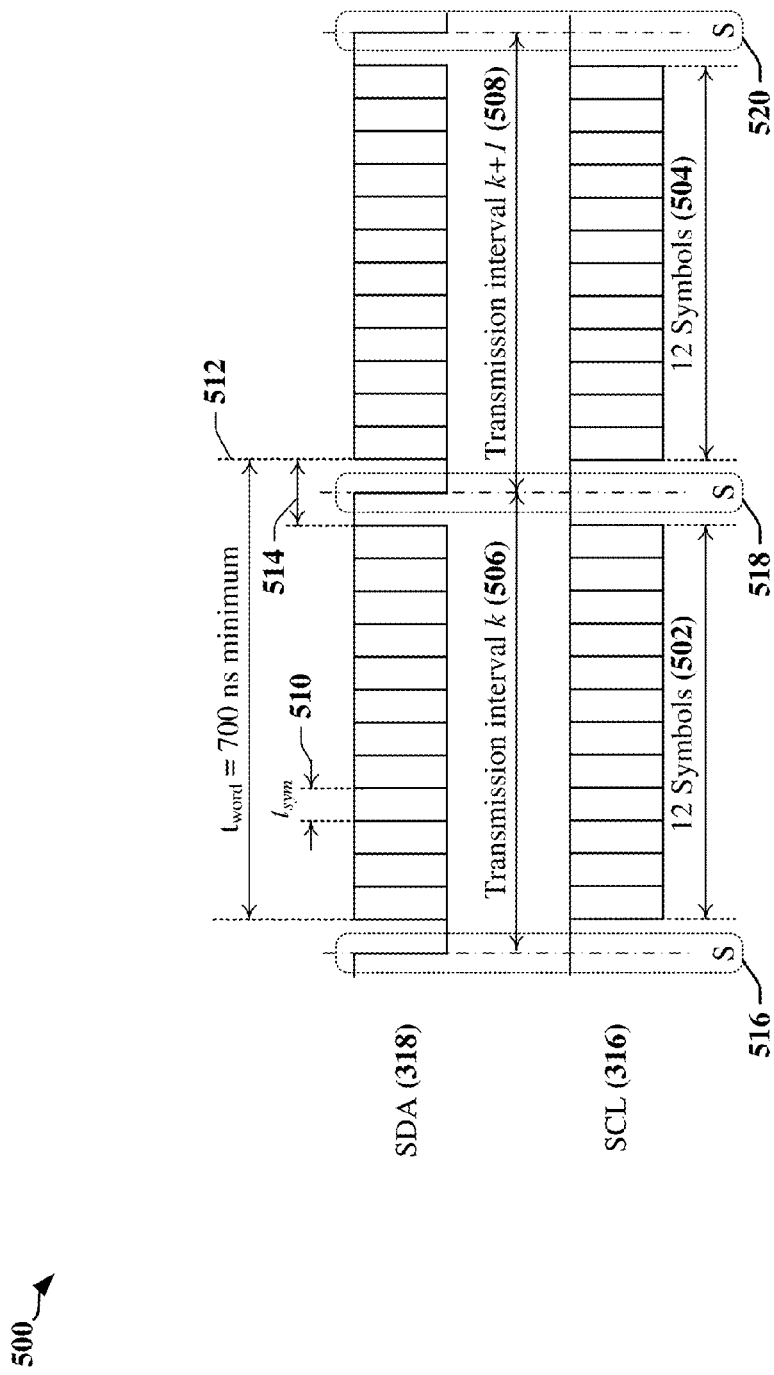
FIG. 5 is a timing diagram illustrating an example of data transmissions on a serial bus in accordance with CCIe protocols.

FIG. 5 is a timing diagram 500 that illustrates one example of data transmission on a serial bus 330 in a non-I2C mode of operation. In this example, the serial bus 330 is operated in accordance with CCIe protocols, and two or more communicating devices 302, 320, 322a-322n are configured or adapted to communicate in accordance with CCIe protocols. In a CCIe mode of operation, data is encoded into a set of two-bit symbols transmitted sequentially on the signal wires 316, 318 of the serial bus 330. Sequences of symbols 502, 504 may be transmitted in successive transmission intervals 506, 508. Each sequence of symbols 502, 504 is preceded by a start condition 516, 518, 520. The start conditions 516, 518, 520 are asserted when the SDA 318 transitions low while the SCL 316 is held in a high state. According to CCIe protocols, transitions on the SDA 318 may occur at the same time that transitions occur on the SCL 316 when a sequence of symbols 502, 504 is being transmitted. Start conditions 516, 518, 520 may occupy two symbol intervals.

In the illustrated example, each sequence of symbols 502, 504 includes 12 symbols and can encode 20-bit data elements. The data elements may include 16 bits of data and 3 or more bits of overhead. Each symbol in the sequence of 12 symbols 502, 504 defines the signaling state of the SDA 318 and the SCL 316 for each symbol period ($t_{sym}$) 510. In one example, push-pull drivers 314a, 314b used to drive the signal wires 316, 318 may support a symbol period 510 of 50 ns duration, using a 20 MHz symbol clock. The two-symbol sequence, which may be denoted as {3,1}, is transmitted in the period 514 between consecutive sequences of symbols 502 and 504 to provide a start condition 518. For the resulting 14-symbol transmission (12 symbols payload and a start condition 516, 518, or 520), the minimum elapsed time 512 between the start of a first transmission interval 506 and the start of a second transmission interval 508 may be calculated as:

$$T_{word}=14\times t_{sym}=700 \text{ ns}.$$

Thus, 20 bits may be transmitted every 700 ns, yielding a raw bit rate of approximately 27.17 Mbps with a useful bit rate of approximately 22.86 Mbps, since 16 data bits are transmitted in each sequence of 12 symbols 502, 504.

Interrupts in a Serial Bus

Figure 6:
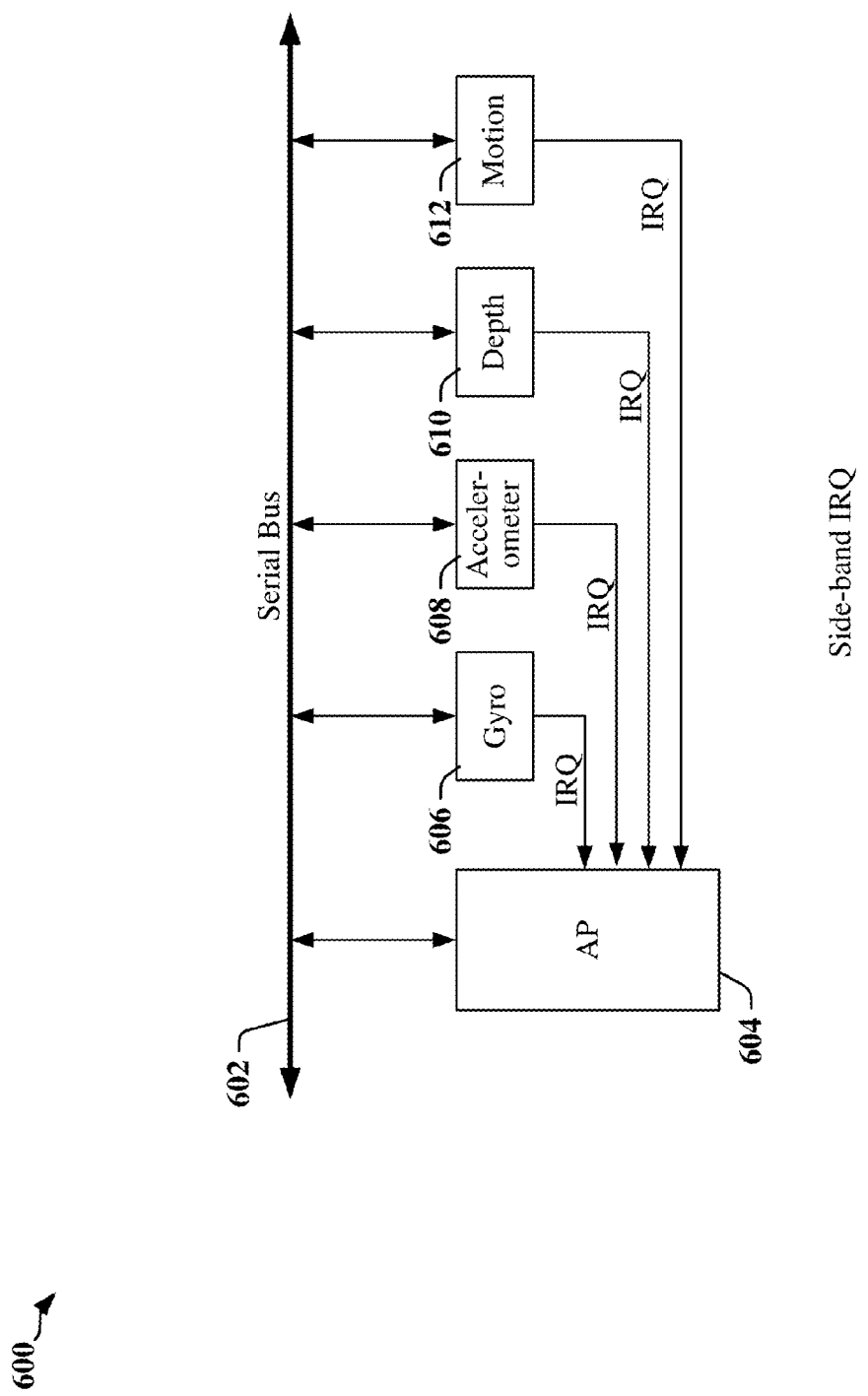
FIG. 6 illustrates an example of a system adapted to support side-band interrupts that are communicated independently of a serial bus.

In certain applications, it may be desirable to provide interrupt capabilities in systems that employ a serial bus that operates in one or more modes of communication, including I2C, I3C, CCIe and other modes of communication. Interrupts may be asserted by a slave device to signal a master device that the slave device has information to be transmitted over the serial bus. FIG. 6 illustrates an example of a system 600 adapted to support side-band interrupts that are communicated independently of the serial bus 602. The system 600 may provide or support one or more event-driven, time-sensitive, and/or deterministic functions. A deterministic function may be expected to react consistently to a particular input or event and to produce a consistent output in response to such input or event. For example, a sensor device 606, 608, 610, or 612 may be configured to generate an event in response to a change in a quantity measured by the sensor device 606, 608, 610, or 612. In a deterministic system 600, the event may be time-sensitive, requiring that an application processor (AP) 604 detect and respond to the event within predefined timeframes. For example, one or more accelerometers 608 may be deployed to detect changes in velocity, speed and/or direction of a vehicle or object. In another example, an application processor 604 may be configured to correlate images captured by a camera (not shown) with events generated by one or more sensors such as a gyroscope 606, accelerometer 608, depth/pressure sensor 610, motion sensor 612, or the like, such that the measurements can be accurately related to a frame of video stream, for example. In conventional serial bus interfaces, the sensor device 606, 608, 610, 612 may be required to wait until the serial bus 602 is available, and/or the sensor device 606, 608, 610, 612 is polled by the application processor 604.

In the example illustrated in FIG. 6, each sensor device 606, 608, 610, 612 can assert an interrupt request (IRQ) that drives an input of the application processor 604. As depicted, a single sensor device 606, 608, 610, 612 may be connected to each of a plurality of IRQ inputs on the application processor 604, permitting the application processor 604 to quickly identify and prioritize one or more concurrently received interrupts. In many instances, one or more sensor devices 606, 608, 610, 612 may share a common IRQ signal line and the application processor 604 may then execute a procedure to determine which sensor device 606, 608, 610, 612 asserted the IRQ.

When multiple sensor devices 606, 608, 610, and/or 612 have concurrently asserted interrupts, an arbitration scheme may be employed to determine which sensor device 606, 608, 610, 612 is to receive the earliest attention of the application processor 604. The arbitration process may be initiated after a current data exchange over the serial bus 602 has been completed. Accordingly, there can be significant delays between the occurrence or generation of an event at one of the sensor devices 606, 608, 610, 612, and the acknowledgement of the event by the application processor 604. In conventional systems, the event may be time stamped upon identification by the application processor and, due to the delays in handling an associated IRQ, the event may have a time stamp that is significantly delayed with respect to other time stamps marking other events in the system 600. In the example related to a camera, an event occurring while a first video frame is captured may have a time stamp that corresponds to a second video frame that occurs after the first video frame. The use of one or more dedicated IRQ signal wires can be costly in terms of pin out and real estate on smaller devices with few (6~24) pins.

Figure 7:
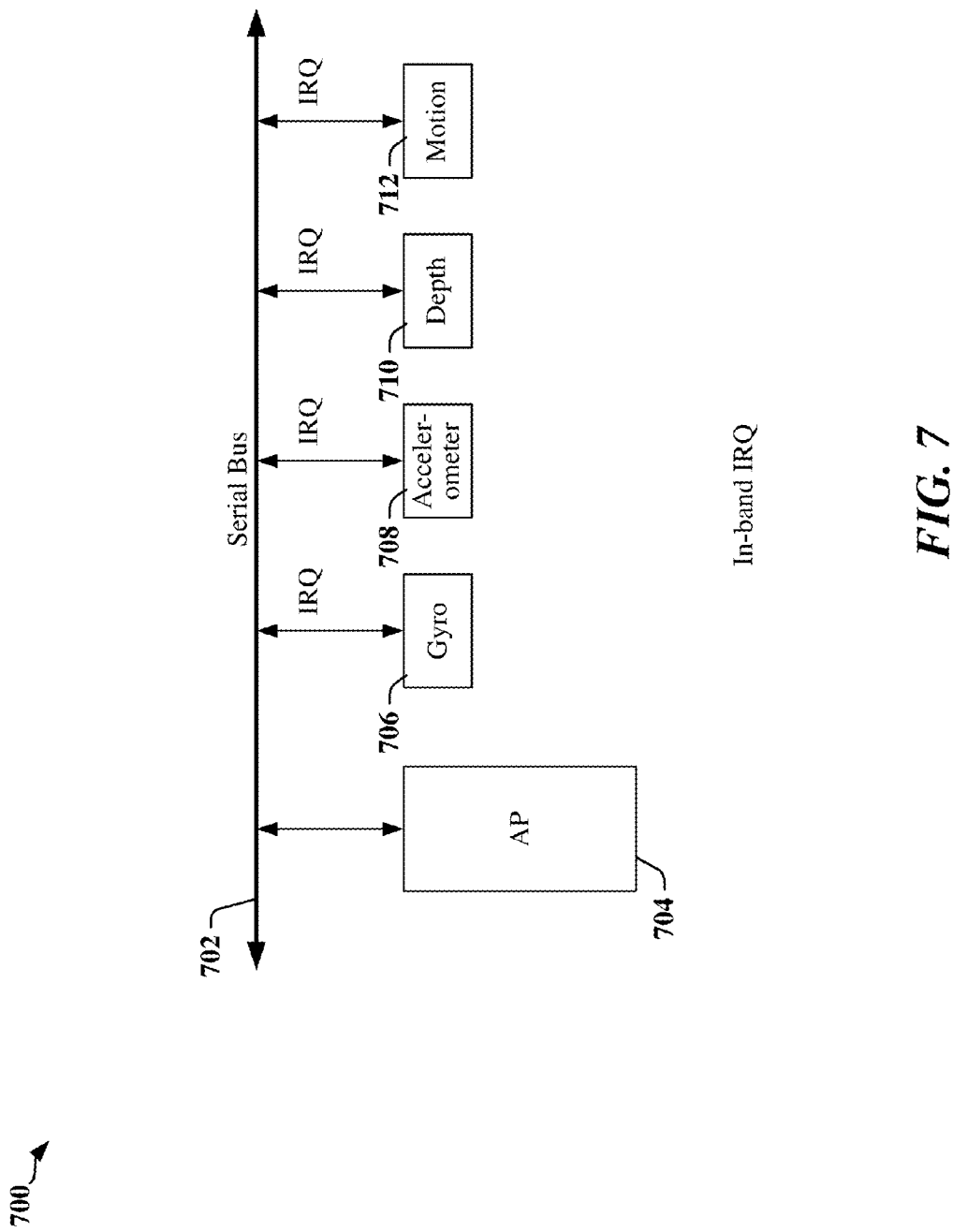
FIG. 7 illustrates an example of a system adapted to support in-band IRQs that use the signal wires of the serial bus.

FIG. 7 illustrates an example of a system 700 adapted to support an in-band IRQ (IBI) capability that uses the signal wires of the serial bus 702 instead of a dedicated IRQ signal wire. As with the system 600 of FIG. 6, a plurality of sensor devices 706, 708, 710, or 712 may be configured to generate an event in response to a change in a quantity measured by the sensor device 706, 708, 710, or 712 and to direct an IRQ to a bus master 704, which may be provided in an application processor for example. Here, the IRQ may be asserted by driving one or more signal wires of the serial bus 702 in a manner that is detected and understood by the bus master 704. Typically, the assertion of an IRQ involves an arbitration process or causes the bus master 704 to poll each device in order to identify the source of the IRQ. In this example, there can be significant delays between the occurrence or generation of an event at one of the sensor devices 706, 708, 710, 712, and the acknowledgement of the event by the bus master 704.

In-band interrupt generation employs signaling that may be specific to the type of communications interface associated with the serial bus 702. In some instances, management of IBIs may be implemented using polling by the master device (i.e., the bus master 704). In these instances, the IRQ process is controlled entirely by the bus master 704, and the slave devices 706, 708, 710, 712 are reliant on the efficiency of the bus master 704 to ensure timely notification of events. Examples of polled IRQ implementations include CCIe and Soundwire interfaces. In other instances, a slave device 706, 708, 710, 712 may assert an IRQ by take control of the serial bus 702. Examples of such overriding IRQ implementations include sI2C, and SGbus. The various examples of communications interfaces are described by way of example, and the concepts and techniques described may be applicable to one or more of these examples and/or to other types of communications interface.

Examples of In-Band IRQ Techniques

Figure 8:
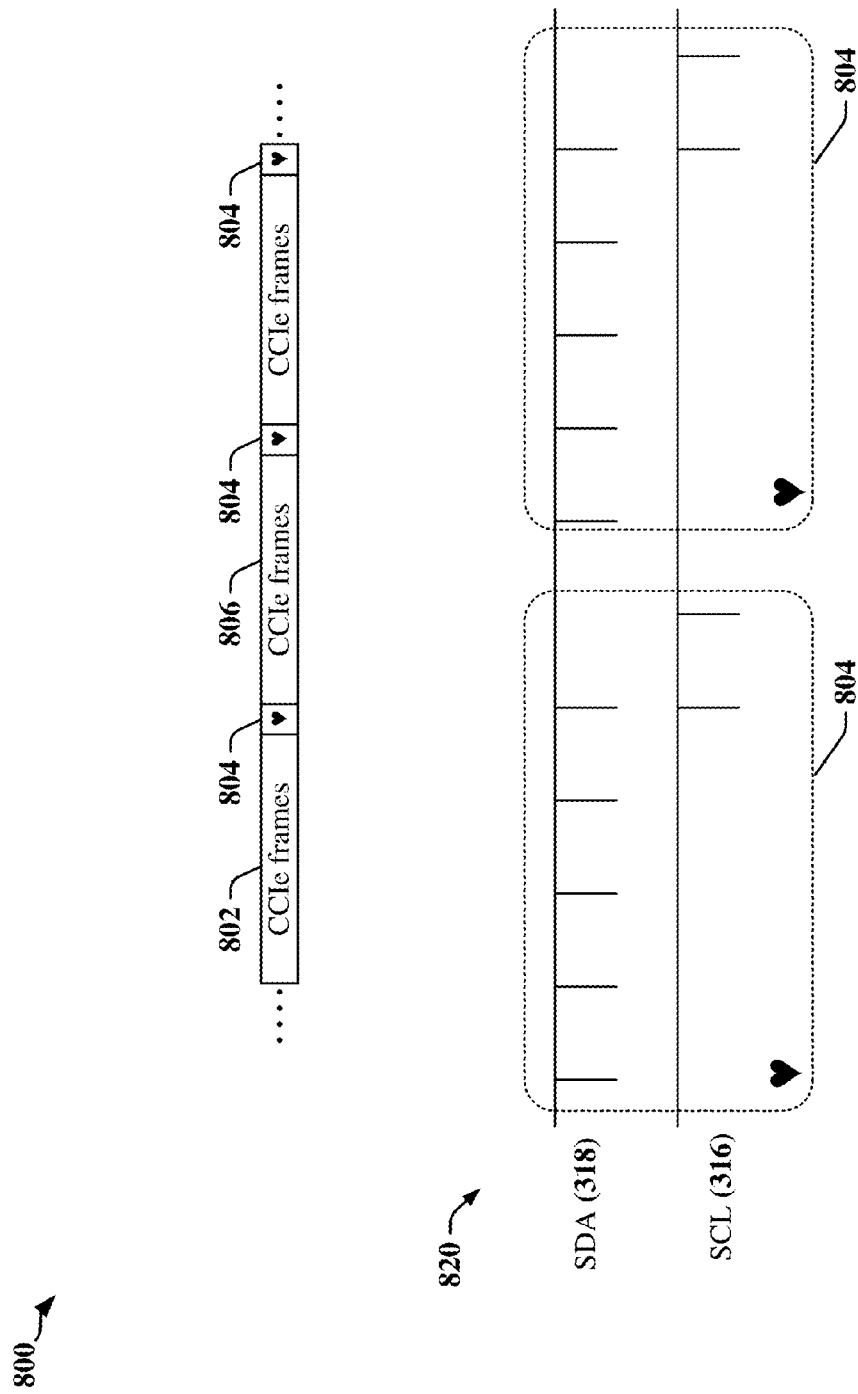
FIG. 8 illustrates certain aspects of a CCIe interface that may be exploited to support in-band IRQs.

FIG. 8 illustrates an example based on a communication interface that operates according to CCIe protocols, which may be exploited to support IBIs. In an active mode of operation 800, transmission of CCIe frames 802, 806 may be separated by an in-band interrupt opportunity 804. The in-band interrupt opportunity 804 may be a transmitted word, a signaling condition, a start or stop condition, or some other combination of signaling on the communication interface. In some modes of communication, the in-band interrupt opportunity 804 may serve the additional purpose of providing a pulse on a heartbeat clock that is transmitted at a low-frequency when the system is in a power-saving mode of operation 820. A slave device 706, 708, 710, 712 can assert an IBI by driving one or more of the wires of the serial bus when an in-band interrupt opportunity 804 is transmitted on the SDA 318 and SCL 316. In power-saving mode, the bus master 704 may slow down its transmit clock from 1 MHz or more to 32 KHz or less. Accordingly, slave device 706, 708, 710, 712 can experience significant delays between identifying or generating an event and asserting a corresponding IBI.

Figure 9:
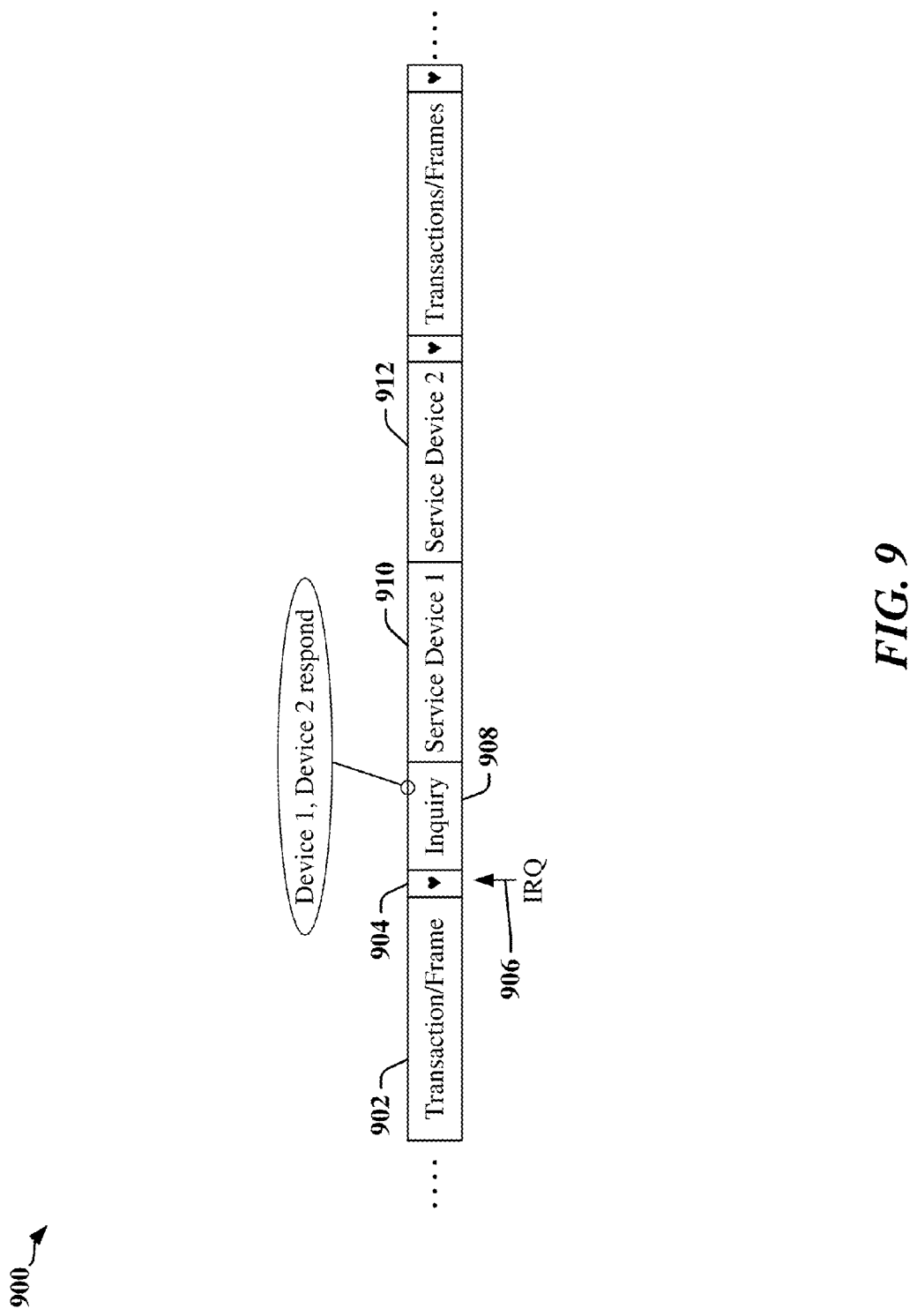
FIG. 9 illustrates an example of an interrupt request processing sequence.

FIG. 9 illustrates an example of an IRQ processing sequence 900, in which two of the slave devices 706, 708, 710, and/or 712 are concurrently asserting an IRQ 906 when an in-band interrupt opportunity 904 is detected. In the example, the two slave devices 706, 708, 710, and/or 712 may detect an event while a transaction or frame 902 is being transmitted on the serial bus 702. An event may be any occurrence or incident that causes a slave device 706, 708, 710, 712 to generate an IRQ at the earliest opportunity. Examples of events may include changes in G-force detected by an accelerometer, a change in coordinates of a gyroscope, a change in atmospheric pressure, etc. The bus master 704 may respond to the IRQs 906 by polling the slave devices 706, 708, 710, 712 and/or executing an inquiry procedure 908 to identify the IRQ-asserting slave devices 706, 708, 710, and/or 712. The slave devices 706, 708, 710, and/or 712 may each be assigned a bus priority that determines which slave device 706, 708, 710, or 712 can be the first device to have its IRQ 906 serviced. In one example, the priority may be based on a unique identifier of the slave devices 706, 708, 710, 712. In another example, the bus master 704 may assign and/or change bus priorities for one or more slave devices 706, 708, 710, 712. In another example, the bus master 704 may have a degree of flexibility in determining an order in which interrupting slave devices 706, 708, 710, 712 are to be handled, based for example on a current state of operation, application requirements, or any other conditions or parameters. Based on their relative priorities, a first of the slave devices 706, 708, 710, 712 is serviced in a first exchange 910 on the serial bus and the second of the slave devices 706, 708, 710, 712 is serviced in a second exchange 912 on the serial bus.

Figure 10:
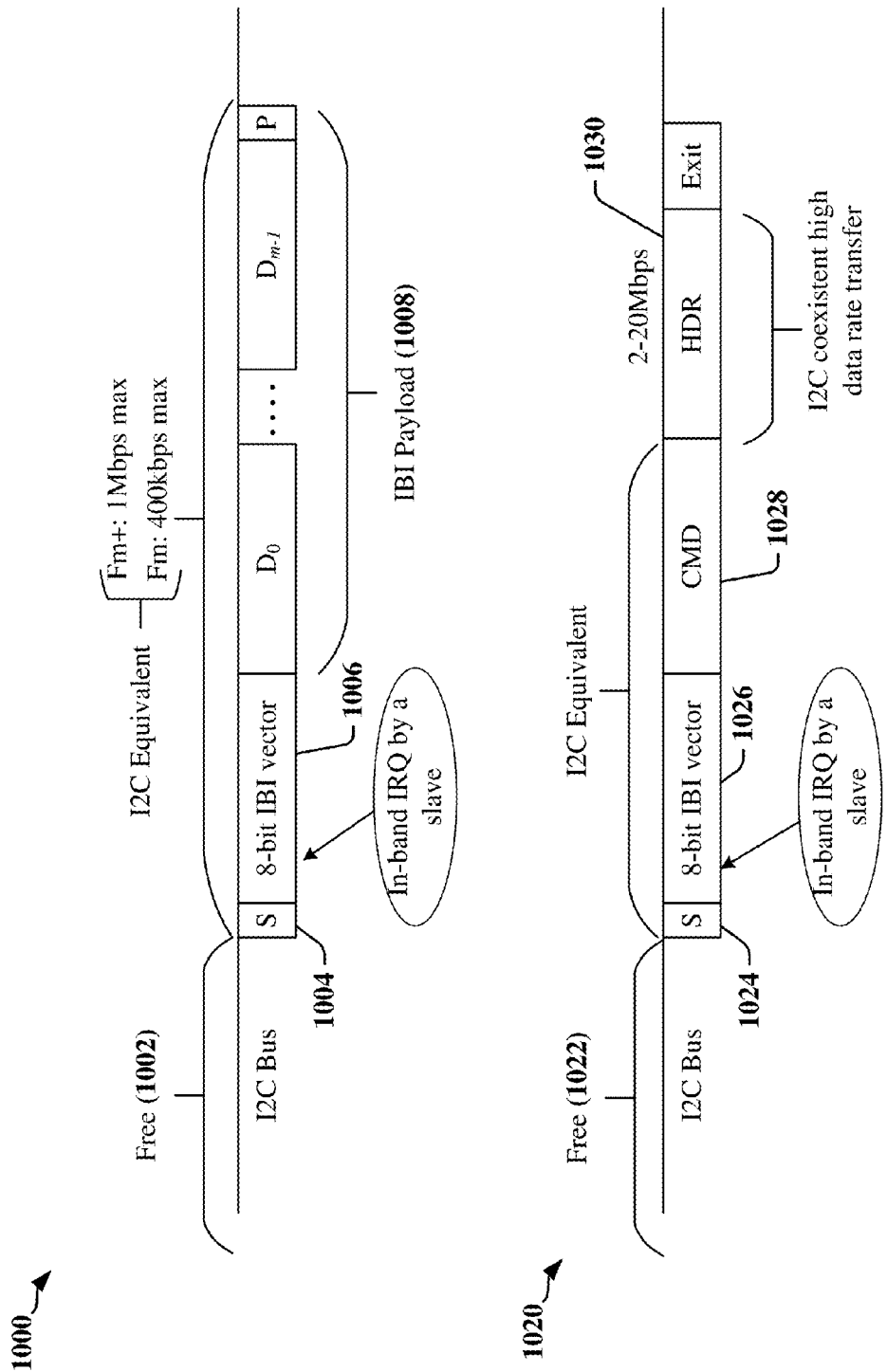
FIG. 10 illustrates certain aspects of sI2C and/or SGBus interfaces that may be exploited to support in-band interrupt requests.

FIG. 10 illustrates an example of a first IRQ processing sequence 1000 in examples based on communication interfaces that operate in accordance with I2C protocols. Slave devices 706, 708, 710, 712 that operate in certain modes of communication may assert an IBI by driving one or more of the wires of the serial bus when the serial bus is free 1002, 1022 from traffic and signaling. The slave device 706, 708, 710, 712 may assert the IBI by transmitting a start condition 1004, 1024 on the I2C bus. The slave device 706, 708, 710, 712 may then transmit an IBI vector 1006 identifying the interrupting slave device 706, 708, 710, 712. In a first IRQ processing sequence 1000, the slave device 706, 708, 710, 712 may then exchange data related to the IBI in one or more data packets of an IBI payload 1008 transmitted in accordance with applicable protocols and data rates. In the second IRQ processing sequence 1020, a command 1028 transmitted on the serial bus in accordance with I2C protocols may initiate a high data rate exchange of data 1030 on the serial bus in a protocol that can, for example, coexist with a conventional I2C slave device 706, 708, 710, or 712.

Time stamp jitter may arise due to the variability of the occurrence of free periods of the serial bus. Time stamp jitter may be measurable in milliseconds or seconds because a slave device 706, 708, 710, 712 can issue an IBI only when the serial bus is free 1002, 1022.

Figure 11:
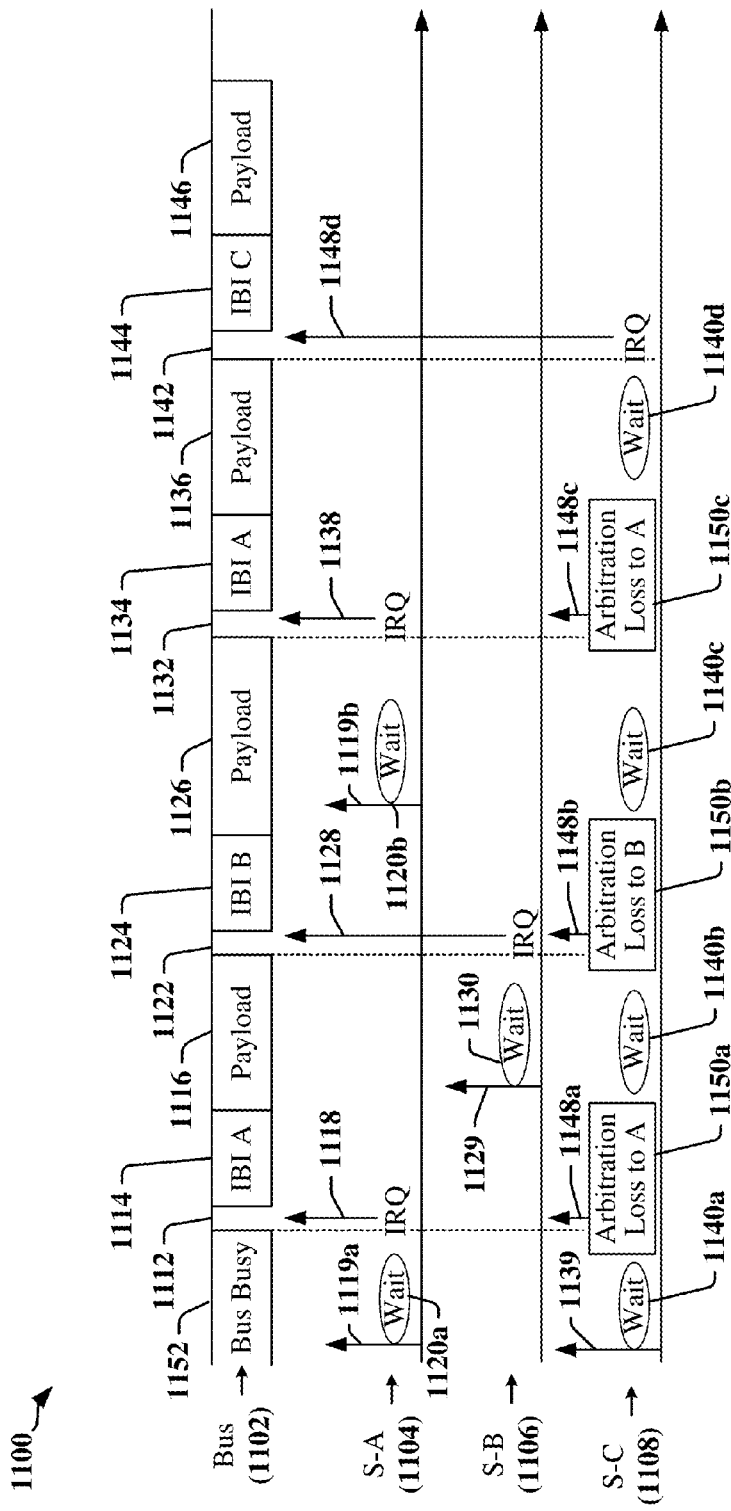
FIG. 11 illustrates an example of time stamp jitter when three slave devices assert an interrupt request at the same time.

FIG. 11 is a timing diagram 1100 that illustrates an example of time stamp jitter that may occur when three of the slave devices 706, 708, 710, 712 assert an IBI at the same time. A first slave device (S-A) 1104 detects an event 1119a while the serial bus is busy and determines that an IRQ should be asserted. The first slave device 1104 waits 1120a until the next bus free period 1112. A second slave device (S-B) 1106 may be idle at this time. A third slave device (S-C) 1108 detects an event 1139 while the serial bus is busy and determines that an IRQ should be asserted. The third slave device 1108 waits 1140a until the next bus free period 1112.

Upon the occurrence of the next bus free period 1112, the first slave device 1104 and the third slave device 1108 assert respective IRQs 1118, 1148a. The IRQ 1118 asserted by the first slave device 1104 overwrites the lower priority IRQ 1148a asserted by the third slave device 1108. Arbitration 1150a of IRQs may occur based on durations of the IRQ related to priorities, for example. The IRQ 1118 of the first slave device 1104 may then be serviced 1114, 1116. The third slave device 1108 waits 1140b until the next bus free period 1122 to request interrupt service.

During servicing of the IRQ 1118 asserted by the first slave device 1104, the second slave device 1106 may detect an event 1129, and may determine that an IRQ should be asserted. The second slave device 1106 waits 1130 until the next bus free period 1122.

Upon the occurrence of the next bus free period 1122, the second slave device 1106 and the third slave device 1108 assert IRQs 1128, 1148b. The IRQ 1128 asserted by the second slave device 1106 overwrites the lower priority IRQ 1148b asserted by the third slave device 1108. The IRQ 1128 of the second slave device 1106 may then be serviced 1124, 1126. After losing arbitration 1150b, the third slave device 1108 waits 1140c until the next bus free period 1132 to request interrupt service.

During servicing of the IRQ 1128 asserted by the second slave device 1106, the first slave device 1104 detects a second event 1119b, and may determine that an IRQ should be asserted. The first slave device 1104 waits 1120b until the next bus free period 1132.

Upon the occurrence of the next bus free period 1132, the first slave device 1104 and the third slave device 1108 assert IRQs 1138, 1148c. The IRQ 1138 asserted by the first slave device 1104 overwrites the lower priority IRQ 1148c asserted by the third slave device 1108. The IRQ 1138 of the first slave device 1104 may then be serviced 1134, 1136. After losing arbitration 1150c, the third slave device 1108 waits 1140d until the next bus free period 1142 to request interrupt service.

The IRQ 1148d of the third slave device 1108 may then be serviced 1144, 1146 in the next bus free period 1142. As can be appreciated from this example, the event 1139 detected by the third slave device 1108 may be processed after a considerable delay, during which later occurring events 1129, 1119b may have been processed before the event 1139 detected by the third slave device 1108. It can be further appreciated that such inconsistency in processing time may occur in side-band IRQ processing where the IRQs are prioritized and the system is relatively busy.

Improved Accuracy Time Stamping for Sensor Devices

Certain aspects disclosed herein relate to the provision of accurate time stamps for events that result in the assertion of IBIs. Conventional systems that use polling schemes to determine, arbitrate and/or handle IBIs can incur long lag times between events and corresponding IRQs when the systems are in a power saving mode and/or the data rate on the serial bus is reduced significantly. In communication interfaces where slave devices can assert an IBI by overriding signaling on the serial bus may be subject to indefinite lag times between events and corresponding interrupt opportunities when the serial bus is busy. In both polling and signaling override IRQ schemes, jitter can occur when events occur asynchronously and/or when multiple slave devices contend for interrupt service.

Improved Accuracy Time Stamping Using Sideband IRQs

Figure 12:
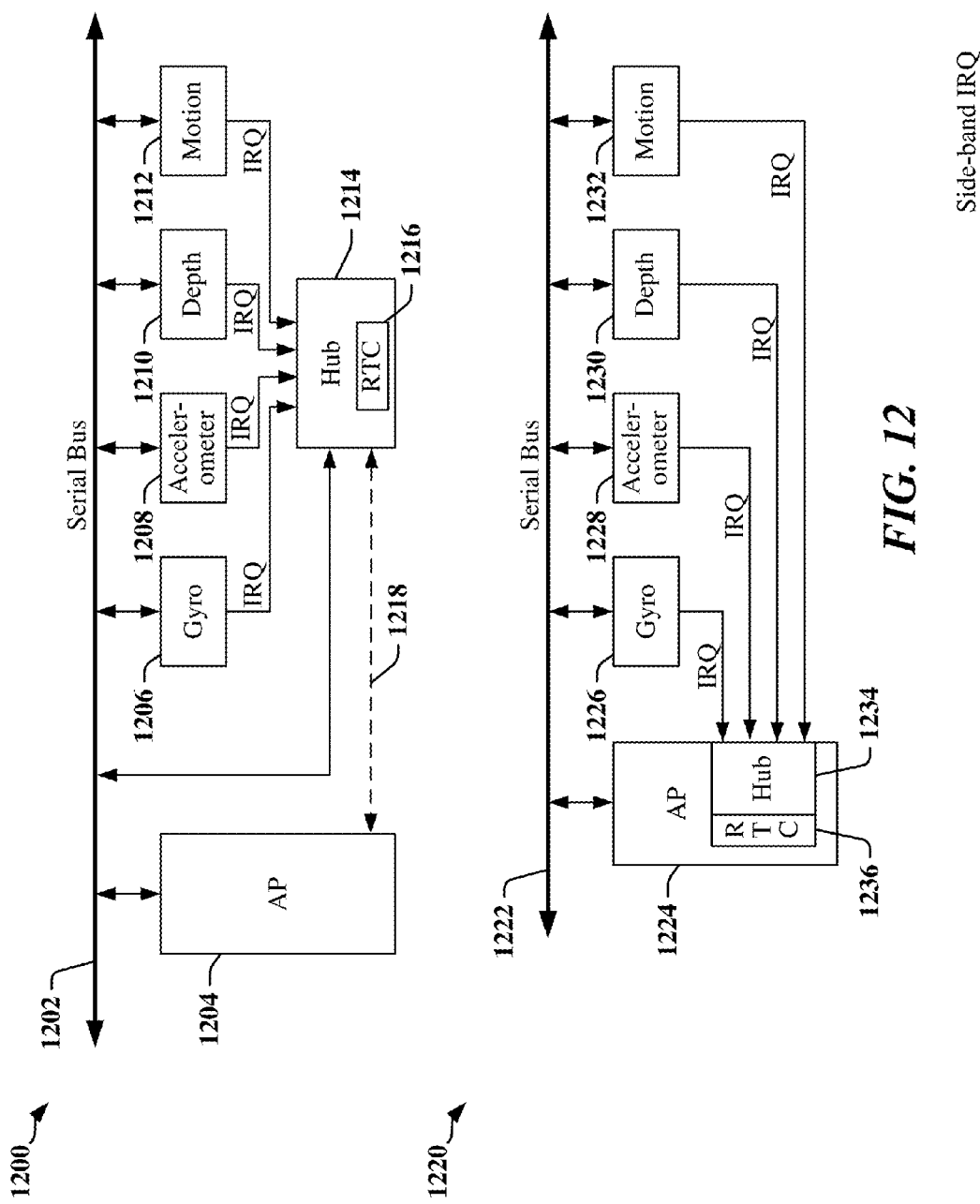
FIG. 12 illustrates examples of systems that use sideband IRQs in accordance with certain aspects disclosed herein.

FIG. 12 illustrates examples of systems 1200, 1220 that use sideband IRQs to provide accurate time stamps. In the first system 1200, accurate time stamping for sideband IRQs is accomplished by providing a hub 1214 that supports a number of IRQ lines and receives IRQs from a plurality of slave devices 1206, 1208, 1210, 1212. The hub 1214 may include a real-time clock (RTC) circuit 1216 that can accurately keep time. The hub 1214 may additionally or alternatively be synchronized to system timing and/or may otherwise closely track system timing. The hub 1214 may record the time at which an IRQ is asserted as a time stamp and may provide the time stamp with notifications of an IRQ. The hub 1214 may also be configured to identify the source of an IRQ when notifying the application processor 1204. The hub 1214 may be configured to operate as a slave device on the serial bus 1202 and the hub 1214 may signal the application processor 1204 using any supported IBI method. In some instances, the hub 1214 may be configured to signal the application processor 1204 using direct signaling 1218 that may include direct IRQ signaling that requests the attention of the application processor.

In the second system 1220, a hub 1234 may be provided in the application processor 1224. The hub 1234 may be configured to provide accurate time stamping for sideband IRQs received on one or more IRQ lines from a plurality of slave devices 1226, 1228, 1230, 1232. The hub 1234 may include or cooperate with a real-time clock (RTC) module or circuit 1236 that can accurately keep time, or that is synchronized to system timing and/or that can closely track system timing. In one example, the hub 1234 can query a dedicated real-time clock module or circuit 1236, or may issue a call to a real-time clock function (not shown) provided for general use within the application processor 1224.

Improved Accuracy Time Stamping for In-Band IRQs

Systems and apparatus that employ IBIs may be adapted or configured in accordance with certain aspects disclosed herein to provide improved accuracy time stamps. In some instances, slave devices may measure or track time elapsed between the occurrence of an event and the acknowledgement a corresponding IRQ and/or between the occurrence of the event and the commencement of servicing of the corresponding IRQ. Certain aspects disclosed herein may also apply to systems that use sideband IRQs. Certain examples related to IBI time stamps are described in relation to the system 700 illustrated in FIG. 7.

Figure 13:
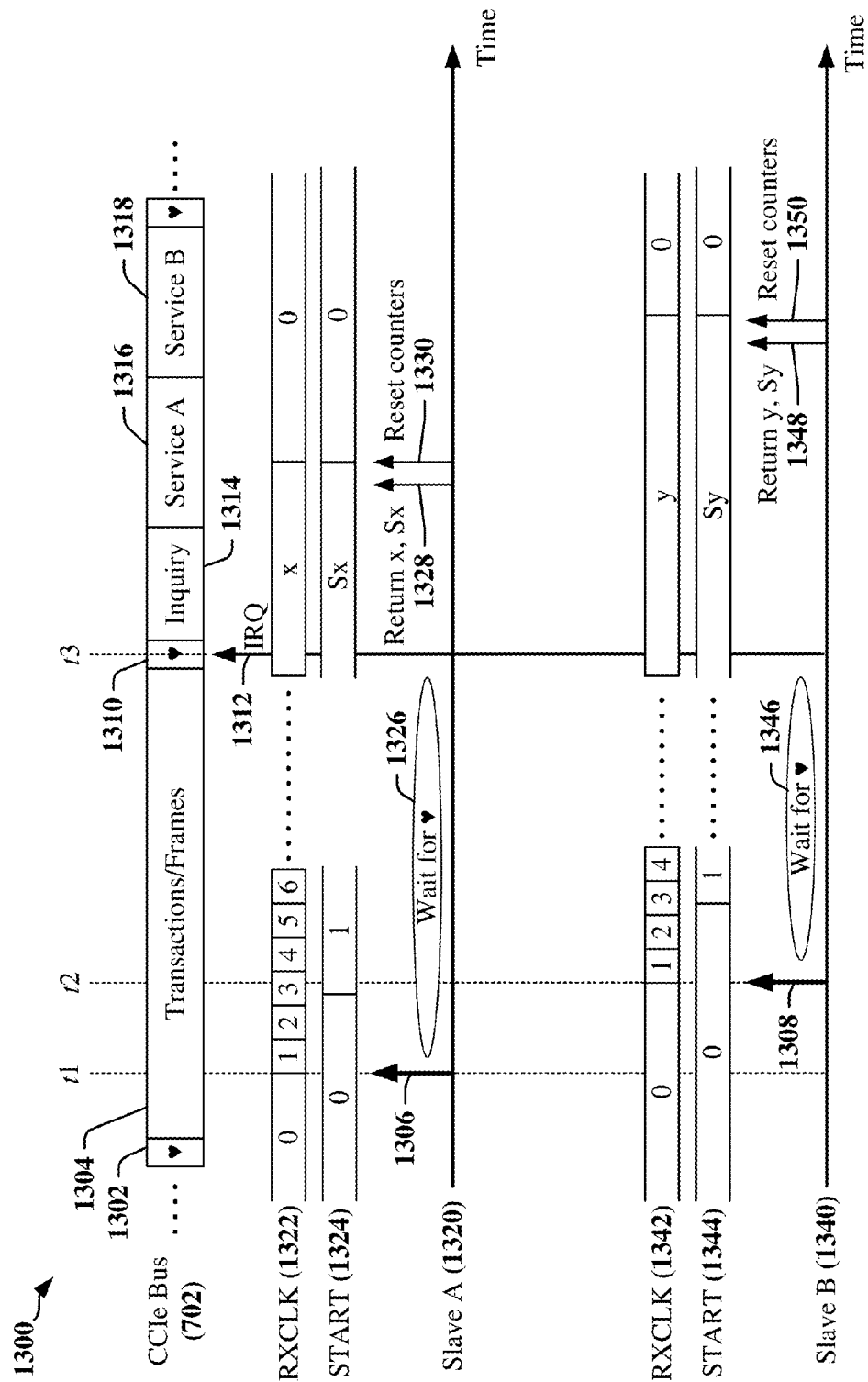
FIGS. 13 and 14 illustrate an example of a system that provides improved accuracy time stamps for in-band IRQs in accordance with certain aspects disclosed herein.
Figure 14:
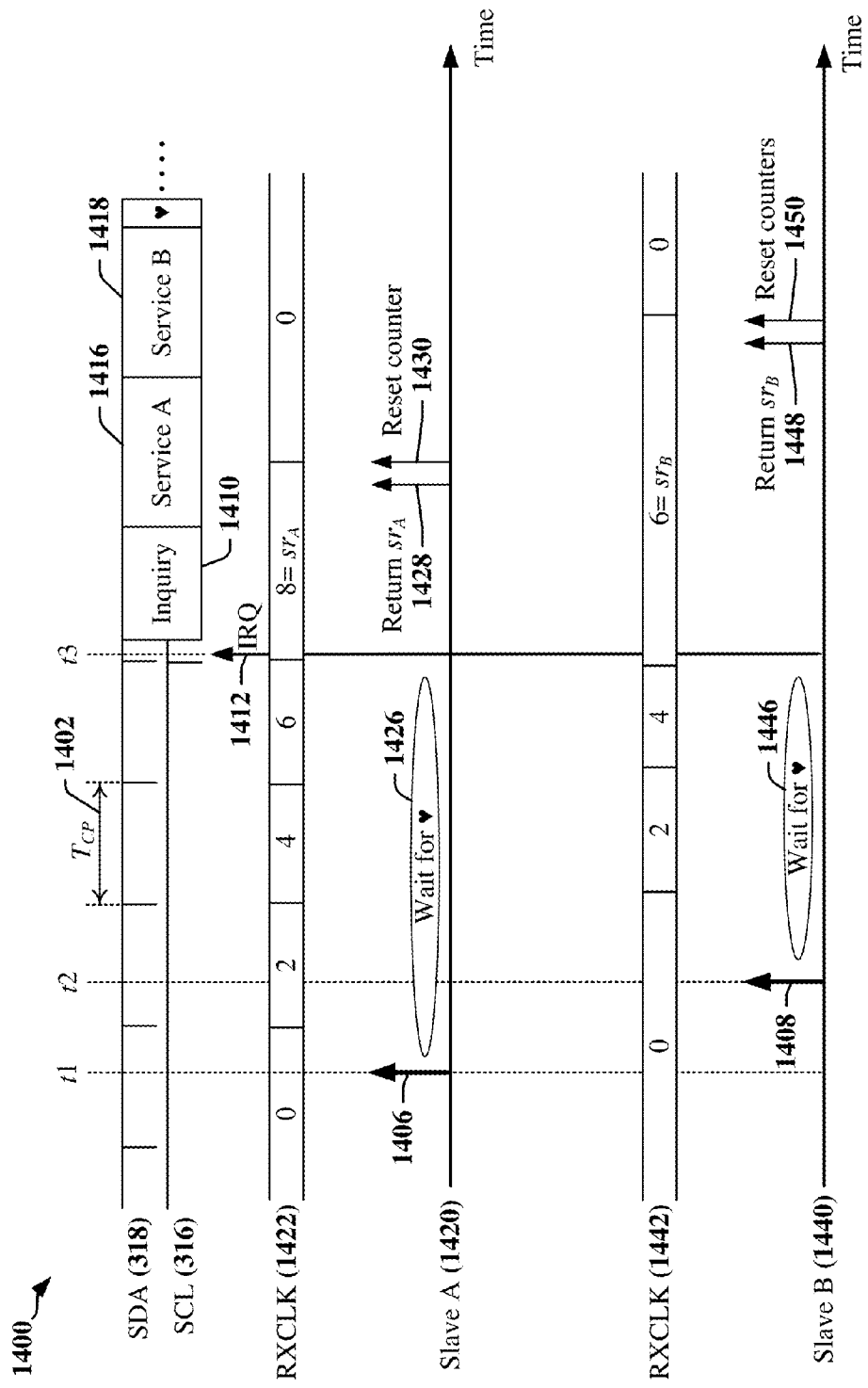

FIGS. 13 and 14 illustrate a first example in which a system provides improved accuracy time stamps for IBIs in accordance with certain aspects disclosed herein. FIG. 13 relates to a serial bus 702 in an active mode of operation, and this example is presented to assist in the description of certain aspects disclosed herein by relating timing to an in-band interrupt opportunity 1310 provided in certain modes of communication. In this example, slave devices 1320, 1340 may be configured to count receiver symbol clock (RXCLK) periods and start conditions on the serial bus 702 after occurrence of an event 1306, 1308 until an IRQ 1312 is asserted. The slave devices 1320, 1340 may maintain counters 1322, 1324, 1342, 1344 to track RXCLK periods and start conditions while waiting 1326, 1346 for a next in-band interrupt opportunity 1310. An IRQ 1312 may be issued during the next in-band interrupt opportunity 1310. The IRQ 1312 may be issued by both slave devices 1320, 1340, and by any other slave device (not shown) that may have encountered an event that prompts it to generate an IRQ. The IRQ 1312 may cause an inquiry 1314 exchange that identifies the source of one or more slave devices 1320, 1340 that have concurrently asserted the IRQ 1312. A bus master 704 may then respond to the IRQ 1312 by servicing the interrupting slave devices 1320, 1340 during corresponding IRQ service intervals 1316, 1318. The interrupting slave devices 1320, 1340 may report the values of the counters 1322, 1324, 1342, 1344 during IRQ service intervals 1316, 1318. The bus master 704 may be configured to calculate actual event time stamps relative to a system time known to the bus master and the values of the counters 1322, 1324, 1342, 1344.

For example, the bus master 704 may capture system time t3 when the IRQ 1312 is asserted. After asserting the IRQ 1312, a first slave device 1320 may stop its RXCLK counter 1322 when it has a value of x, and its START counter 1324 when it has a value of Sx. The first slave device 1320 may report the values of the counters 1322, 1324 during the corresponding IRQ service interval 1316, 1318. Based on a known RXCLK period ($t_{SYM}$) and a known time between START conditions ($t_{START}$), the bus master 704 may then calculate the time (t1) of occurrence of the first event 1306 as:

$$t1=t3-t_{SYM}\times(x-Sx)-t_{START}\times Sx.$$

After asserting the IRQ 1312, a second slave device 1340 may stop its RXCLK counter 1342 when it has a value of y, and its START counter 1344 when it has a value of Sy. The second slave device 1340 may report the values of the counters 1342, 1344 during the corresponding IRQ service interval 1318. Based on the known RXCLK period ($t_{SYM}$) and the known time between START conditions ($t_{START}$), the bus master 704 may then calculate the time (t2) of occurrence of the second event 1308 as:

$$t2=t3-t_{SYM}\times(y-Sy)-t_{START}\times Sy.$$

The time stamp may be subject to a jitter of +0.5×($t_{START}$). In some examples, a jitter of 270 ns may be observed.

FIG. 14 relates to a further example that corresponds to the operation of the serial bus 702 in a power-saving mode of operation. In this example, slave devices 1420, 1440 may be configured to count receiver symbol clock (RXCLK) periods on the serial bus 702 after occurrence of an event 1406, 1408 until an IRQ 1412 is asserted. In some instances, the slave devices 1420, 1440 may maintain counters 1422, 1442 to track RXCLK periods while waiting 1426, 1446 for an interrupt opportunity. In the example where the serial bus 702 is operated in a CCIe mode, the counters 1422, 1442 may be used to track RXCLK periods while waiting 1426, 1446 for complete reception of a current heartbeat word. The IRQ 1412 may cause the bus master 704 to wake up and execute an inquiry 1410 exchange that identifies the source of one or more slave devices 1420, 1440 that have concurrently asserted the IRQ 1412. The bus master 704 may then respond to the IRQ 1412 during corresponding IRQ service intervals 1416, 1418 the interrupting slave devices 1420, 1440. The interrupting slave devices 1420, 1440 may report the values of the counters 1422, 1442 during the IRQ service intervals 1416, 1418. The bus master 704 may be configured to calculate actual event time stamps relative to a system time known to the bus master and the values of the counters 1422, 1442.

In one example, the bus master 704 may capture system time t3 when the IRQ 1412 is asserted. After asserting the IRQ 1412, a first slave device 1420 may stop its RXCLK counter 1422 when it has a value of $sr_A$. The first slave device 1420 may report the values of the counter 1422 during IRQ service interval 1416. Based on a known clock period ($T_{CP}$) 1402, the bus master 704 may then calculate the time (t1) of occurrence of the first event 1406 as:

$$t1 = t3 - \left(\frac{sr_A}{2} + 0.5\right) \times T_{CP}.$$

After asserting the IRQ 1412, the second slave device 1440 may stop its RXCLK counter 1442 when it has a value of $sr_B$. The second slave device 1440 may report the values of the counter 1442 during IRQ service interval 1418. Based on a known clock period ($T_{CP}$) 1402, which may correspond to a heartbeat clock, the bus master 704 may then calculate the time (t2) of occurrence of the first event 1408 as:

$$t2 = t3 - \left(\frac{sr_B}{2} + 0.5\right) \times T_{CP}.$$

The time stamp may be subject to a jitter of ±0.5×$T_{CP}$.

The examples illustrated in FIGS. 13 and 14 may be implemented in slave devices using two counters and without requiring a free running clock. Accordingly, a relatively small hardware overhead can be anticipated, since a free running clock is not required, and low jitter, high accuracy timestamps can be obtained when the serial bus 702 is in an active state. Jitter may be more pronounced when the serial bus 702 is in power saving mode, where a heartbeat clock is transmitted for example.

Figure 15:
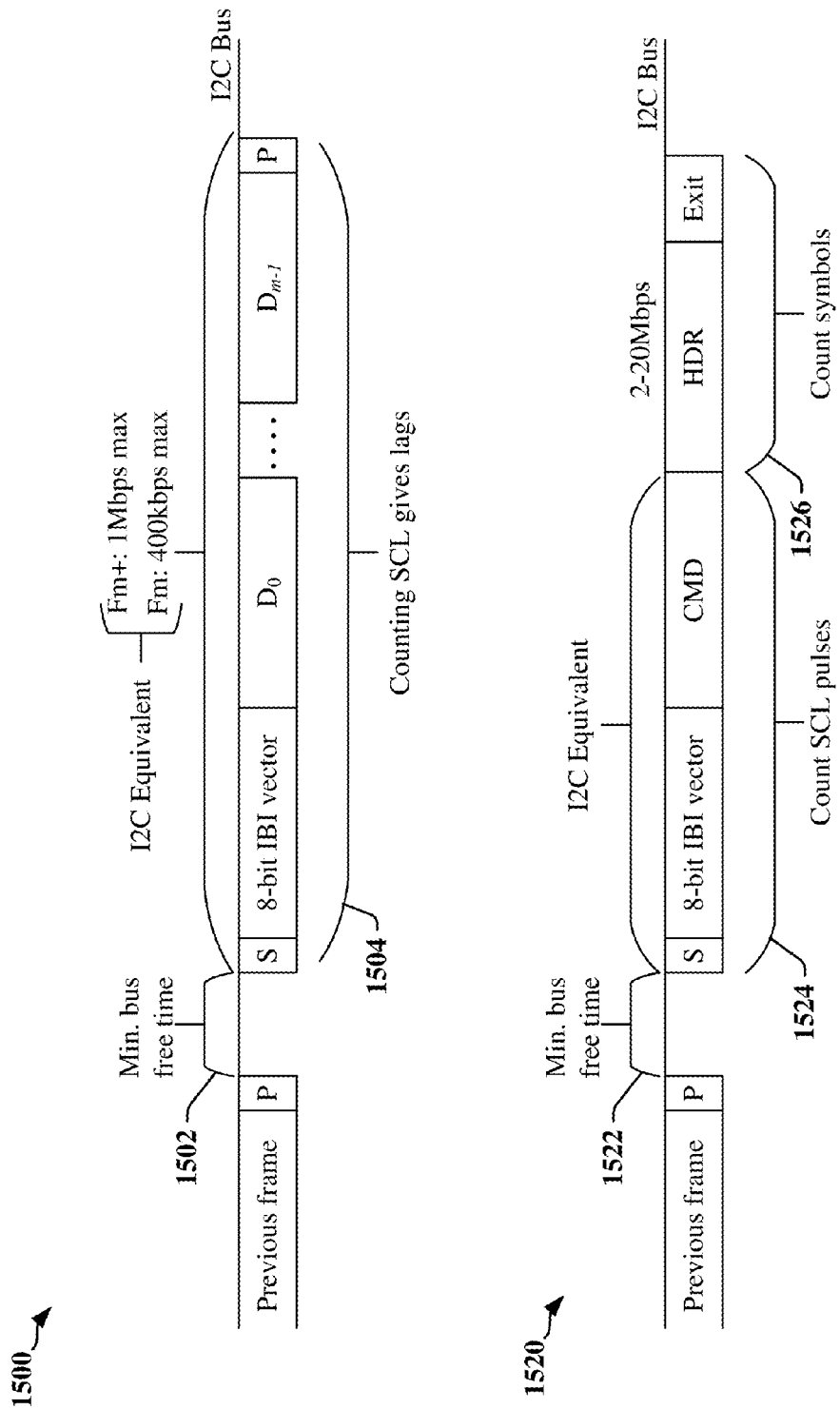
FIGS. 15 and 16 illustrate another example of a system that provides improved accuracy time stamps for in-band IRQs in accordance with certain aspects disclosed herein.
Figure 16:
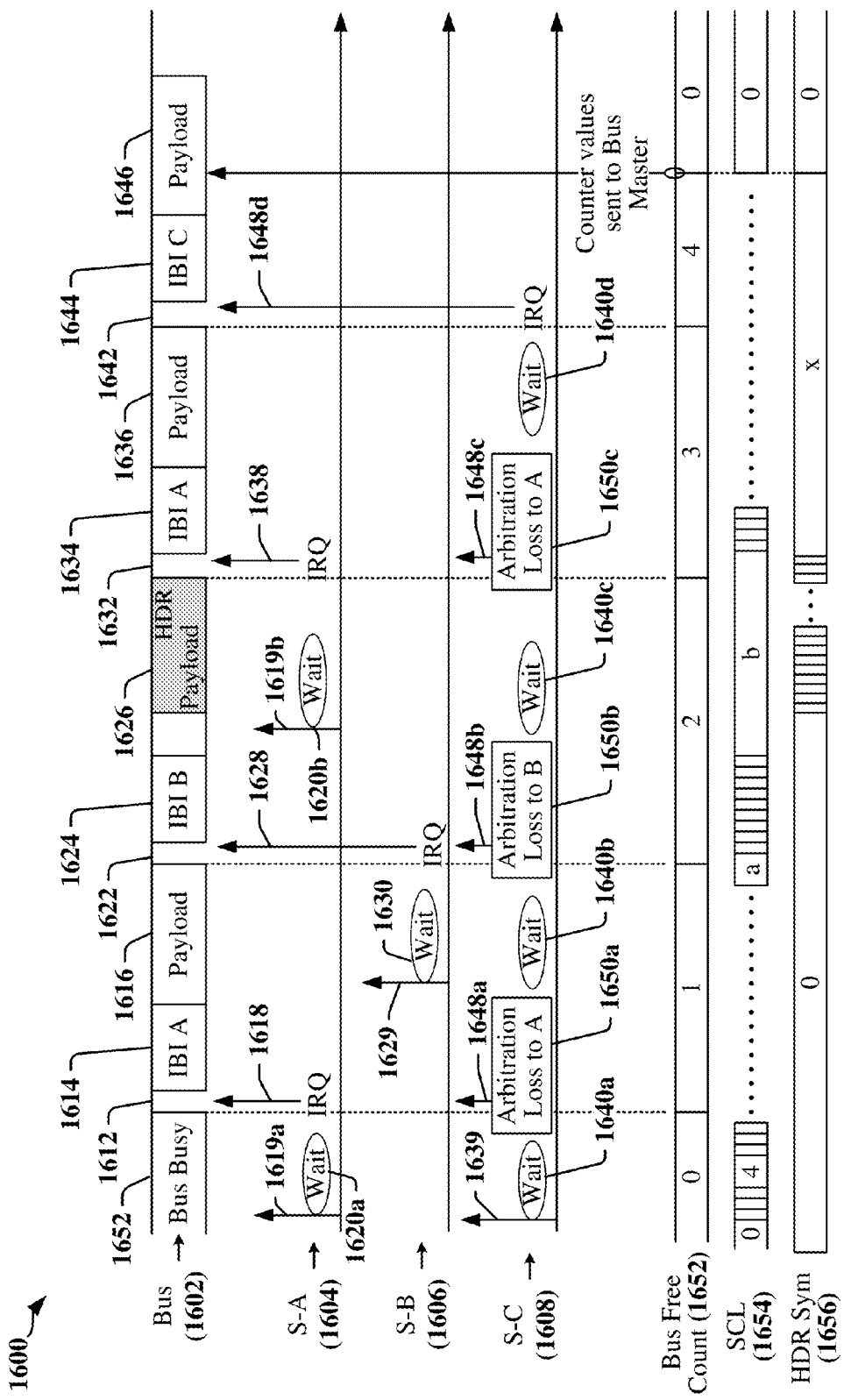

FIGS. 15 and 16 illustrate a second example in which a system provides improved accuracy time stamps for IBIs in accordance with certain aspects disclosed herein. This second example may relate to an interface based on a variant of the I2C protocols, such as the sI2C protocols, for example. A serial bus 702 may be operated in sI2C modes of communication to provide a two-wire, bi-directional, half duplex, serial interface that is compatible with fast mode variants of the I2C protocols. With reference to FIG. 2, for example, sI2C protocols may be used to support 1.0 MHz operation and 7-bit slave addressing in a serial link deployed, for example, between an image sensor 206 and a baseband processor 204. As shown in FIG. 15, the interface may be operated in a first sI2C mode 1500 in which bus operations are compliant with I2C protocols, and in a second SGBus mode 1520 in which the bus is operated according to I2C protocols for a first period of time 1524 and in a non-I2C mode for a second period of time 1526.

With reference also to FIG. 16, an interrupting slave device 1604, 1606, 1608 may be configured to count occurrences of certain signaling states or conditions that occur between detection of an event 1619a, 1619b, 1629, 1639 detected by a slave device 1604, 1606, 1608 and assertion of an IRQ 1618, 1628, 1638, 1648a, 1648b, 1648c, 1648d. The signaling states or conditions may include a number of bus free periods, a number of SCL pulses during sI2C operation mode, a number of symbols transmitted during a high data rate (HDR) period in a transition-encoded mode of operation. Accordingly, slave devices may maintain a bus free counter 1652, an SCL counter 1654 and a HDR symbol counters 1656. The content of all three counters 1652, 1654, 1656 may be reported to the bus master 704 during an IRQ status read process on the serial bus 702. The bus master 704 may calculate an event time stamp based on the values of the counters 1652, 1654, 1656 relative to system time known to the bus master 704. For example, the bus master 704 may calculate the time since an event as:

(Free count)×$tBUF_{min}$+(SCL count)×$t$SCL+(HDR symbol count)×$t$SYM, where $tBUF_{min}$ is the minimum bus-free time.

Figure 17:
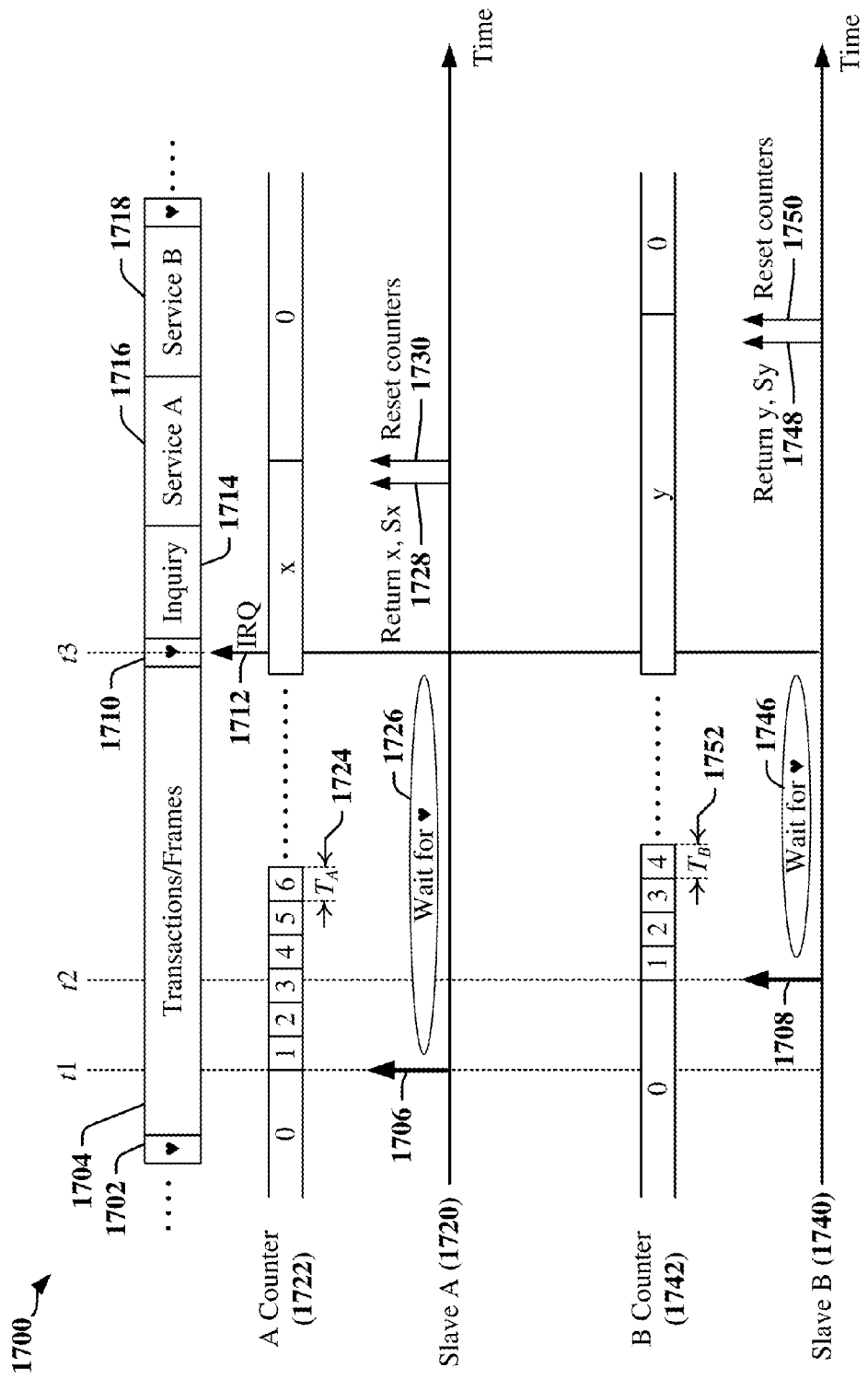
FIGS. 17-19 illustrate another example of a system that provides improved accuracy time stamps for in-band IRQs in accordance with certain aspects disclosed herein.
Figure 18:
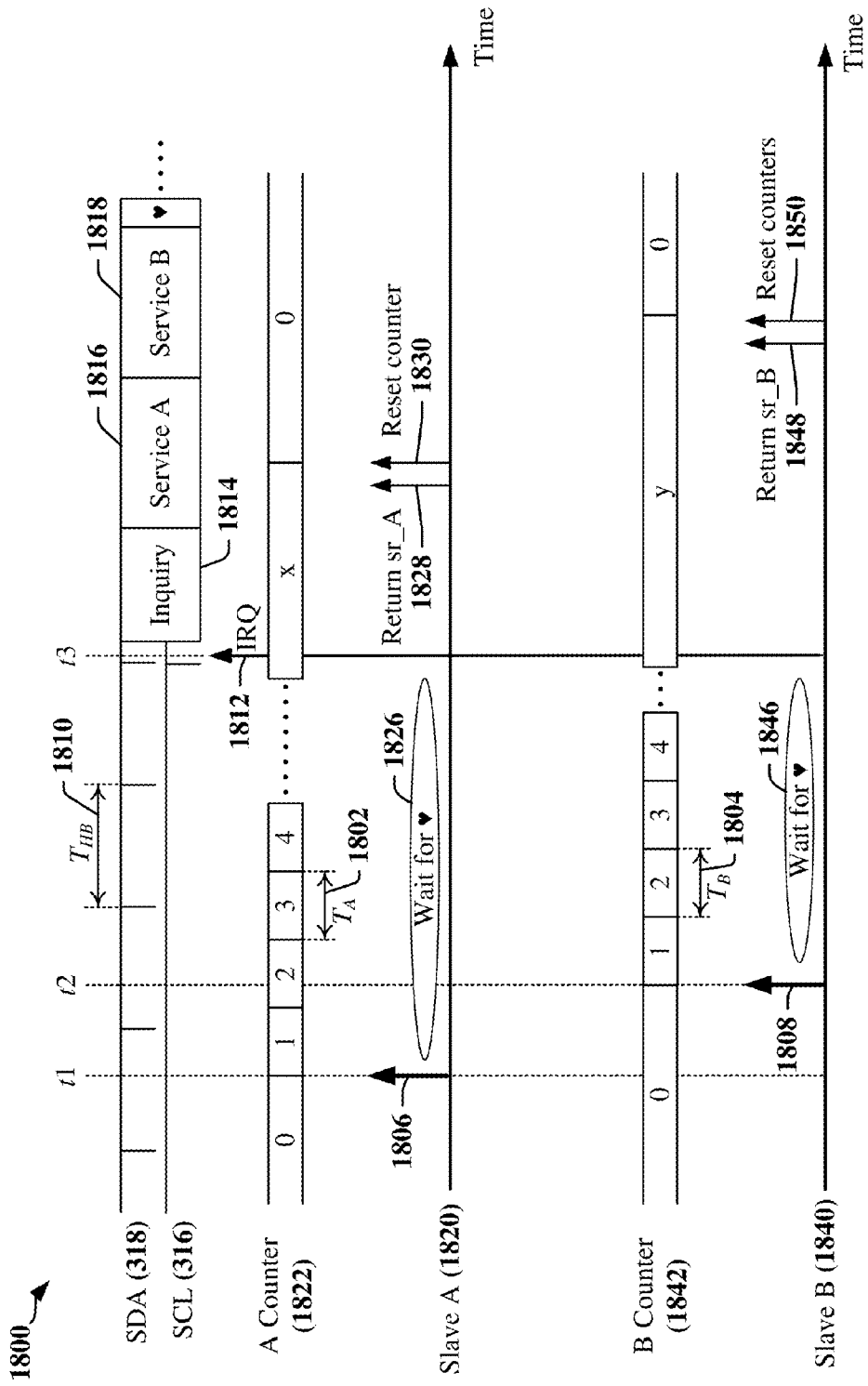
Figure 19:
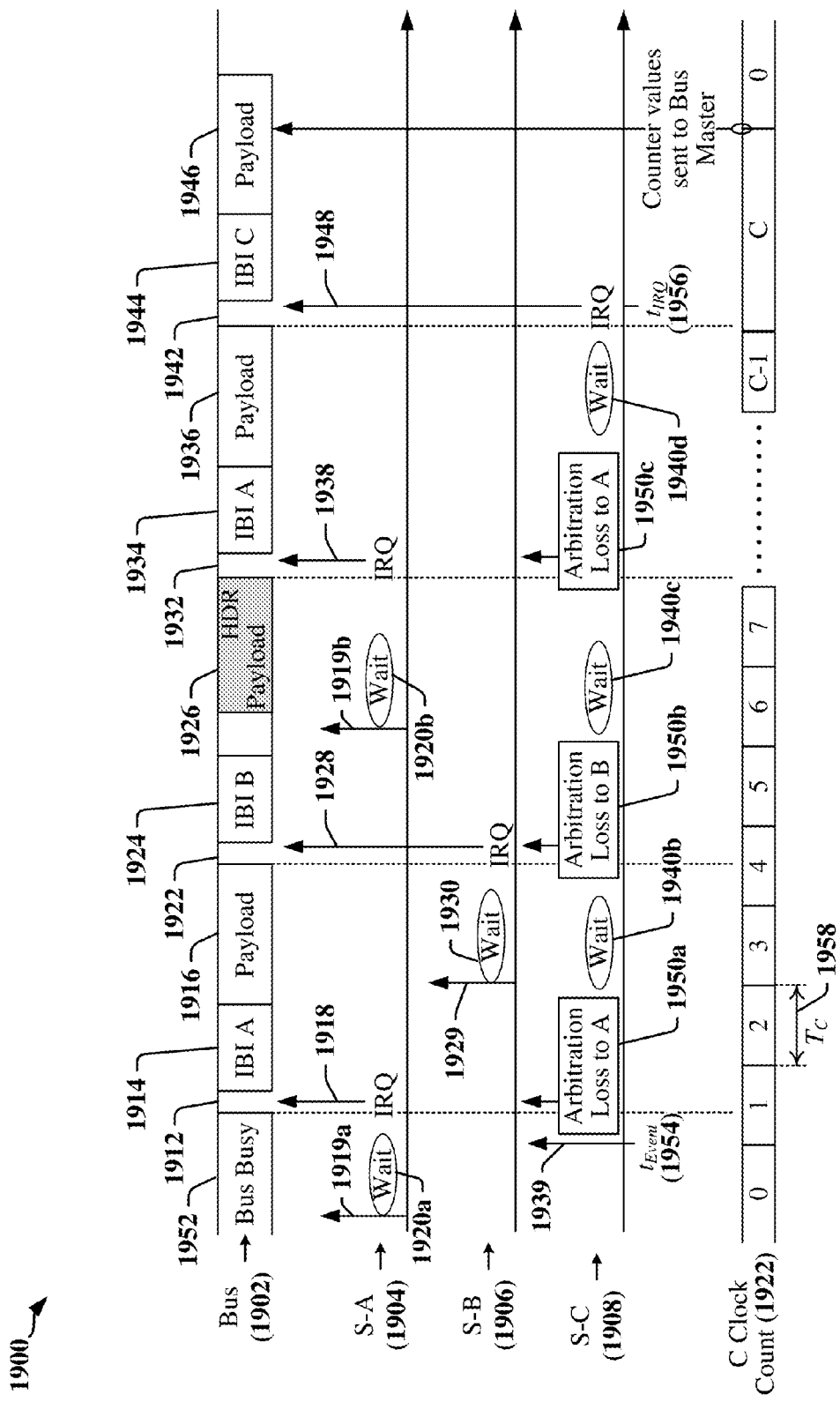

FIGS. 17-19 illustrate a third example in which a system provides improved accuracy time stamps for IBIs in accordance with certain aspects disclosed herein. In this example, slave devices may be adapted or configured to maintain a counter that counts cycles of an internal clock after occurrence of an event until a corresponding IRQ is asserted. The slave device may report the value of the counter and internal clock period information to the bus master 704 during an IRQ status read. In some instances, the slave device may report the value of the counter to the bus master 704 during an IRQ status read, and the internal clock period information at another time, such as during configuration or a calibration process initiated by the bus master 704. The bus master 704 determine a time of occurrence of the IRQ based on its knowledge of system time, and the bus master 704 may calculate an event time stamp using the counter value, the clock period information and the time of occurrence of the IRQ.

In the example depicted in FIG. 17, a first slave device 1720 initiates a counter 1722 upon detecting a first event 1706 occurring at a time t1 and entering a wait state 1726 before an IRQ 1712 can be asserted at a time t3. A second slave device 1740 initiates a counter 1742 upon detecting a second event 1708 occurring at a time t2 and entering a wait state 1746 before the IRQ 1712 is asserted at a time t3. An inquiry 1714 may be initiated when the IRQ 1712 is asserted. The counters 1722, 1742 may be halted when the respective slave devices 1720, 1740 assert the IRQ 1712. The first slave device 1720 reports the value (x) of its counter 1722 and the period ($T_A$) 1724 of its internal clock during IRQ servicing 1716. The second slave device 1740 reports the value (y) of its counter 1744 and the period ($T_B$) 1752 of its internal clock during IRQ servicing 1718. The bus master 704 may calculate the time stamp of the first event 1706 as:

$t1=t3-x \times T_A$, with a jitter of $\pm 0.5 \times T_A$.

The bus master 704 may calculate the time stamp of the second event 1708 as:

$t2=t3-y \times T_B$, with a jitter of $\pm 0.5 \times T_B$.

The counters 1722, 1742 may be initiated, started and/or halted using any available control techniques. In one example, one or more control signals may be provided to enable a counter 1722, 1742 to respond to a clock input. The control signals may include a reset signal that holds the clock output at an initial value until the reset signal is released. In another example, one or more control signals may gate the clock signal provided to a counter 1722, 1742 until a time stamp is required or desired. The clock may be gated by logic provided between a clock source and the counter 1722, 1742. The clock signal may be gated within the clock source, where for example, clock generation may be suppressed to conserve power when the clock signal is not needed. Other schemes known in the art for controlling a counter 1722, 1742 may be employed as needed or desired.

FIG. 18 provides an example related to an interface that may be in a low clock-rate and/or power-saving mode of operation. A first slave device 1820 initiates a counter 1822 upon detecting a first event 1806 occurring at a time t1 and entering a wait state 1826 before an IRQ 1812 can be asserted at a time t3. A second slave device 1840 initiates a counter 1842 upon detecting a second event 1808 occurring at a time t2 and entering a wait state 1846 before the IRQ 1812 is asserted at a time t3. An inquiry 1814 may be initiated when the IRQ 1812 is asserted. The counters 1822, 1842 may be halted when the respective slave devices 1820, 1840 assert the IRQ 1812. The first slave device 1820 reports the value (x) of its counter 1822 and the period ($T_A$) 1802 of its internal clock during IRQ servicing 1816. The second slave device 1840 reports the value (y) of its counter 1842 and the period (Ts) 1804 of its internal clock during IRQ servicing 1818. The bus master 704 may calculate the time stamp of the first event 1806 as:

$t1=t3-x \times T_A$, with a jitter of $\pm 0.5 \times T_A$.

The bus master 704 may calculate the time stamp of the second event 1808 as $t2=t3-y \times T_B$, with a jitter of $\pm 0.5 \times T_B$.

The use of an internal clock by slave devices 1820, 1840 during idle mode in a CCIe interface can provide improved accuracy over the accuracy achieved in the example illustrated in FIG. 14 when $T_A < T_{HB}$, and/or $T_B < T_{HB}$.

FIG. 19 provides an example that may be applied to sI2C or other bus, including transition-encoded interfaces. In this example, the third slave device (S-C) 1908, which may have a lower priority than the other two slave devices 1904, 1906, may initiate a counter 1922 upon detecting an event 1939 occurring at a time ($t_{Event}$) 1954 and may stop the counter 1922 when its IRQ 1948 wins arbitration (if any) at a time ($t_{IRQ}$) 1956. The third slave device 1908 reports the value (C) of its counter 1922 and the period ($T_C$) 1958 of its internal clock during IRQ servicing 1944. The bus master 704 may calculate the time stamp of the event 1939 as:

$t_{Event} = t_{IRQ} - C \times T_C$, with a jitter of $\pm 0.5 \times T_C$.

The use of an internal clock to measure time between events and IRQs may provide a high resolution time stamp with relatively low hardware cost, particularly for sI2C and SGbus implementations.

Figure 20:
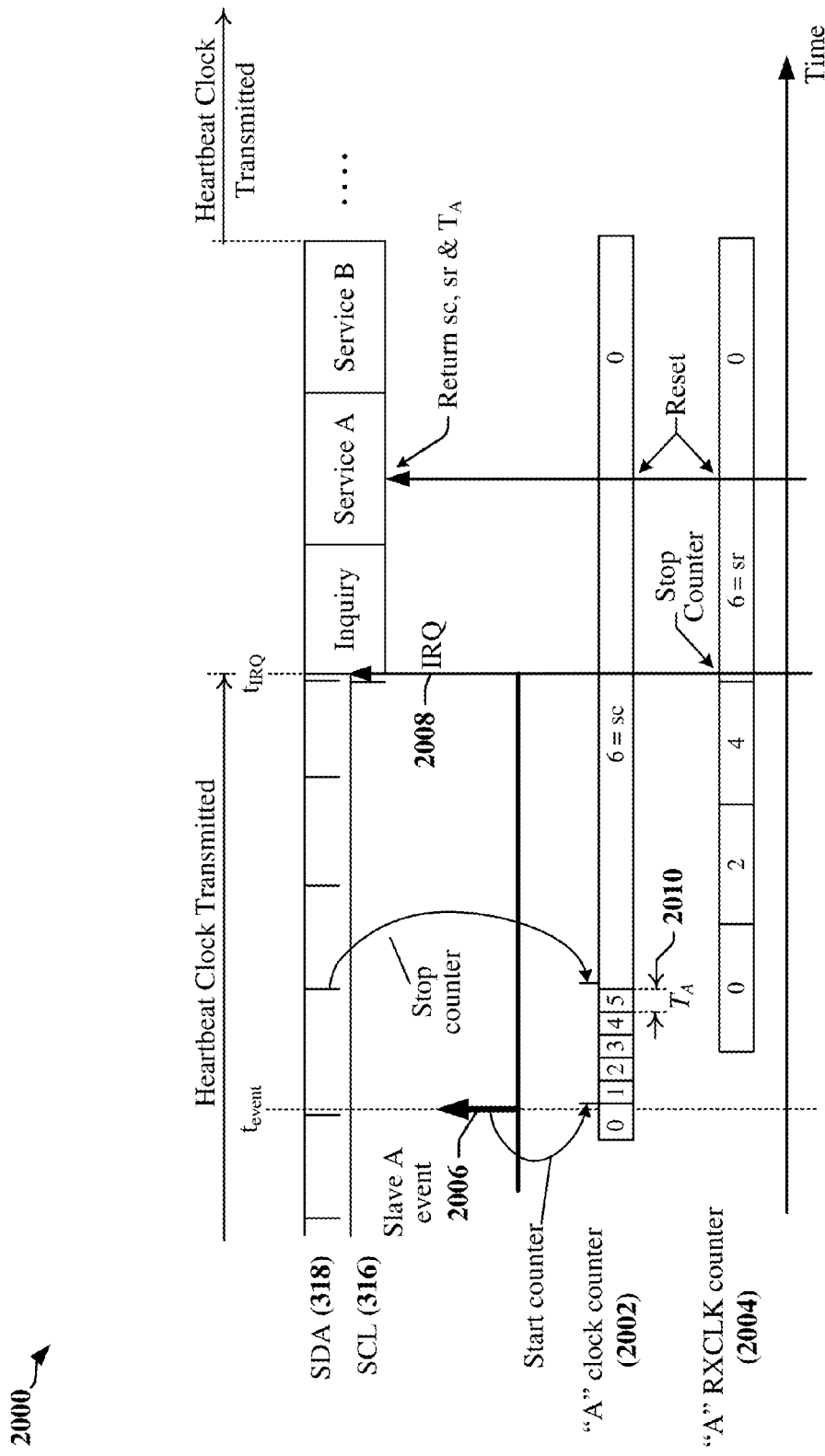
FIGS. 20-23 illustrate another example of a system that provides improved accuracy time stamps for in-band IRQs in accordance with certain aspects disclosed herein.

FIGS. 20-23 relate to a fourth example of a system that provides improved accuracy time stamps for IBIs. FIG. 20 illustrates the operation of a system that employs a combination of an RXCLK counter 2004 and a counter 2002 that counts cycles of an internal clock while in power saving mode. In one example, a slave device may count cycles of an internal system clock using the counter 2002 after an event 2006 is detected and until a pulse on the RXCLK is received. Cycles of the RXCLK may then be counted using the RXCLK counter 2004 until an IBI 2008 is asserted. The values of both counters 2002, 2004 may be reported to the bus master 704 during IRQ status read. The bus master 704 may calculate actual event time stamp from the values of the counters. For an event occurring at a time $t_{Event}$ and an IRQ occurring at a time $t_{IRQ}$, the slave device may report the value (sr) of the RXCLK counter 2004, the value (sc) of the internal clock counter 2002 and the period ($T_A$) 2010 of its internal clock. The bus master 704 may calculate the time stamp of the event as:

$$t_{Event} = t_{IRQ} - (sc + 0.5) \times T_A - \left(\frac{sr}{2} - 1\right) \times T_{CP}.$$

In some instances, the internal clock on a slave device may have an inconsistent period and/or may be unreliable and/or information related to the internal clock period may not be available for transmission to a bus master 704. In accordance with certain aspects disclosed herein, the period of the internal clock period may be dynamically measured.

In some examples, the counter 2002 that counts cycles of an internal clock may be used to count cycles of an internal system clock or another internal clock provided as needed for timing purposes.

Figure 21:
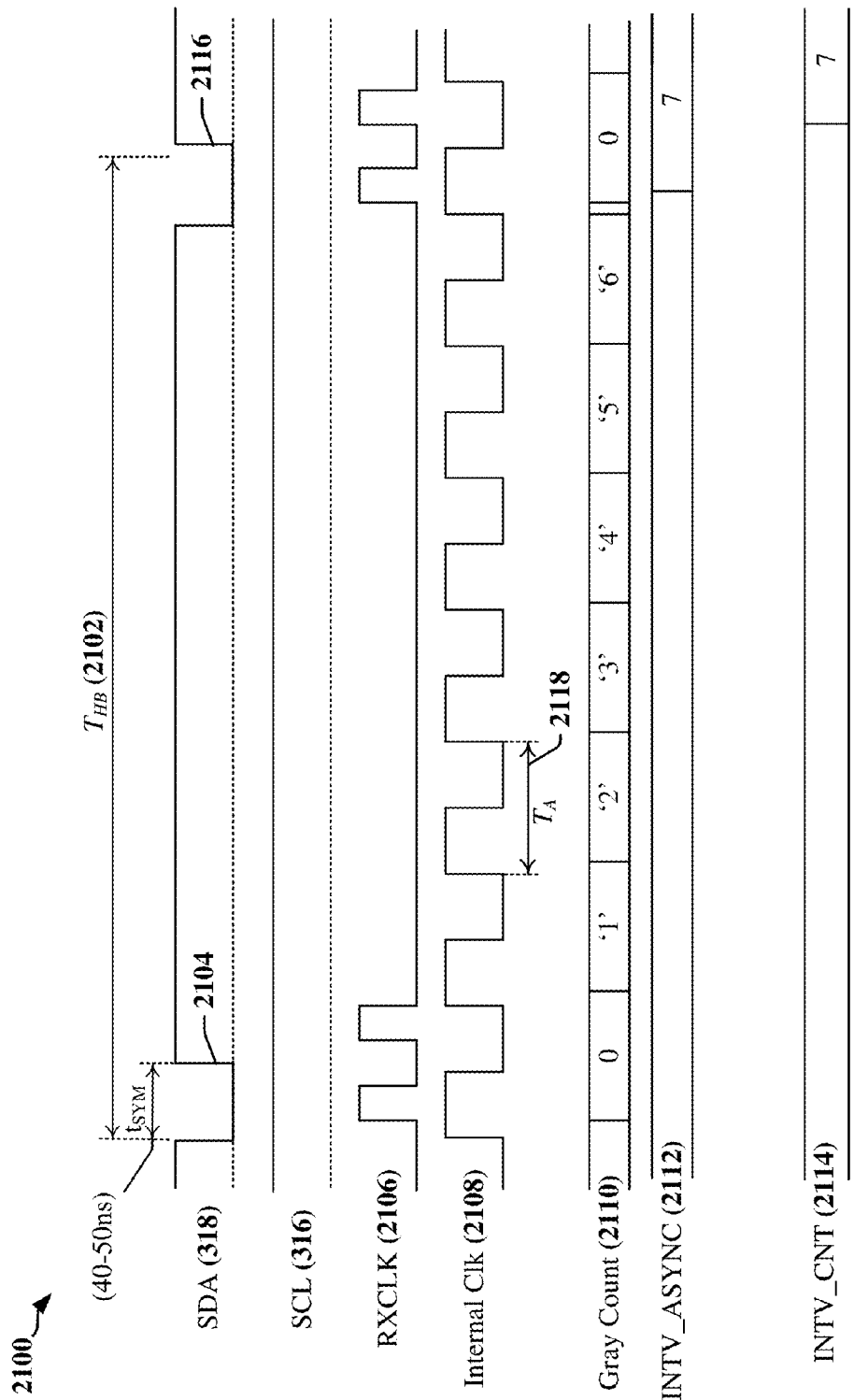

FIG. 21 illustrates a first example in which a slave device is adapted or configured to allow measurement of the clock period of an internal clock 2108. In this example, the slave device may count cycles of the internal clock 2108 using a counter 2110 that is reset by occurrence of a pulse on the receive clock (RXCLK) 2106. Responsive to a request from a bus master 704 or otherwise, the slave device may initiate a counter 2110 that counts the number of internal clock cycles between a pair of consecutive occurrences of a signaling state or condition, such as a start condition, an edge of the SCL 316 or SDA 318, or heartbeat pulses 2104, 2116. The slave device may report the value (INTV_CNT) of an interval counter 2114. The bus master 704 may calibrate the interval counter 2114 using an internal symbol clock period ($t_{sym}$) of the bus master 704. In one example, the bus master 704 may calculate the period ($T_A$) 2118 of the slave device internal clock 2108 as:

$$T_A = \frac{T_{HB} - t_{sym}}{\text{INTV\_CNT}}$$

In some instances, the counter 2110 counts cycles of an internal clock 2108 of the slave device. The slave device may be configured to continually or continuously use the counter 2110 to determine the duration of one or more signaling states or conditions on the serial bus by counting the number of cycles of the internal clock 2108. The slave device may provide measured durations of one or more signaling states or conditions to a bus master 704. In some instances, the slave device may determine and/or provide measurements of the duration of one or more signaling states or conditions in response to a command from the bus master 704. In one example, the slave device may respond to a request that causes the slave device to initiate a counter 2110 that counts a quantity of time that may be expressed as to the number of cycles of the internal clock 2108 between a consecutive pair of heartbeat pulses, a number of symbols, consecutive start conditions, or other serial bus events that are measurable and/or definable by the bus master 704 and the slave device. In some instances, the internal clock 2108 may be a free-running clock. In some instances, the internal clock 2108 may be provided for timing purposes. The bus master 704 may calibrate the internal clock 2108 of the slave device using the measurements obtained in response to the request transmitted by the bus master 704. In some instances, the slave device may measure the period of an RXCLK as a proxy for the timing of a symbol period.

Figure 22:
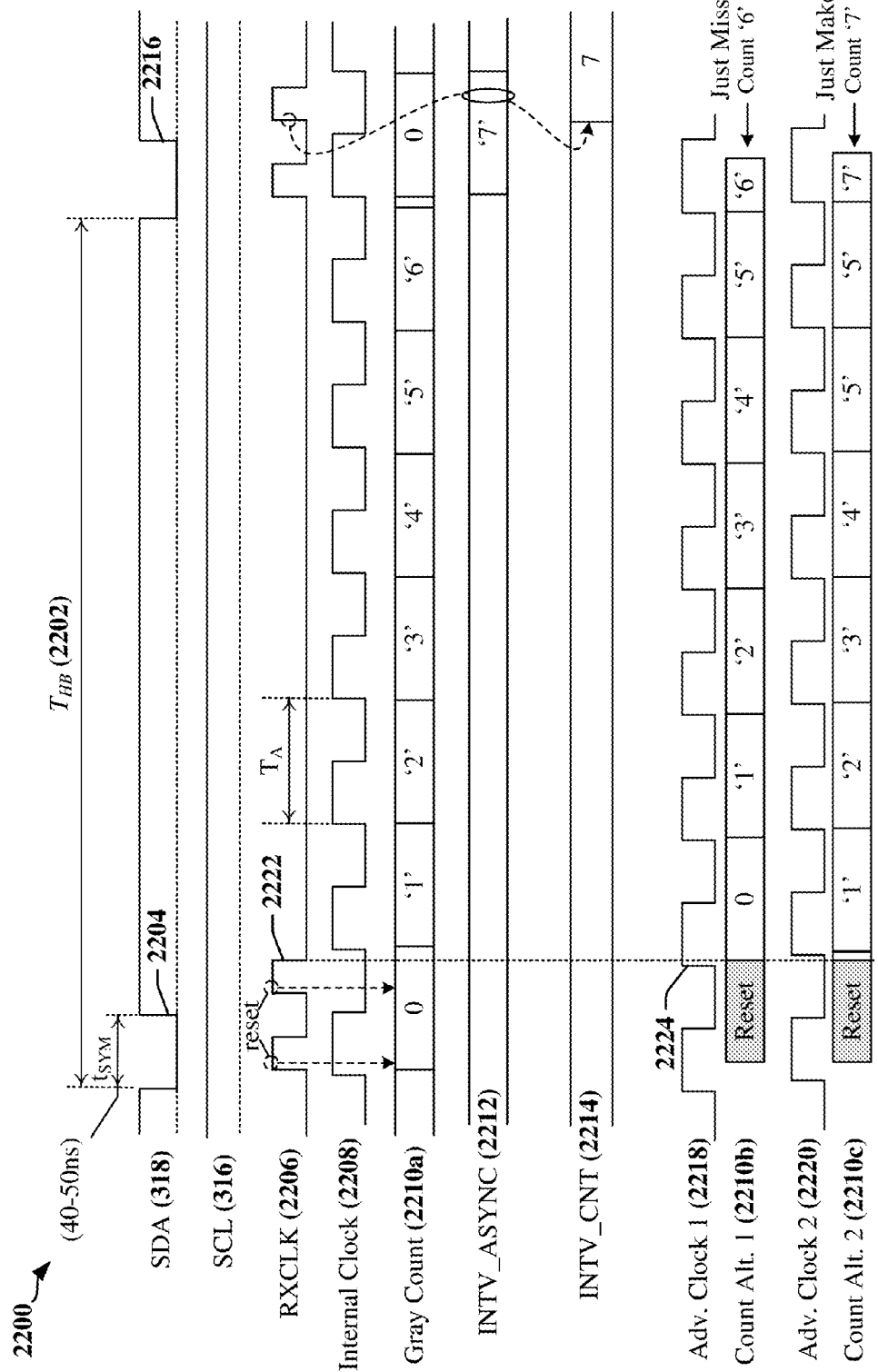

FIG. 22 illustrates a second example in which a slave device is adapted or configured to allow measurement of the clock period of an internal clock 2208. As in the example depicted in FIG. 21, in this example the slave device counts cycles of the internal clock 2208 using a counter to produce a count value 2210a that is reset by occurrence of a pulse on the receive clock (RXCLK) 2206. FIG. 22 also depicts counter values 2210b, 2210c obtained when the internal clock 2208 is phase-shifted such that edges occur slightly before or slightly after a falling edge 2222 of the RXCLK 2206. A first version of the internal clock 2208 is first advanced clock 2218 with edges occurring before the falling edge 2222 of the RXCLK 2206, and a second version of the internal clock 2208 is a second advanced clock 2220 with edges occurring before the falling edge 2222 of the RXCLK 2206.

In a nominal case, where the internal clock 2208 corresponds to the internal clock illustrated in FIG. 21, the slave device may initiate a counter in response to a request from a bus master 704, where the counter provides a count value 2210a that records the number of internal clock cycles between a pair of consecutive occurrences of a signaling state or condition, such as a start condition, an edge of the SCL 316 or SDA 318, or heartbeat pulses 2204, 2216. The slave device may report the value (INTV_CNT) of an interval counter 2214. The bus master 704 may calibrate the interval counter 2214 using an internal symbol clock period ($t_{sym}$) of the bus master 704. The count value 2210a represents the number of cycles of the internal clock 2208 of the slave device after the falling edge 2222 of the RXCLK 2206.

In a first example, a count value 2210b obtained using the first advanced clock 2218 has a different value than the count value 2210a obtained using the internal clock 2208 of the nominal case. The rising edge 2224 of the first advanced clock 2218 occurs before the falling edge 2222 of the RXCLK 2206, when the internal clock counter is in a reset condition. Accordingly, [count value 2210b]=[count value 2210a]−1. In a second example, a count value 2210c obtained using the second advanced clock 2220 has the same value as the count value 2210a obtained using the internal clock 2208 of the nominal case. The rising edge 2224 of the second advanced clock 2218 occurs just after the falling edge 2222 of the RXCLK 2206, and may increment the internal clock counter. Thus, it may be appreciated that short difference in phase shift (advance or delay) may produce different results in the reported count values 2210a, 2210b, 2210c.

Figure 23:
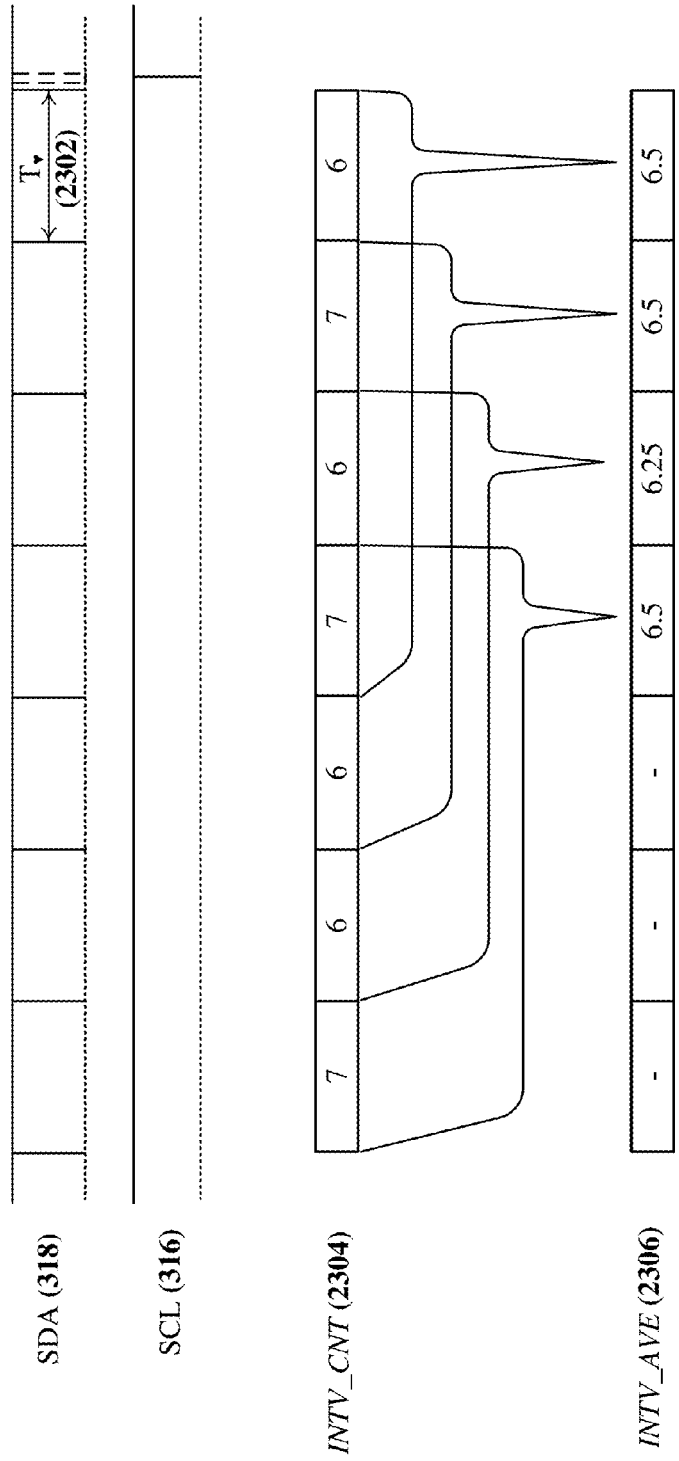

FIG. 23 illustrates an example 2300 that can minimize the effect of timing variability on INTV_CNT. In the example, running averages 2306 of a plurality of INTV_CNT values 2304 can be calculated. The example 2300 shows a sequence of six INTV_CNT values and a series of averaged values (INTV_AVE) 2306. Each averaged value 2306 may be calculated as the average of the four most recent INTV_CNT values and may be used as an estimate of the period of the internal clock of the slave device.

Figure 24:
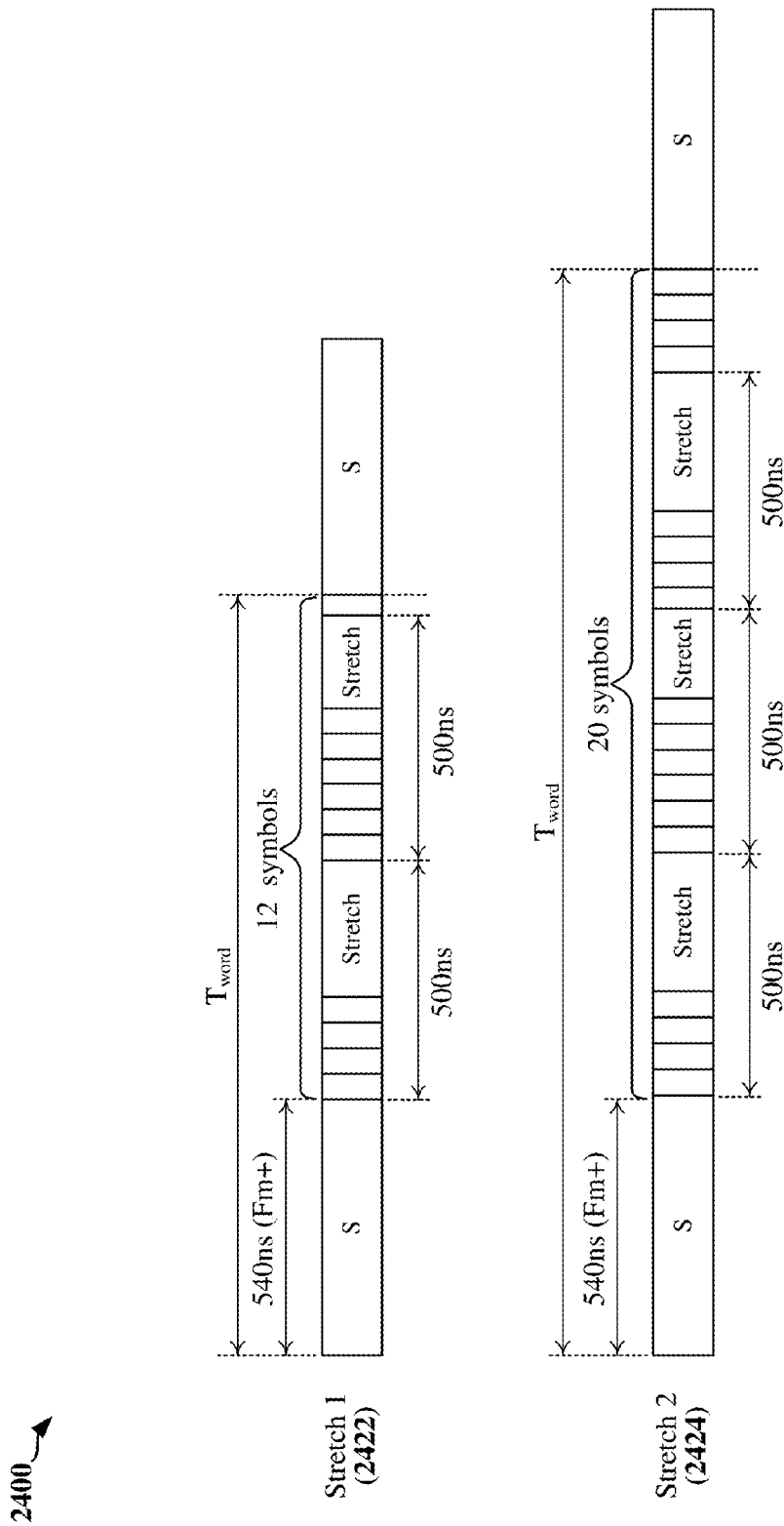
FIGS. 24 and 25 illustrate another example of a system that provides improved accuracy time stamps for in-band IRQs in accordance with certain aspects disclosed herein.
Figure 25:
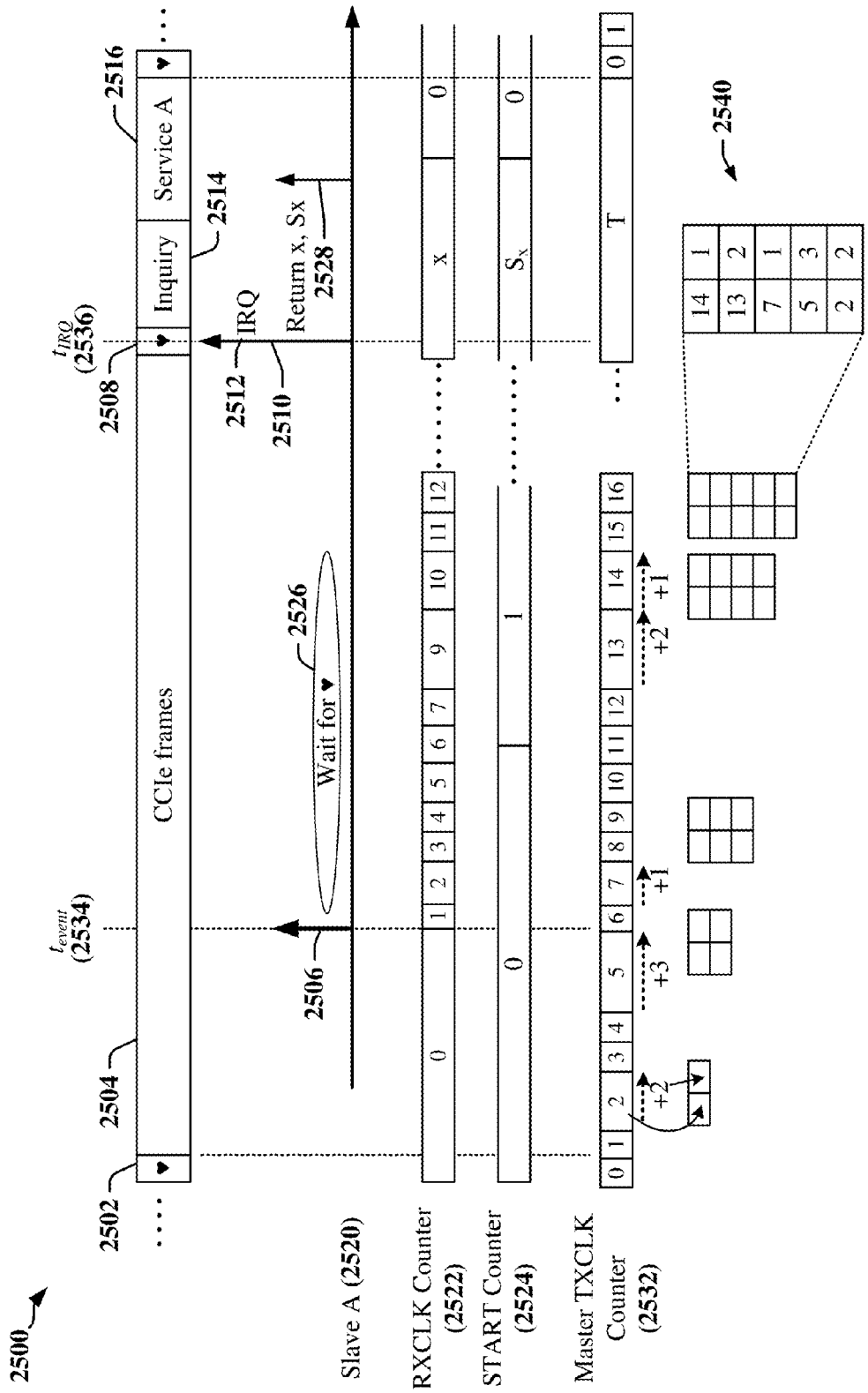

FIGS. 24 and 25 illustrate a fifth example in which a system provides improved accuracy time stamps for IBIs in accordance with certain aspects disclosed herein. This example may relate to a CCIe interface in which some symbols are stretched in time. Symbol stretching is illustrated in FIG. 24. Symbols may be stretched to avoid timing issues when legacy I2C devices are connected to the serial bus during CCIe transmission. The timing issues may include setup time violations observed by the I2C devices when certain combinations are transmitted in a sequence. CCIe supports 12 symbol and 20 symbol modes of operation and stretching may occur in either mode 2422, 2424. One effect of stretching is to introduce variability into RXCLK timing, which may degrade the accuracy of certain time stamp calculations that rely on RXCLK cycle counting by the slave device.

FIG. 25 illustrates an example 2500 in which a bus master 704 may account for stretched TXCLK cycles. In the example 2500, the slave device 2520 maintains an RXCLK counter 2522 and a START clock counter 2524 in a manner similar to that described in relation to the example depicted in FIG. 13. The bus master 704 keeps track of the number of cycles of a transmit clock (TXCLK) 2542 that are used to stretch symbols transmitted between in-band interrupt opportunities 2502, 2508. The extra clock cycles may be recorded in a data structure that relates symbol sequence numbers of stretched symbols to the number of extra TXCLK cycles in the stretched symbol. The data structure may be implemented as a linked list, a table and/or a database, for example. After an IRQ is asserted at a time ($t_{IRQ}$) 2536, the bus master 704 may receive the value (x) of the RXCLK counter 2522 representing a number of symbols received after the event and the value (Sx) of the START clock counter 2524. When calculating a time stamp ($t_{event}$) 2534, the bus master 704 may determine the symbol sequence number during which the event occurred and add the extra TXCLK clock cycles for each subsequent stretched symbol in the sequence. In one example, the number of additional TXCLK cycles may be summed to obtain a value $STR_{SUM}$, and then calculate the time stamp for the event as:

$$t_{event} = t_{IRQ} - t_{SYM} \times ((x + STR_{SUM}) - Sx) - t_{START} \times Sx.$$

The time stamp may be subject to a jitter of $\pm 0.5 \times (t_{START})$. In some examples, a jitter of 270 ns may be observed.

Figure 26:
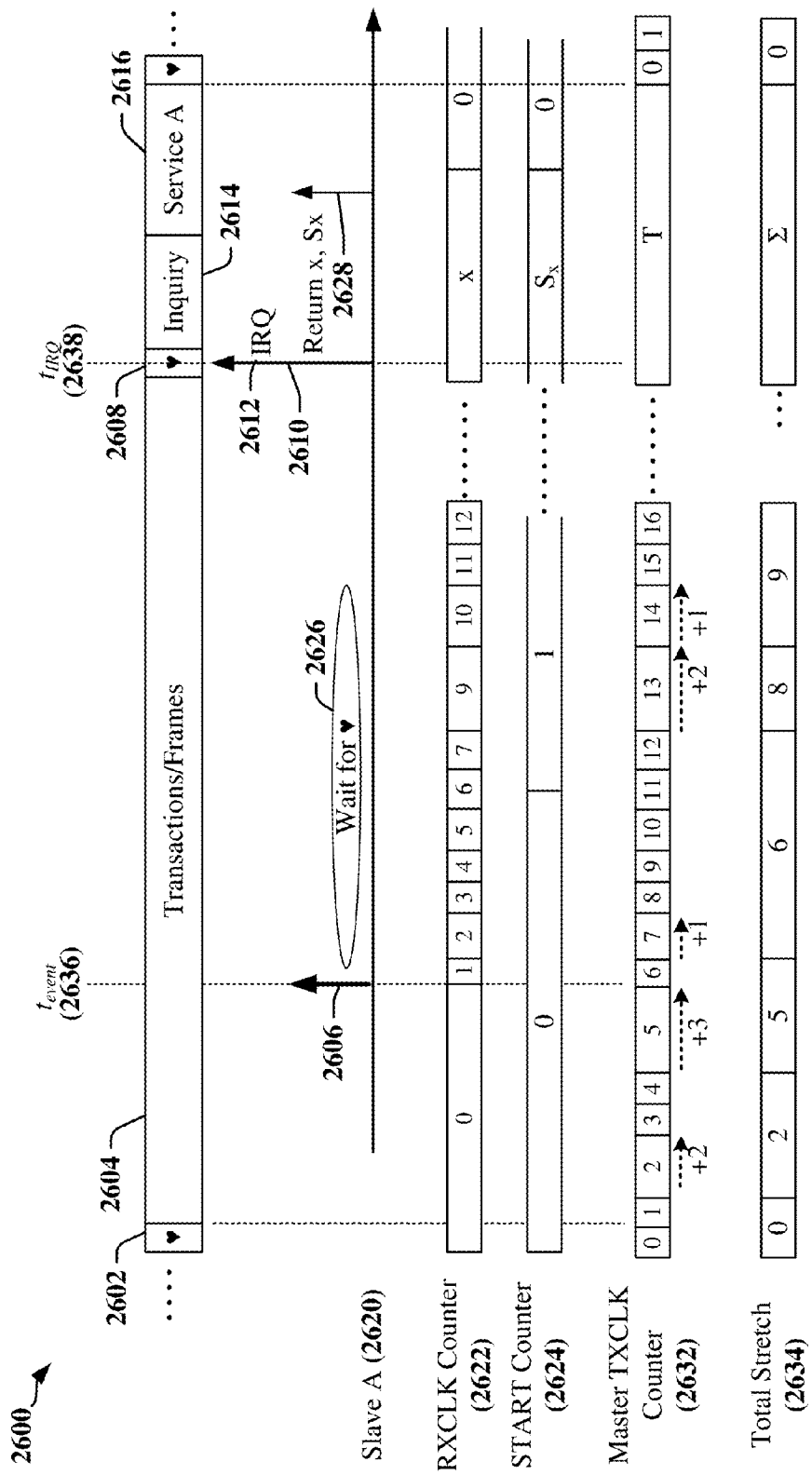
FIG. 26 illustrates another example of a system that provides improved accuracy time stamps for in-band IRQs in accordance with certain aspects disclosed herein.

FIG. 26 illustrates a sixth example in which a system provides improved accuracy time stamps for IBIs in accordance with certain aspects disclosed herein. This example may relate to a CCIe interface or other interface in which some symbols are stretched in time as illustrated in FIG. 24. Symbols may be stretched to avoid timing issues when legacy I2C devices are connected to the serial bus during high-speed transmission. The timing issues may include setup time violations observed by the I2C devices when certain combinations are transmitted in a sequence. For example, CCIe supports 12 symbol and 20 symbol modes of operation and stretching may occur in either mode 2422, 2424. One effect of stretching is to introduce variability into RXCLK timing, which may degrade the accuracy of certain time stamp calculations that rely on RXCLK cycle counting by the slave device.

FIG. 26 illustrates an example 2600 in which a bus master 704 may account for stretched TXCLK cycles. The slave device 2620 maintains an RXCLK counter 2622 and a START clock counter 2624 in a manner similar to that described in relation to the example depicted in FIG. 13. The bus master 704 keeps a running total 2634 of the number of cycles of a transmit clock (TXCLK) 2632 that are used to stretch symbols transmitted between in-band interrupt opportunities 2602, 2608. For the purpose of calculating the time stamp for the event 2606, the total number of cycles of the TXCLK 2632 used to stretch symbols may be averaged over the total number (T) of symbols transmitted. After an IRQ is asserted at a time $t_{IRQ}$, the bus master 704 may receive the value (x) of the RXCLK counter 2622 representing a number of symbols received after the event and the value (Sx) of the START clock counter 2624. When calculating a time stamp ($t_{event}$), the bus master 704 may determine the symbol sequence number during which the event occurred and add the extra TXCLK clock cycles for each subsequent stretched symbol in the sequence. In one example, the number of additional TXCLK cycles may be summed to obtain a value $STR_{AVE}$ and then calculate the time stamp for the event as:

$$t_{event} = t_{IRQ} - t_{SYM} \times \left(\left(1 + \frac{STR_{AVE}}{T}\right) \times (x - Sx)\right) - t_{START} \times Sx.$$

The time stamp may be subject to indeterminate jitter.

Figure 27:
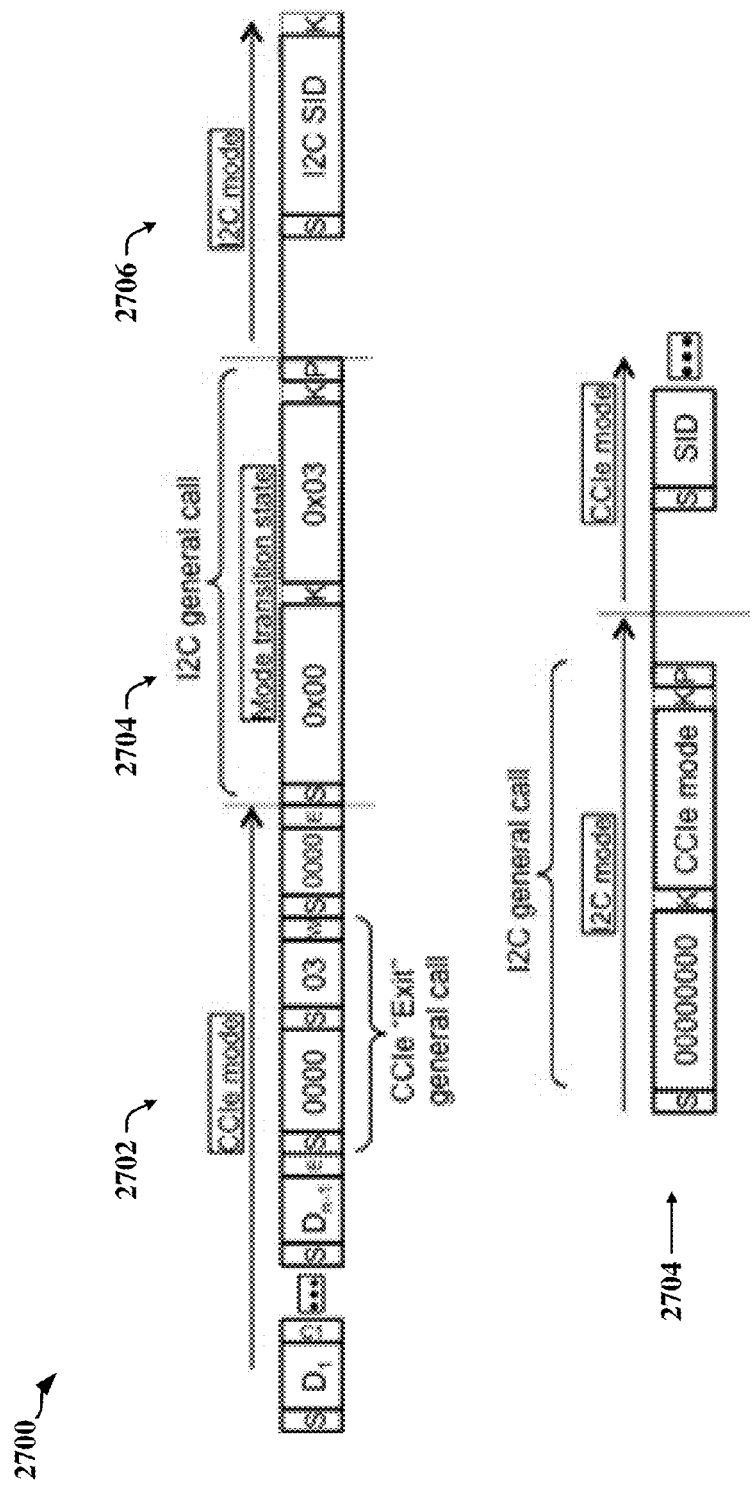
FIGS. 27-29 illustrate another example of a system that provides improved accuracy time stamps for in-band IRQs in accordance with certain aspects disclosed herein.
Figure 28:
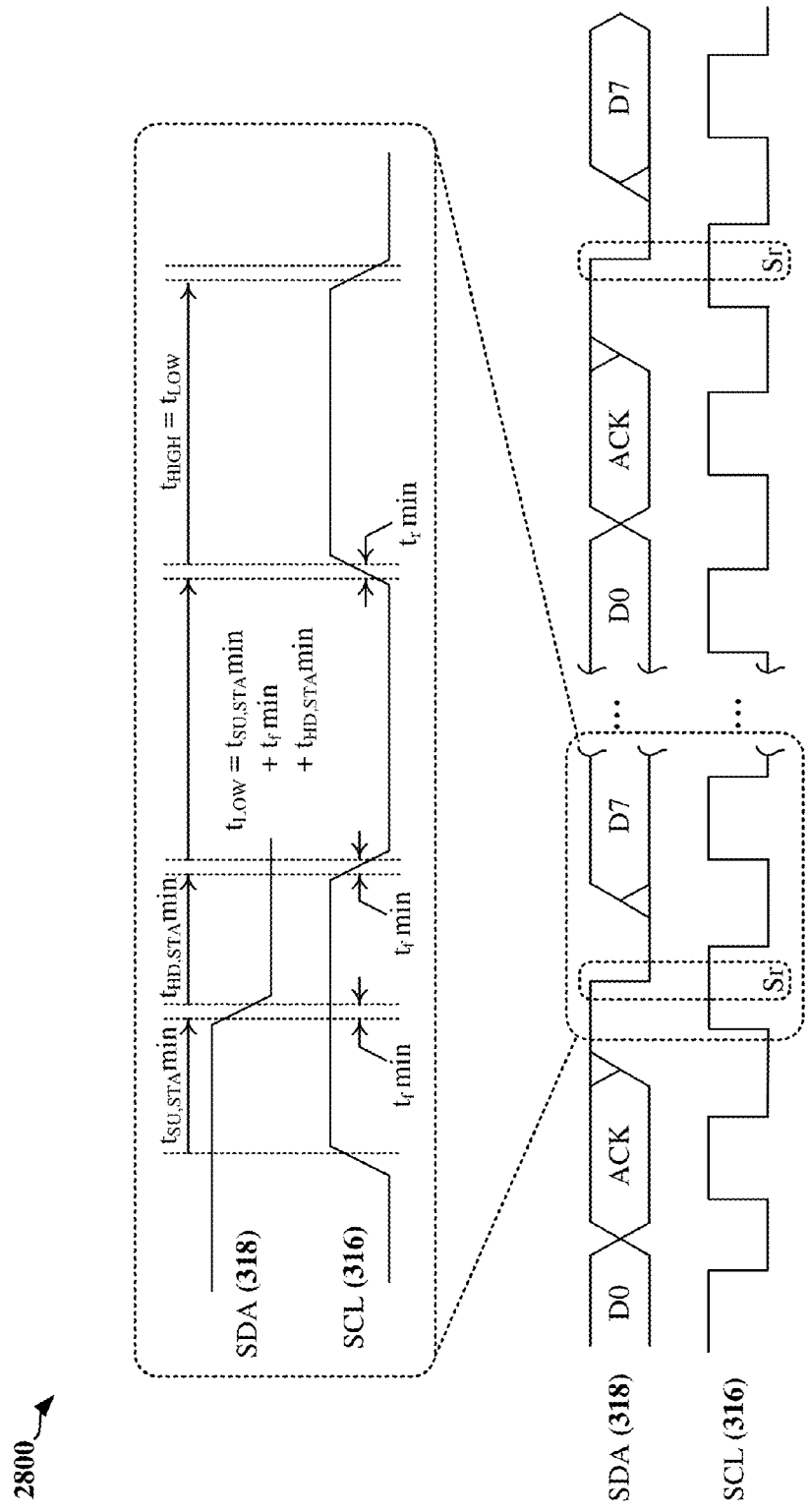
Figure 29:
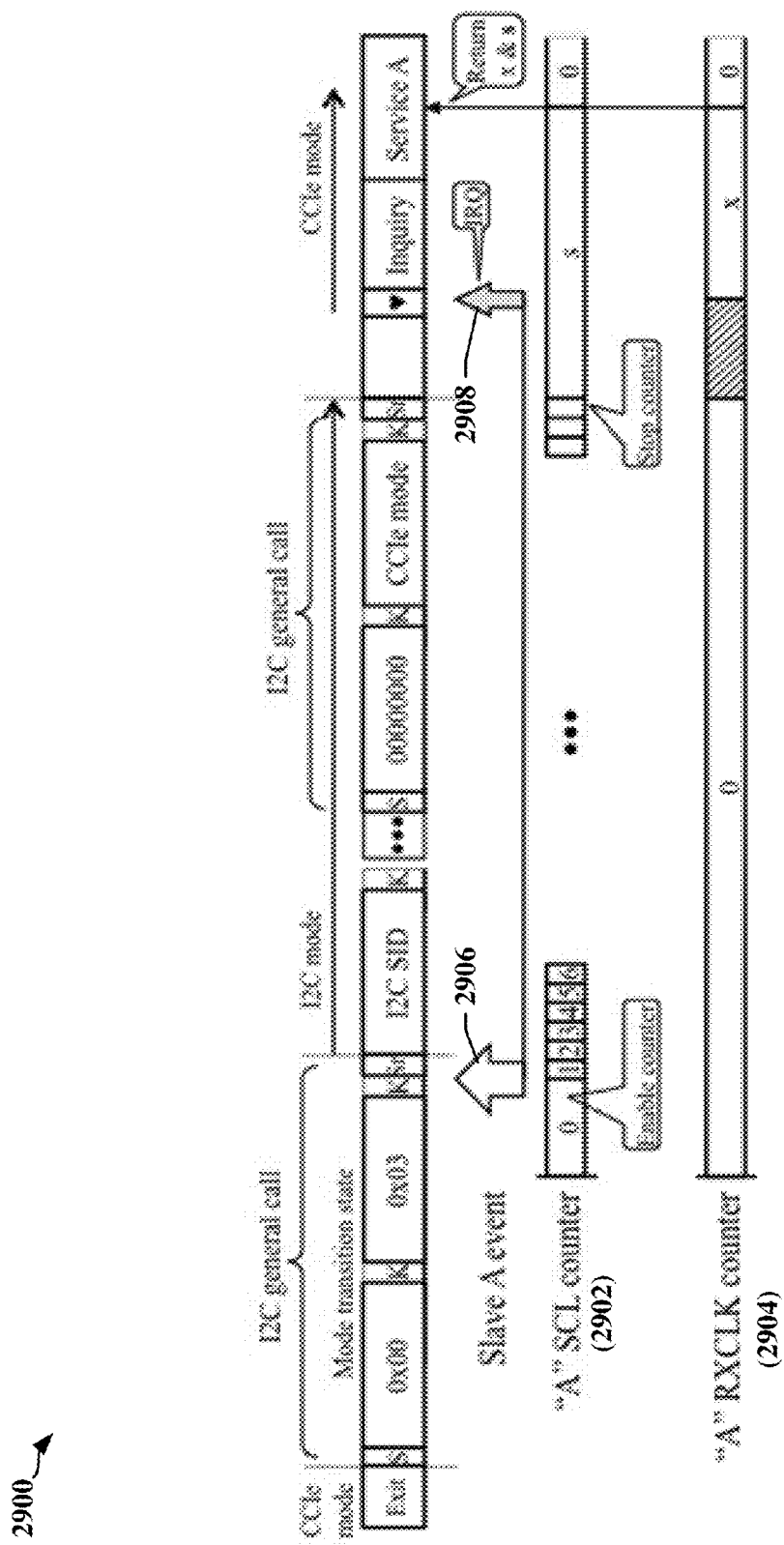

FIGS. 27-29 illustrate a seventh example in which a system provides improved accuracy time stamps for IBIs in accordance with certain aspects disclosed herein. This example may relate to a serial bus 702 that supports two or more modes of communication. For example, the serial bus 702 may operate interchangeably in I2C and CCIe modes. As illustrated in FIG. 27 and with further reference to FIG. 7, changes in the mode of operation of the serial bus 702 may be accomplished using a general call 2704 transmitted in I2C mode. For example, a general call 2704 may be transmitted after a CCIe mode transmission 2702 in order to initiate the I2C mode 2706 of operation. Slave devices do not generate a receive clock (RXCLK) in I2C mode and any time stamp calculations may be compromised by switches between CCIe mode 2702 and I2C mode 2706 occur after an event is detected but before a corresponding IRQ is asserted.

With reference also to FIG. 28, I2C mode supports only a single master. Other protocols, including CCIe, may support multiple bus masters. A bus master operating as an I2C bus master can determine I2C timing. An I2C unit interval (UI) may be defined as including the period when the SCL is low, the period when the SCL is high, the start condition, and the stop condition. The P period may be configured for 2UI and an interrupting slave device may count SCL toggles during I2C mode. In some instances, the bus master may be configured to use a period based on repeated start conditions (Sr) instead of the P period. The resulting SCL counter value may be reported to the bus master 704 during an IRQ status read.

According to certain aspects, a slave device may operate two or more counters when the serial bus 702 is operable in multiple modes of communication. For example, a first counter may be configured to count pulses on a clock signal transmitted over the serial bus 702 when the serial bus 702 is operated in a first mode of communication, and a second counter may be adapted to count pulses on a clock generated from transmissions other than a clock signal when the serial bus 702 is operated in a second mode of communication. In a CCIe example, the second counter may count transitions between symbols transmitted on the serial bus 702, while the first mode of communication may be an I2C mode of communication. With reference now to FIG. 29, a slave device may enable an SCL counter 2902 when an event 2906 is detected in I2C mode. The SCL counter may be disabled at the end of the I2C mode. When the bus master 704 responds to the IRQ 2908, the slave device may report the value of the SCL counter 2902 to the bus master 704. In some instances, the slave device may employ an SCL counter 2902 that counts only rising edges of the SCL or only falling edges of the SCL (i.e. the SCL counter 2902 counts 2UI periods).

Figure 30:
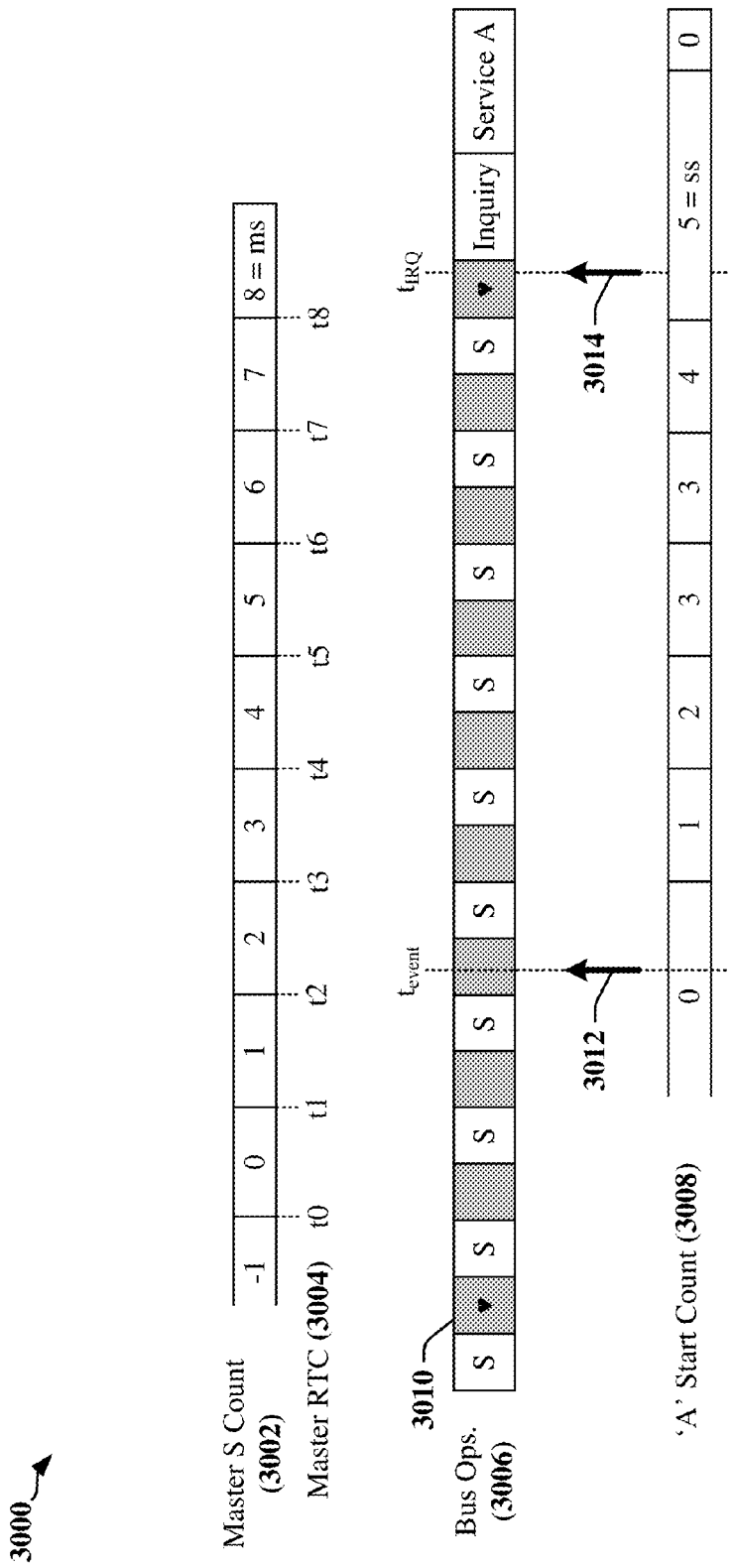
FIG. 30 illustrates another example of a system that provides improved accuracy time stamps for in-band IRQs in accordance with certain aspects disclosed herein.

FIG. 30 illustrates an eighth example 3000 in which slave devices coupled to a symbol-based interface may generate improved accuracy time stamps for IBIs in accordance with certain aspects disclosed herein. In this example 3000 the bus master 704 may use a counter 3002 to count start conditions (S) and may record a start time for each word transmitted after an in-band interrupt opportunity 3010. The start times for the symbols may be recorded as real-time clock values 3004. The slave device may maintain a count 3008 of start conditions after the occurrence of an event 3012 and before the IRQ 3014 is asserted. The bus master may then determine the start time of the symbol during which the event 3012 occurs and the start of the following symbol using recorded real-time clock values 3004. The time stamp of the event may then be calculated using a midpoint of the symbol during which the event 3012 occurred. The time stamp may be calculated as:

$$t_{event} = (t[ms-ss] + t[ms-ss-1])/2.$$

In this example, the event 3012 occurs between t2 and t3, and this information is needed by the bus master when IRQ 3014 occurs. The difference between ms and ss immediately tells master which recorded is the right timestamp for the event 3012.

Figure 31:
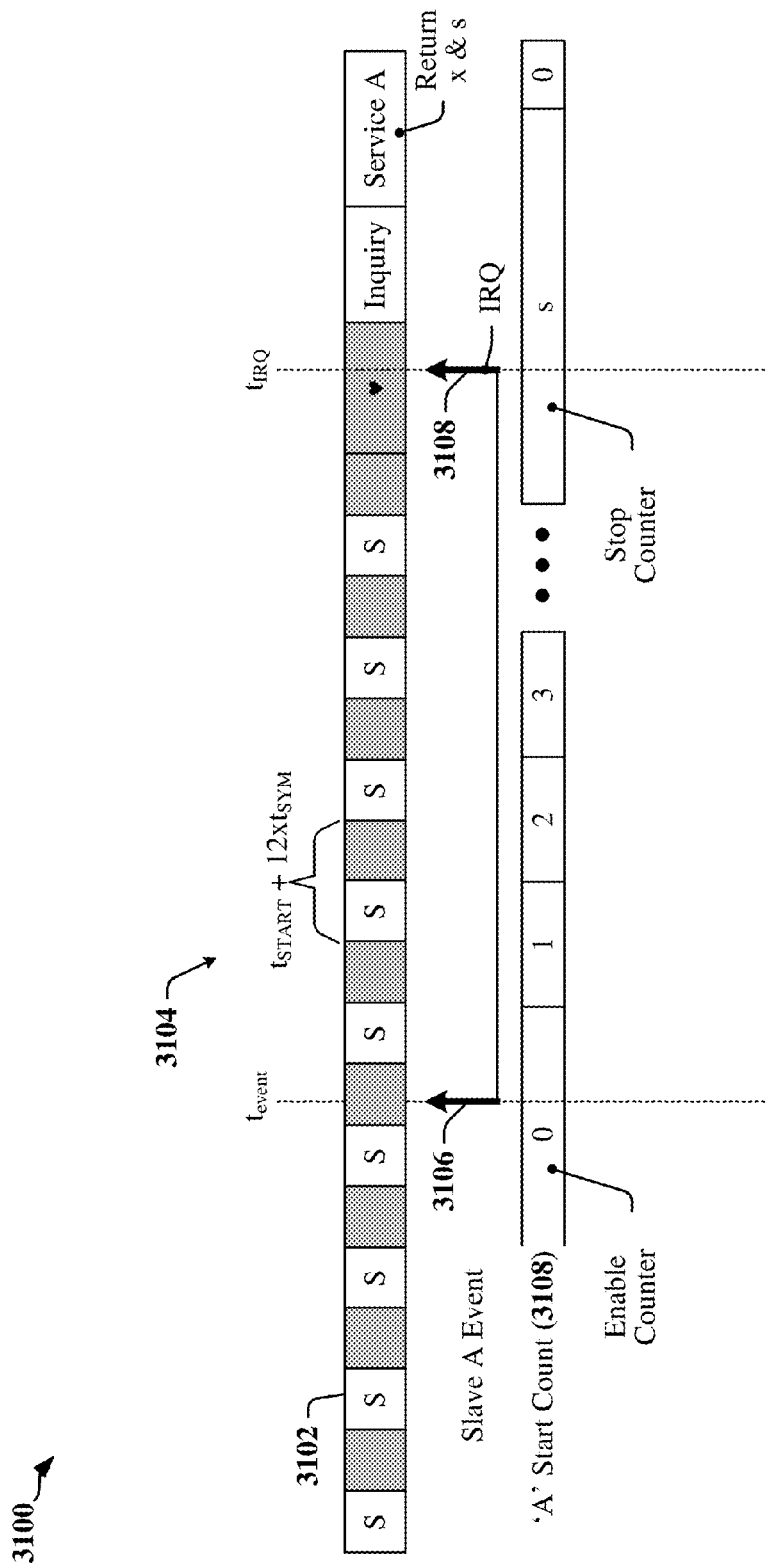
FIGS. 31 and 32 illustrate another example of a system that provides improved accuracy time stamps for in-band IRQs in accordance with certain aspects disclosed herein.
Figure 32:
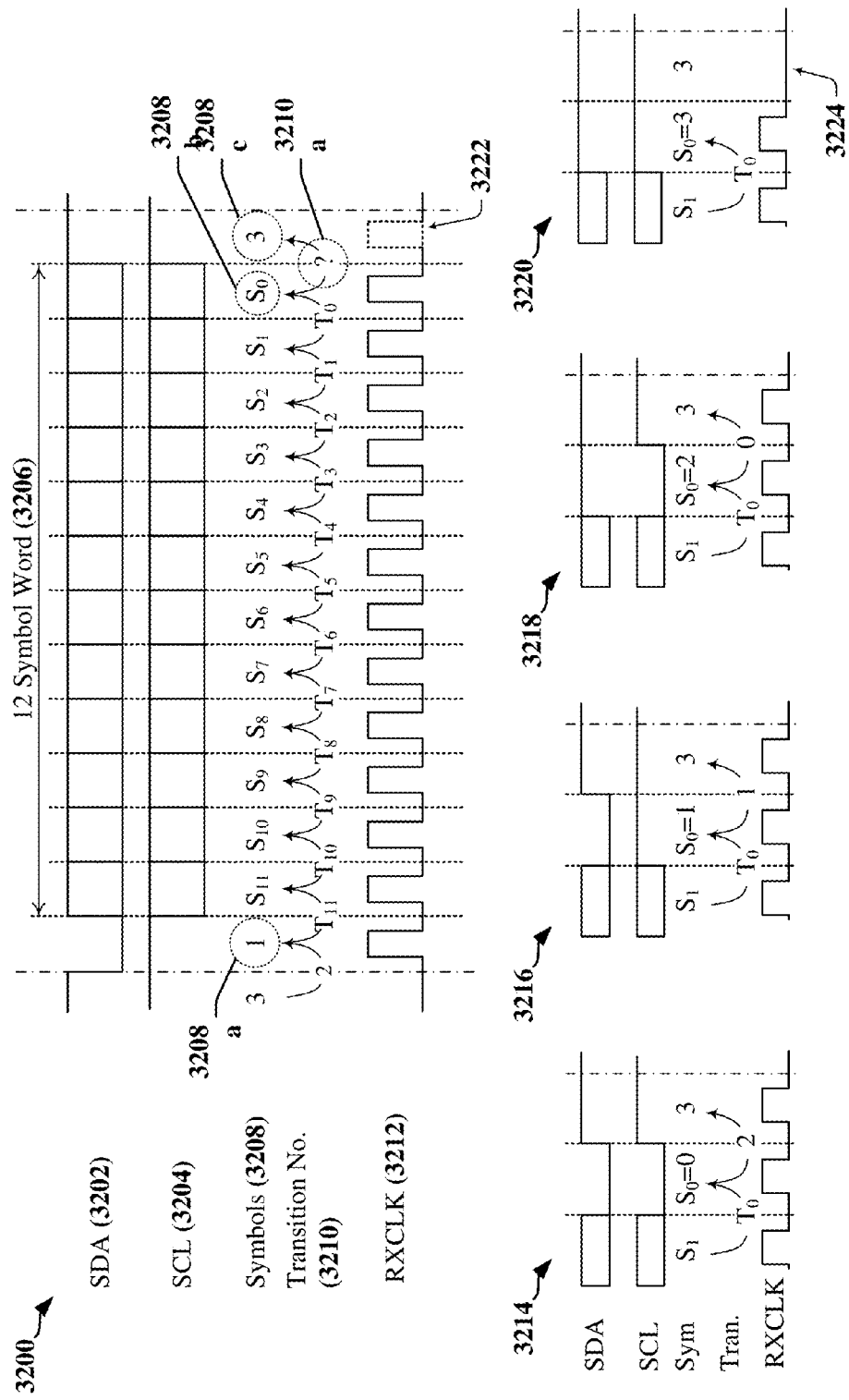

FIGS. 31-32 illustrate a ninth example in which a system provides improved accuracy time stamps for IBIs in accordance with certain aspects disclosed herein. As illustrated in FIG. 31, the slave device may be configured to count start conditions 3102 and the period 3104 between start conditions may be assumed to have a duration of to $t_{START} + 12 \times t_{SYM}$. A start counter may be initiated after occurrence of an event 3106 and stopped at the assertion of on IRQ 3108. The time stamp may be calculated as:

$$t_{event} = t_{IRQ} - (t_{START} + 12 \times t_{SYM}) \times (s+1).$$

As illustrated in FIG. 32, certain high-speed interface implementations, including CCIe, may shorten average symbol length based on signaling conditions at the end of a symbol. In such implementations, a bus master 704 may be configured to refrain from shortening symbols when accurate time stamps are required.

Figure 33:
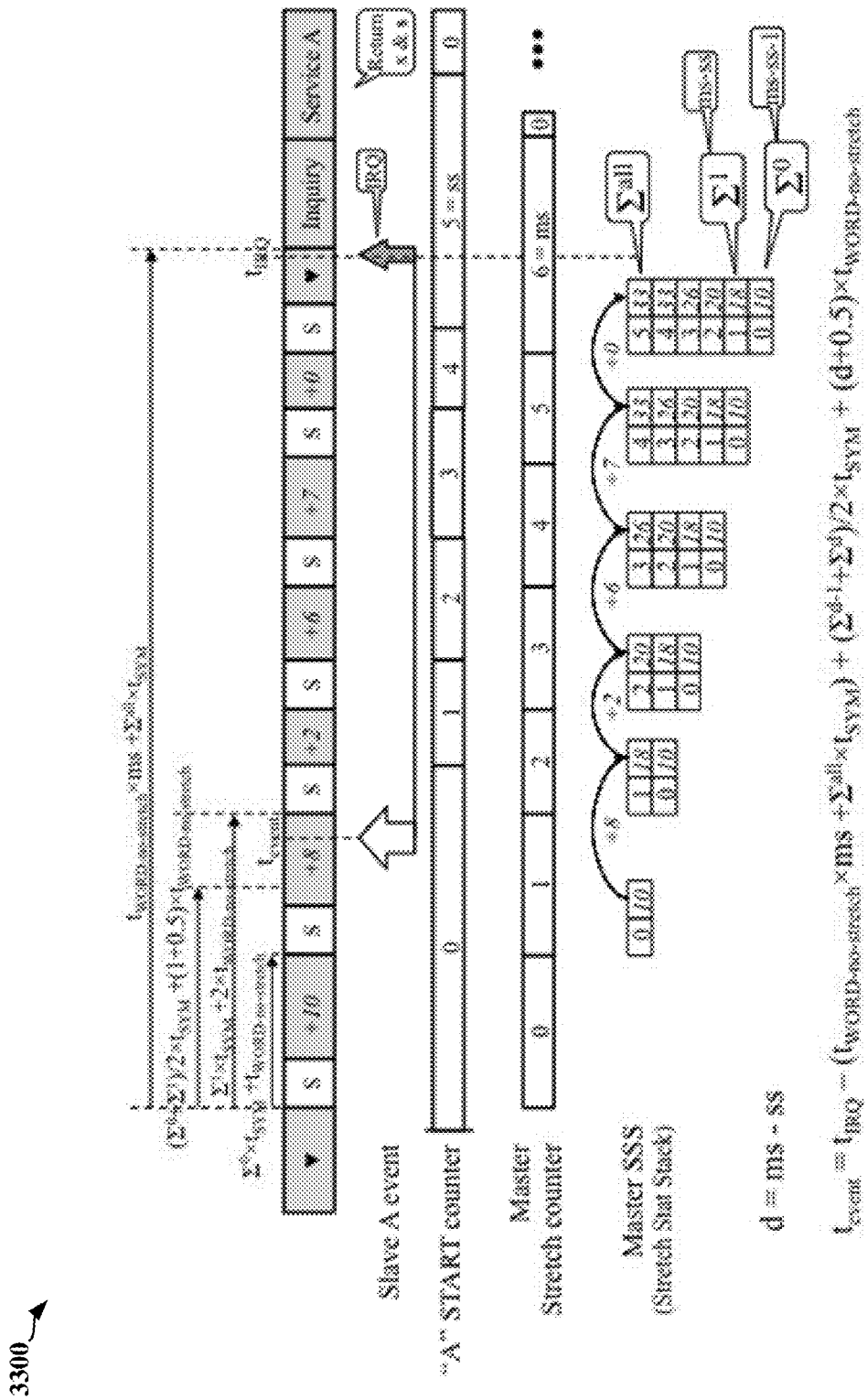
FIG. 33 illustrates another example of a system that provides improved accuracy time stamps for in-band IRQs in accordance with certain aspects disclosed herein.

FIG. 33 illustrates a tenth example in which a system provides improved accuracy time stamps for IBIs in accordance with certain aspects disclosed herein. FIG. 33 relates to an implementation in which symbol stretching occurs when time stamp calculation is based on a start counter. In such instances, the bus master may record the number of additional TXCLK cycles added to stretched symbols, as discussed in relation to FIG. 25. In this instance, the time stamp may be calculated as $$t_{event} = t_{IRQ} - (t_{WORD\text{-}no\text{-}stretch} \times ms + \Sigma^{all} \times t_{SYM}) + (\Sigma^{d-1} + \Sigma^{d})/2 \times t_{SYM} + (d+0.5) \times t_{WORD\text{-}no\text{-}stretch}.$$

Figure 34:
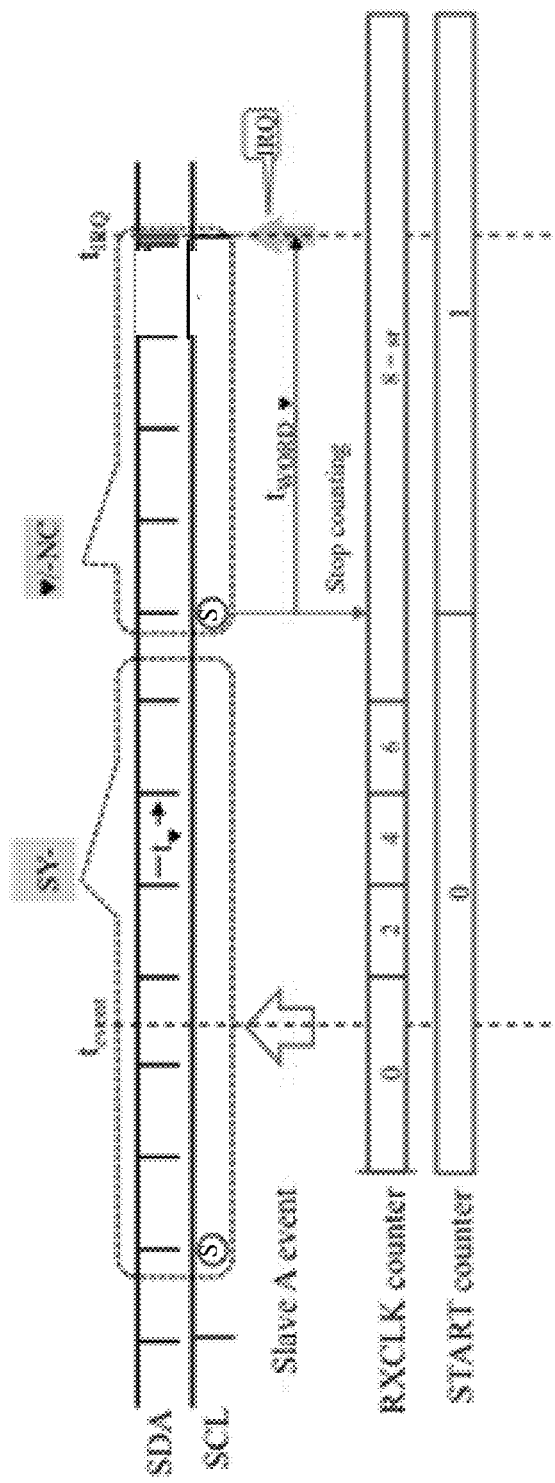
FIGS. 34 and 35 illustrate another example of a system that provides improved accuracy time stamps for in-band IRQs in accordance with certain aspects disclosed herein.
Figure 35:
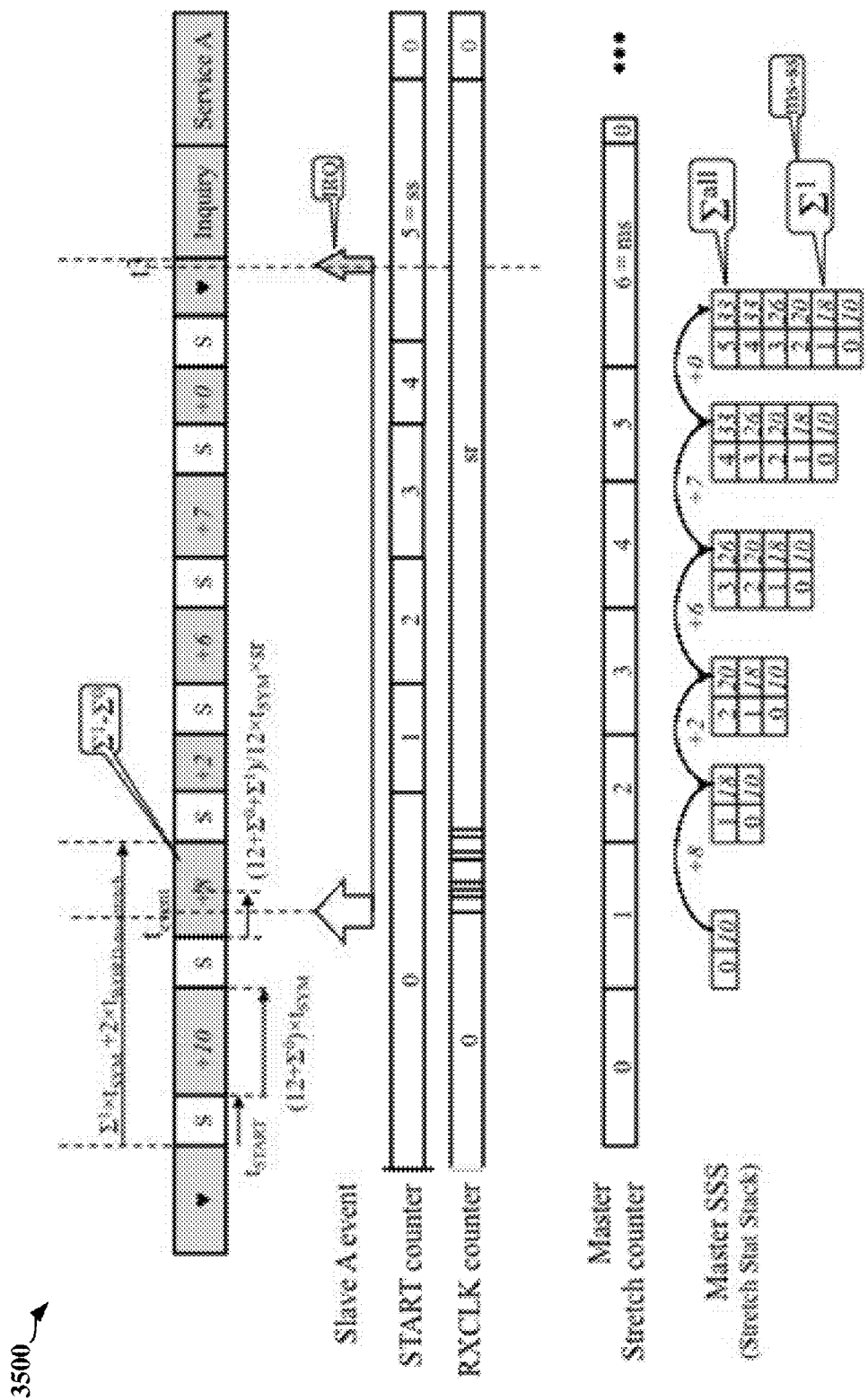

FIGS. 34 and 35 illustrate an eleventh example in which a system provides improved accuracy time stamps for IBIs in accordance with certain aspects disclosed herein. This example may extend the example described in FIG. 33 by supporting low jitter time stamping during power saving modes of operation. A slave device may be adapted or configured to RXCLK cycles until the first start condition is detected, and the bus master 704 may recover an exact time-stamp of the IRQ event accordingly.

In one example (see FIG. 34), the bus master 704 may calculate the time stamp as:

$$t_{event} = t_{IRQ} - t_{WORD\_♥} - t_♥ \times (0.5 + sr/2).$$

In another example (see FIG. 35), the bus master 704 may calculate the time stamp as:

$$t_{event} = t_{IRQ} - (t_{WORD\text{-}no\text{-}stretch} \times ms + \sum\nolimits^{all} \times t_{SYM}) + t_{START} + (12 + \Sigma^0) \times t_{SYM} + t_{START} + (12 + \Sigma^0 + \Sigma^1)/12 \times t_{SYM} \times sr.$$

In some instances, the bus master 704 may refrain from using this calculation because a 1×word time is in the order of a microsecond which can provide a time-stamp with sufficient accuracy.

Figure 36:
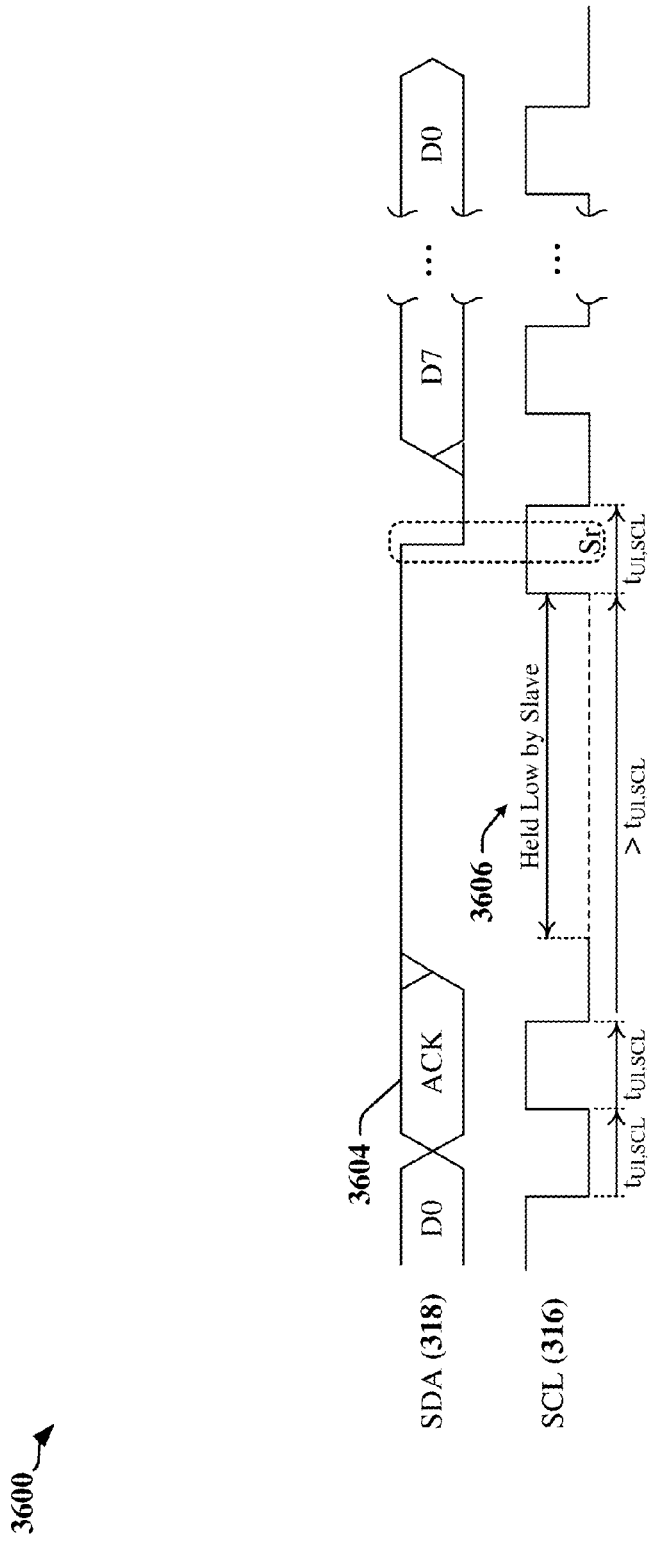
FIGS. 36 and 37 illustrate another example of a system that provides improved accuracy time stamps for in-band IRQs in accordance with certain aspects disclosed herein.
Figure 37:
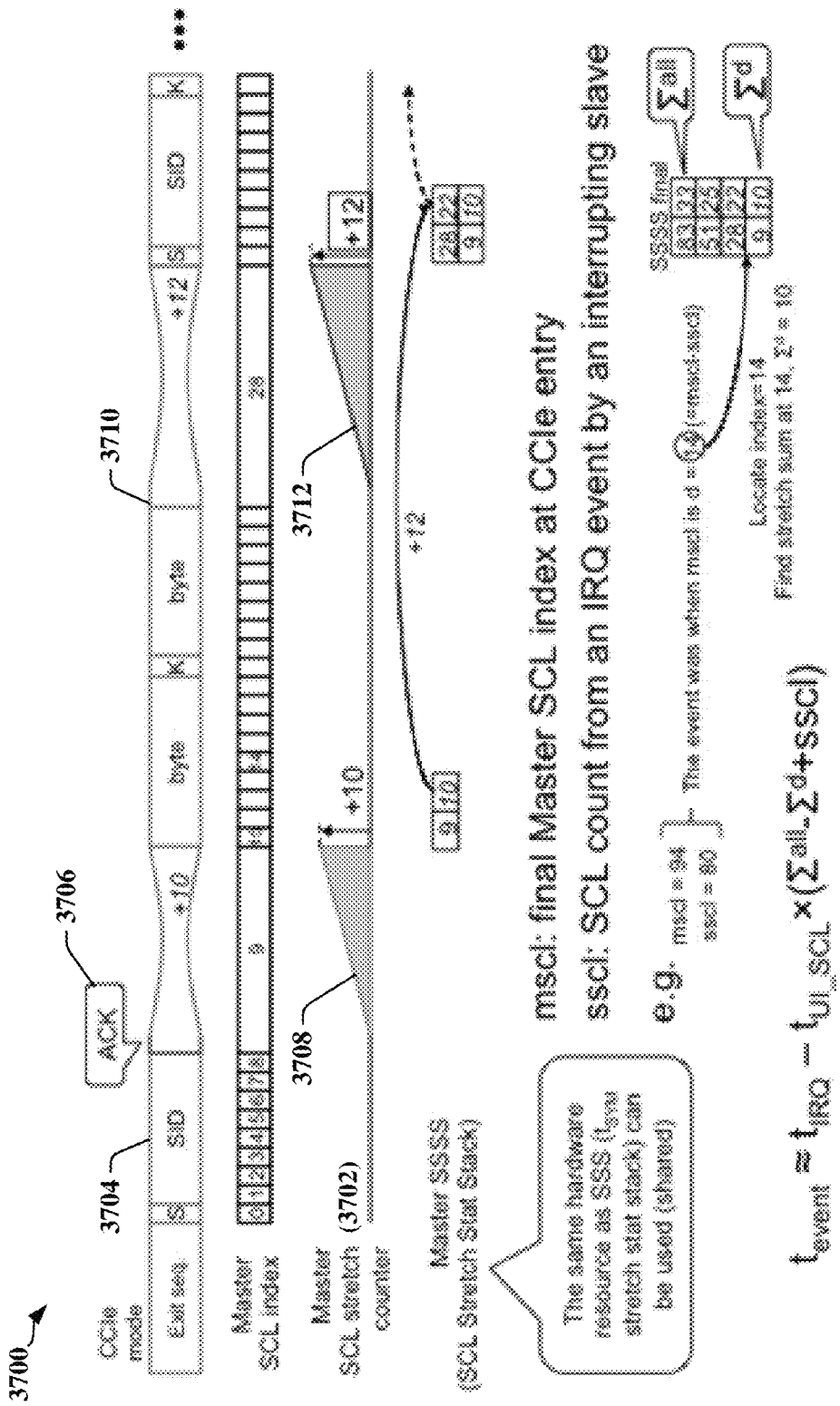

FIGS. 36 and 37 illustrate a twelfth example in which a system provides improved accuracy time stamps for IBIs in accordance with certain aspects disclosed herein. This example may relate to a CCIe interface in which a byte-level SCL stretch is provided. As illustrated in FIG. 36, byte-level stretch may occur when a slave device holds the SCL 3602 low after an acknowledgement (ACK) bit 3604 is transmitted. The ACK bit 3604 is the last bit of a transmission and, accordingly stretching can occur once for each byte, and for a desired period of time 3606. The slave device may employ byte-level stretching in order to extend a cycle of the clock transmitted on the SCL.

According to certain aspects disclosed herein, a bus master 704 can utilize a time-stamp to provide accurate time stamps when byte-level stretching is enabled. Time stamps may be calculated in a manner similar to that described in relation to $t_{SYM}$ stretching. The bus master 704 may record accumulation of stretch length unit SCL period after every ACK bit 3604. In some instances, the bus master 704 may record start times of each byte using a real-time clock, and may then calculate time stamps using the start times and one or more offsets provided as counter values. When byte-level stretch is used, the bus master may monitor the SCL clock period using an internal counter.

FIG. 37 illustrates one example of the monitoring of SCL clock period. In this example, a bus master 704 maintains a byte-level stretch counter 3702 that tracks the occurrence of byte-level stretching. Here, the serial bus may be transitioned from a CCIe mode of operation to an I2C mode of operation. The bus master 704 may transmit a slave identifier (SID) 3704 and a corresponding slave device may respond by driving the SDA with an ACK bit 3706. The slave device may then drive the SCL low to prolong the current SCL clock cycle. The byte-level stretch counter 3702 may be initiated during the ACK bit 3706 and may produce a counter value 3708. The byte-level stretch counter 3702 provides counter values 3712 for stretches that occur during subsequent ACK bits 3710. The bus master may record the counter value, together with information identifying the byte transmission, the ACK or some other landmark such that time stamps can be adjusted for stretch durations when a slave device provides a count of the number of SCL cycles, bytes, start conditions, etc.

Certain serial bus interfaces, including CCIe interfaces operate as source synchronous symbol transition clocking systems. In the example of a CCIe interface, a transmitter transmits clock information embedded within the data. Accordingly, each transmitter employs its own internal transmit clock. In some instances, a global clock read may be performed using an IRQ group inquiry, whereby the SCL is toggled while each CCIe slave device masks. The slave devices may be permitted to drive the SDA during this global clock read procedure.

The IRQ group inquiry is a procedure that extends over a plurality of symbol periods and that permits multiple slaves with different RXCLK timing to drive the SDA within the same time slot. The slave devices may mask the SDA signal from their respective clock and data recovery circuits. The timing of the response by a slave device to a global clock read command issued by the bus master 704 is dependent on the slave device transmit clock. The bus master may include calibration logic that measures the response of a slave device with respect to the symbol clock used by the bus master 704. The calibration logic can be used to determine the offset between edges of the symbol clock of the bus master 704 and edges of the transmit clock.

In some instances, differences in timing between respective internal clocks the bus master 704 and a slave device may be accommodated using the global clock read procedure. When determining timestamps, inaccuracies related to different timing of the internal clocks may be exacerbated when stretching is employed in 12 symbol and 20-symbol modes of operation of a CCIe interface. For example, the size of memory required to record past stretch counts at the slave device may be prohibitive. According to certain aspects, reads may be limited to global clock read for 12 symbol and 20 symbol modes that stretch symbols. Legacy I2C devices connected to a serial bus operating in CCIe mode do not recognize the mention is that since SCL toggles are always one symbol period (50 ns) in duration, and since legacy I2C devices filter such short-duration pulses, the legacy I2C slave devices do not see the low pulse on the SCL and may consider that the SCL is stuck in a high condition. Accordingly, the bus master 704 may avoid stretching the symbol clock when a global clock read procedure is used.

Figure 38:
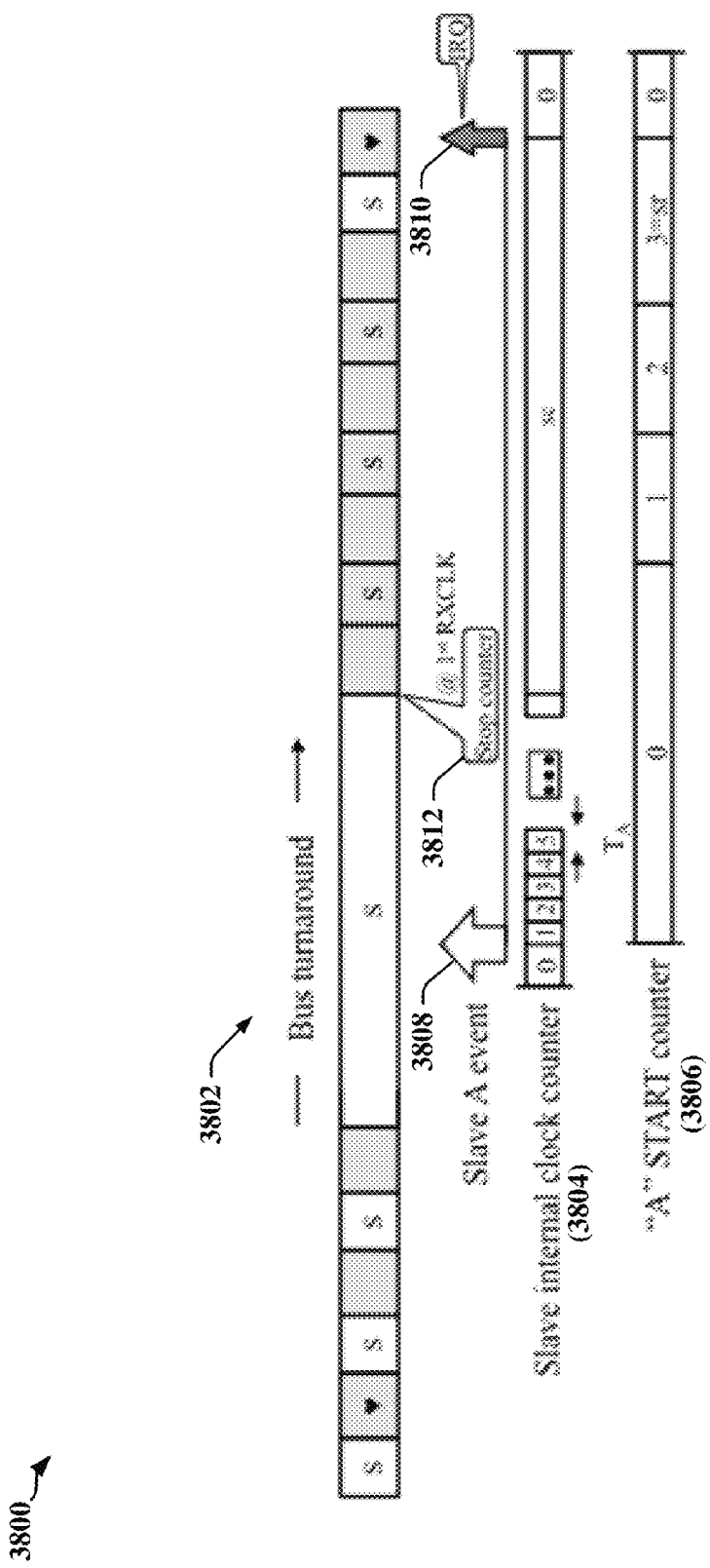
FIGS. 38 and 39 illustrate another example of a system that provides improved accuracy time stamps for in-band IRQs in accordance with certain aspects disclosed herein.
Figure 39:
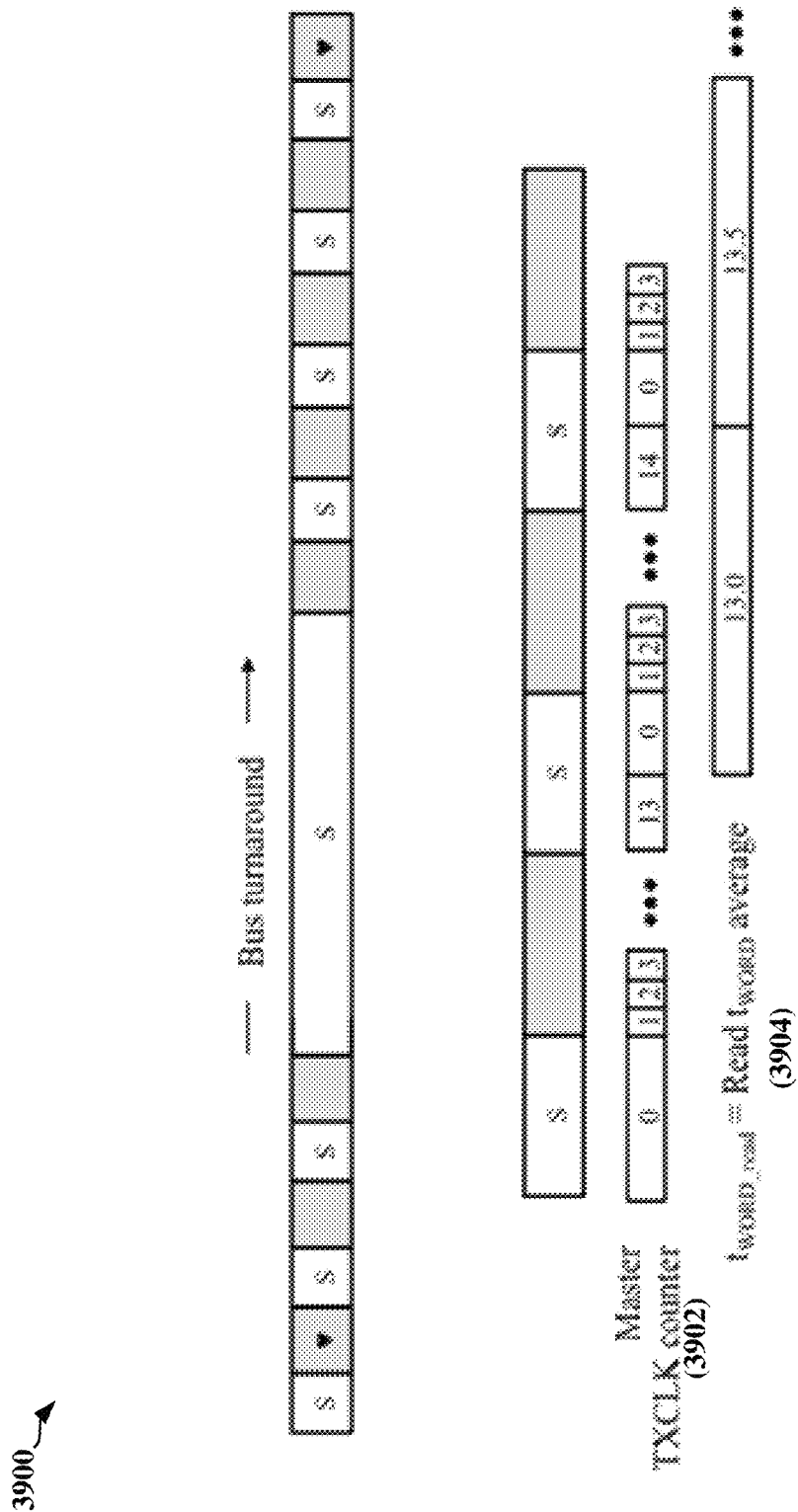

FIGS. 38 and 39 illustrate a thirteenth example in which a system provides improved accuracy time stamps for IBIs in accordance with certain aspects disclosed herein. This example may accommodate certain timing issues associated with bus turnaround in a CCIe interface. In CCIe interfaces that employ stretching for 12-symbol or 20-symbol modes, $t_{SYM}$ stretch may be required by transmitters. In these interfaces, all read must typically be executed as "global clock read" if accurate in-band interrupt time stamps are to be obtained.

In 12-symbol or 20-symbol CCIe interface modes where $t_{SYM}$ stretch is not required, symbol timing is generated by a slave device during read. Although each device is expected to keep $t_{SYM}$ around a typical 45 ns, the $t_{SYM}$ generated for bus read is considered different from the $t_{SYM}$ for a bus write. Differences between read and write symbol timing when a large number of words are read can result in relatively high accumulated time-stamp error. Furthermore, the time required to perform a bus turn around may in the 1 ms range, depending on device architecture. In such instances, enforcing use of global clock read may not be ideal since faster transfer rate is expected in 12sym & 12sym+ than in 12sym–/20sym modes.

FIG. 38 is a timing diagram 3800 that illustrates the use of a free-running internal slave counter 3804 to account for bus turnaround intervals 3802. As illustrated, the slave device may include a start condition counter 3806. The free-running internal slave counter 3804 may operate during the bus turnaround interval 3802 and cease counting upon completion 3812 of the turnaround. The free-running internal slave counter 3804 may be used to time the period of time between an event 3808 detected by the slave device and the normalization of start condition timing. The bus master 704 may calculate the time stamp using the content of the start condition counter 3806 and the free-running internal slave counter 3804.

FIG. 39 is a timing diagram 3900 that illustrates the use of calibration information to account for differences in read and write symbol timing. The bus master 704 may employ an internal counter 3902 to calibrate the word time during bus read ($t_{WORD\_read}$) by counting cycles of the internal counter 3902 during word read operations. In one example, the bus master 704 may be calculated as:

$$t_{event} = t_{IRQ} - (sc + 0.5) \times T_A - \left(\frac{sr}{2} - 1\right) \times t_{WORD\_read}.$$

Example of a Processing Circuit

Figure 40:
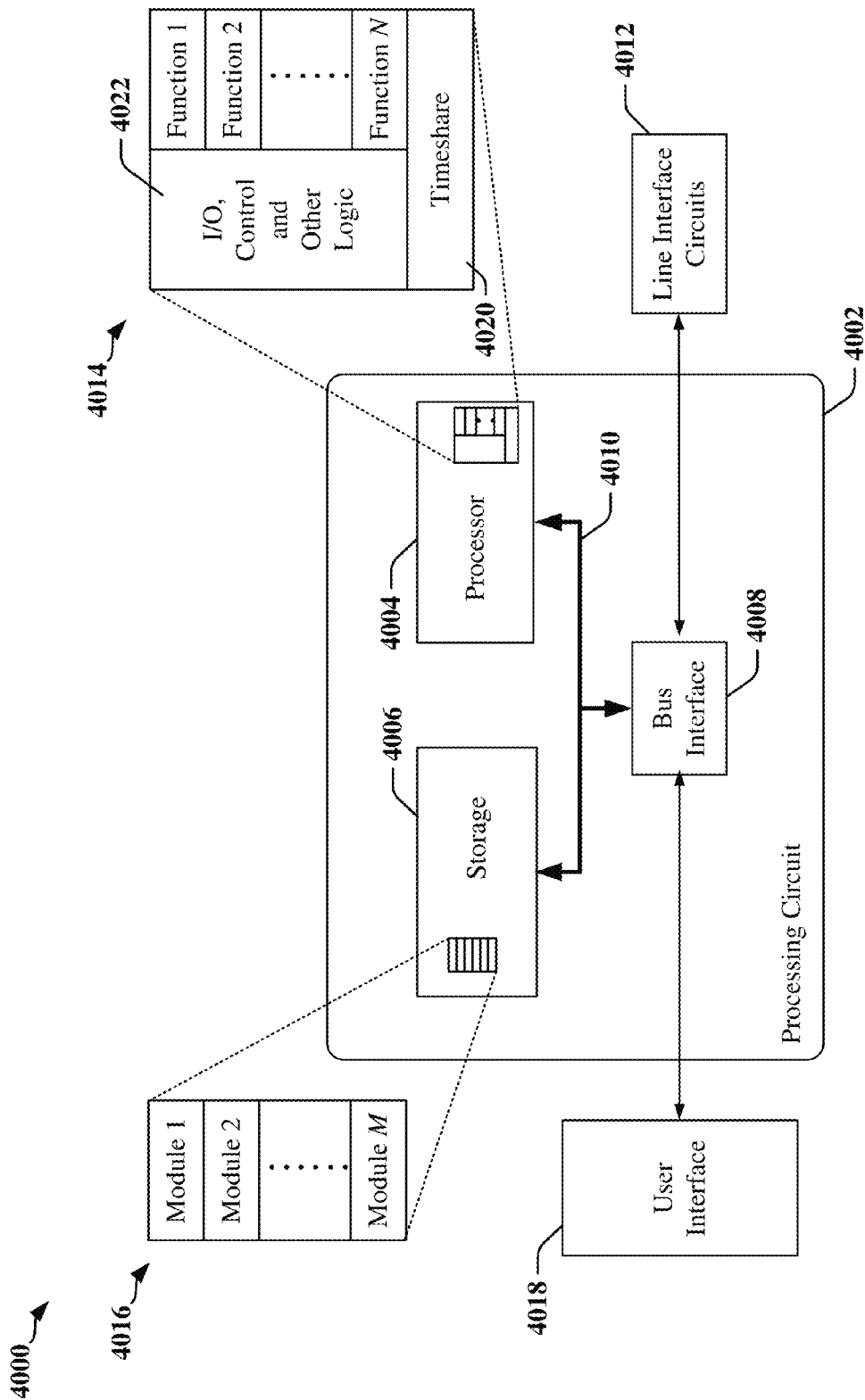
FIG. 40 is a block diagram illustrating an example of an apparatus employing a processing circuit that may be adapted according to certain aspects disclosed herein.

FIG. 40 is a conceptual diagram 4000 illustrating a simplified example of a hardware implementation for an apparatus employing a processing circuit 4002 that may be configured to perform one or more functions disclosed herein. In accordance with various aspects of the disclosure, an element, or any portion of an element, or any combination of elements as disclosed herein may be implemented using the processing circuit 4002. The processing circuit 4002 may include one or more processors 4004 that are controlled by some combination of hardware and software modules. Examples of processors 4004 include microprocessors, microcontrollers, digital signal processors (DSPs), ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 4004 may include specialized processors that perform specific functions, and that may be configured, augmented or controlled by one of the software modules 4016. The one or more processors 4004 may be configured through a combination of software modules 4016 loaded during initialization, and further configured by loading or unloading one or more software modules 4016 during operation.

In the illustrated example, the processing circuit 4002 may be implemented with a bus architecture, represented generally by the bus 4010. The bus 4010 may include any number of interconnecting buses and bridges depending on the specific application of the processing circuit 4002 and the overall design constraints. The bus 4010 links together various circuits including the one or more processors 4004, and storage 4006. Storage 4006 may include memory devices and mass storage devices, and may be referred to herein as computer-readable media and/or processor-readable media. The bus 4010 may also link various other circuits such as timing sources, timers, peripherals, voltage regulators, and power management circuits. A bus interface 4008 may provide an interface between the bus 4010 and one or more transceivers 4012. A transceiver 4012 may be provided for each networking technology supported by the processing circuit. In some instances, multiple networking technologies may share some or all of the circuitry or processing modules found in a transceiver 4012. Each transceiver 4012 provides a means for communicating with various other apparatus over a transmission medium. Depending upon the nature of the apparatus, a user interface 4018 (e.g., keypad, display, speaker, microphone, joystick) may also be provided, and may be communicatively coupled to the bus 4010 directly or through the bus interface 4008.

A processor 4004 may be responsible for managing the bus 4010 and for general processing that may include the execution of software stored in a computer-readable medium that may include the storage 4006. In this respect, the processing circuit 4002, including the processor 4004, may be used to implement any of the methods, functions and techniques disclosed herein. The storage 4006 may be used for storing data that is manipulated by the processor 4004 when executing software, and the software may be configured to implement any one of the methods disclosed herein.

One or more processors 4004 in the processing circuit 4002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 4006 or in an external computer readable medium. The external computer-readable medium and/or storage 4006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 4006 may also include, by way of example, a carrier wave, a transmission line, and any other suitable medium for transmitting software and/or instructions that may be accessed and read by a computer. Computer-readable medium and/or the storage 4006 may reside in the processing circuit 4002, in the processor 4004, external to the processing circuit 4002, or be distributed across multiple entities including the processing circuit 4002. The computer-readable medium and/or storage 4006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 4006 may maintain software maintained and/or organized in loadable code segments, modules, applications, programs, etc., which may be referred to herein as software modules 4016. Each of the software modules 4016 may include instructions and data that, when installed or loaded on the processing circuit 4002 and executed by the one or more processors 4004, contribute to a run-time image 4014 that controls the operation of the one or more processors 4004. When executed, certain instructions may cause the processing circuit 4002 to perform functions in accordance with certain methods, algorithms and processes described herein.

Some of the software modules 4016 may be loaded during initialization of the processing circuit 4002, and these software modules 4016 may configure the processing circuit 4002 to enable performance of the various functions disclosed herein. For example, some software modules 4016 may configure internal devices and/or logic circuits 4022 of the processor 4004, and may manage access to external devices such as the transceiver 4012, the bus interface 4008, the user interface 4018, timers, mathematical coprocessors, and so on. The software modules 4016 may include a control program and/or an operating system that interacts with interrupt handlers and device drivers, and that controls access to various resources provided by the processing circuit 4002. The resources may include memory, processing time, access to the transceiver 4012, the user interface 4018, and so on.

One or more processors 4004 of the processing circuit 4002 may be multifunctional, whereby some of the software modules 4016 are loaded and configured to perform different functions or different instances of the same function. The one or more processors 4004 may additionally be adapted to manage background tasks initiated in response to inputs from the user interface 4018, the transceiver 4012, and device drivers, for example. To support the performance of multiple functions, the one or more processors 4004 may be configured to provide a multitasking environment, whereby each of a plurality of functions is implemented as a set of tasks serviced by the one or more processors 4004 as needed or desired. In one example, the multitasking environment may be implemented using a timesharing program 4020 that passes control of a processor 4004 between different tasks, whereby each task returns control of the one or more processors 4004 to the timesharing program 4020 upon completion of any outstanding operations and/or in response to an input such as an interrupt. When a task has control of the one or more processors 4004, the processing circuit is effectively specialized for the purposes addressed by the function associated with the controlling task. The timesharing program 4020 may include an operating system, a main loop that transfers control on a round-robin basis, a function that allocates control of the one or more processors 4004 in accordance with a prioritization of the functions, and/or an interrupt driven main loop that responds to external events by providing control of the one or more processors 4004 to a handling function.

Additional Examples of Time Stamping for In-Band IRQ

Figure 41:
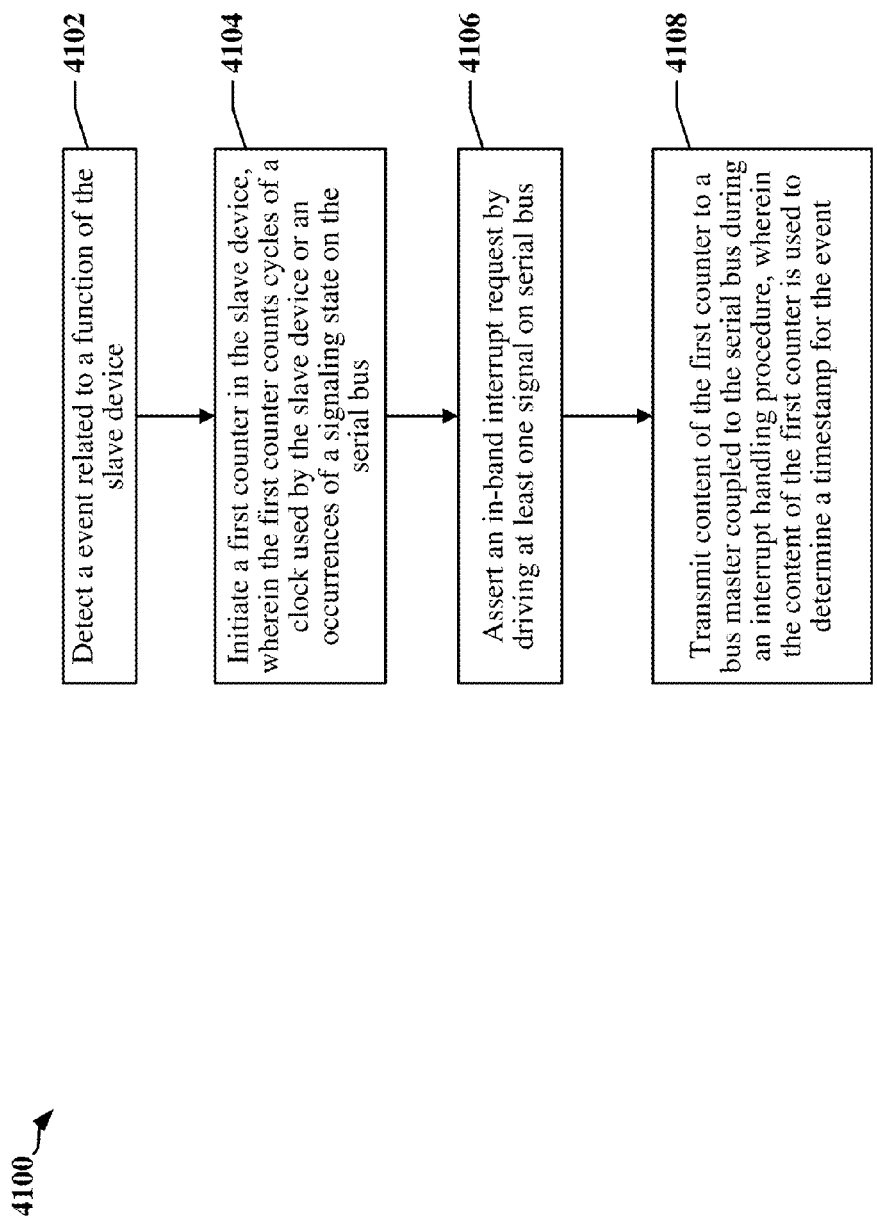
FIG. 41 is a flowchart of a method operable at a slave device for providing an in-band interrupt time stamp in accordance with certain aspects disclosed herein.

FIG. 41 conceptually illustrates a method 4100 used to operate a serial bus when slave devices coupled to the bus are configured to assert IBIs.

At block 4102, a slave device may detect an event related to a function of the slave device.

At block 4104, the slave device may initiate a first counter. The first counter may be configured to count cycles of a clock used by the slave device. The first counter may be configured to count occurrences of a signaling state or condition on the serial bus. The first counter may count cycles of a clock signal provided by a device other than the bus master. The first counter may count cycles of an internal clock of the slave device. The first counter may count cycles of a free-running clock signal. The first counter may count cycles of a receive clock generated by the slave device from transitions between symbols transmitted on the serial bus. The first counter may count start conditions transmitted on the serial bus. The first counter may count cycles on the SCL of the serial bus.

At block 4106, the slave device may assert an in-band interrupt request by driving at least one signal on the serial bus. The slave device may assert the in-band interrupt request after winning an interrupt arbitration process, wherein at least one other in-band interrupt request is asserted concurrently with the in-band interrupt request At block 4108, the slave device may transmit content of the first counter to a bus master coupled to the serial bus during an interrupt handling procedure. The content of the first counter may be used to determine a time stamp for the event.

In one example, the slave device may be configured to continually or continuously use the first counter to determine the duration of one or more signaling states or conditions on the serial bus by counting the number of cycles of the internal free-running clock. The slave device may provide measured durations of one or more signaling states or conditions to the bus master 704. In some instances, the slave device may determine and/or provide measurements of the duration of one or more one or more signaling states or conditions in response to a command from the bus master 704. The command may be a calibration command or one of a plurality of commands that implement a calibration process. In one example, a command may cause the slave device to start the first counter upon detecting a first signaling state or condition on the serial bus. A command may cause the slave device to stop the first counter upon detecting a second, subsequent signaling state or condition on the serial bus. The slave device may report the content of the first counter to the bus master after stopping the first counter. A command may cause the slave device to capture and report the content of the first counter to the bus master. The content of the first counter may be used to calibrate a clock used by the slave device, which may be an internal or external clock and which may be a free-running clock or any clock that is asynchronous with respect to the clock used by the master device. The values corresponding to the content of the first counter provided in response to a plurality of commands may be averaged to obtain an estimate of period of an internal clock of the slave device, where the internal clock may be a free-running clock or any clock that is asynchronous with respect to the clock used by the master device.

The first counter may count cycles of clock signal between symbols transmitted on the serial bus. The clock signal may, for example, be an internal free-running clock signal, a clock signal provided by a device other than the master device, or a clock signal provided by some other source. The first counter may count cycles of the clock signal between start conditions transmitted on the serial bus. The first counter may count cycles of the clock signal between transitions on the SCL of the serial bus. The first counter may count words, or cycles of the clock signal between words transmitted on the serial bus. The first counter may count symbols, or cycles of the clock signal between symbols transmitted on the serial bus. The first counter may be adapted to count cycles on a clock signal transmitted on the serial bus, where the cycles may commence and terminate on a rising edge of the clock signal, commence and terminate on a falling edge of the clock signal, or commence and terminate on either a rising edge or falling edge of the clock signal.

In another example, the slave device may stop the first counter when the in-band interrupt request is asserted.

In another example, the slave device may initiate a second counter in the slave device. The first counter may count cycles of a receive clock generated by the slave device from transitions between symbols transmitted on the serial bus, and the second counter may count a signaling state or condition on the serial bus. The second counter may count start conditions transmitted on the serial bus. The second counter may count symbols transmitted on the serial bus.

In some instances, the first counter may be configured to count pulses on a clock signal transmitted over the serial bus when the serial bus is operated in a first mode of communication, and the second counter may be adapted to count pulses on a clock generated from transitions between symbols transmitted on the serial bus when the serial bus is operated in a second mode of communication. For example, the first mode of communication may be an I2C mode of communication, and the second mode of communication may be a CCIe mode of communication.

Figure 42:
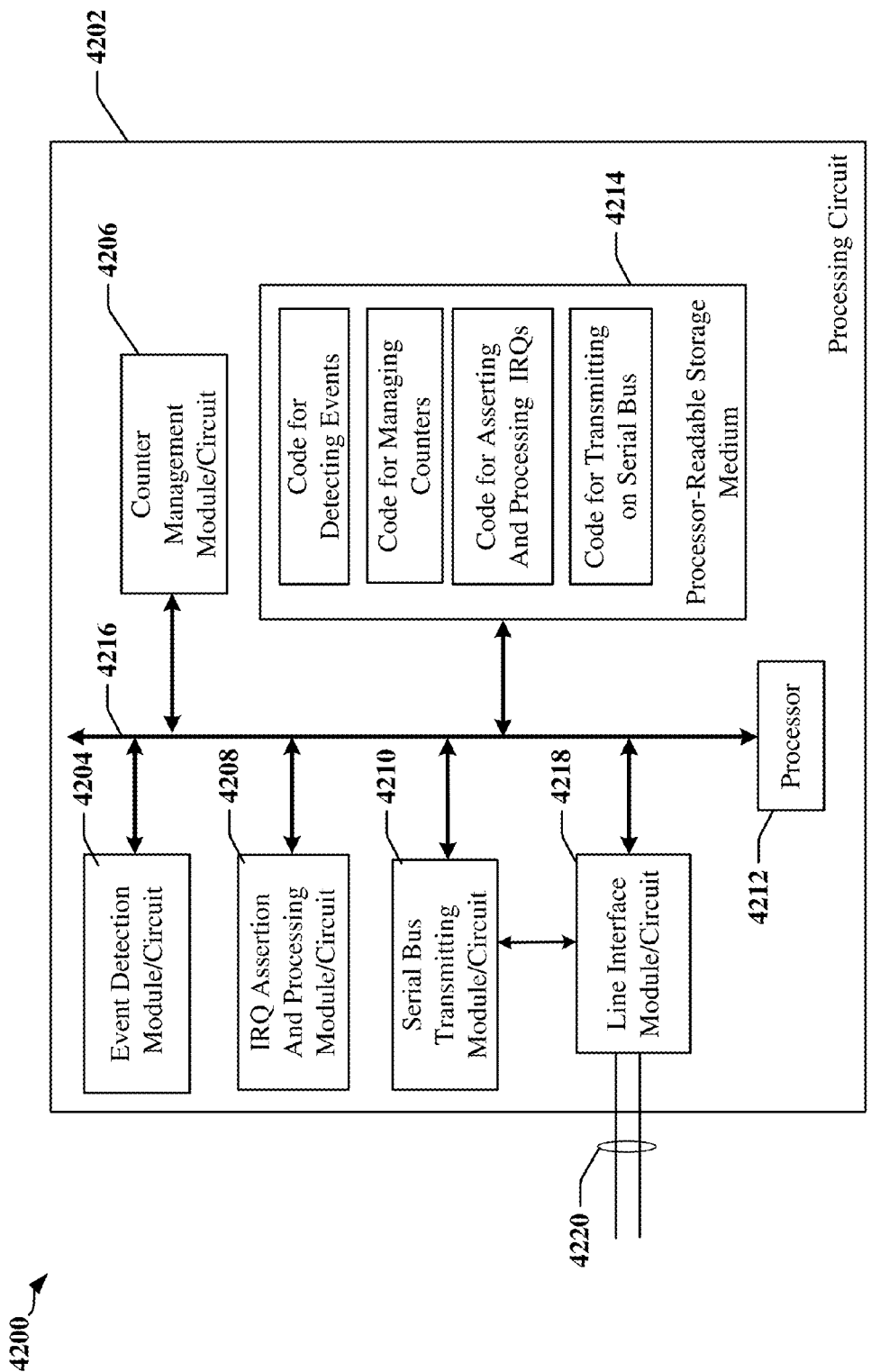
FIG. 42 illustrates an example of a slave hardware implementation that provides in-band interrupt time stamps in accordance with certain aspects disclosed herein.

FIG. 42 is a conceptual diagram illustrating an example of a hardware implementation for an apparatus 4200 employing a processing circuit 4202. In this example, the processing circuit 4202 may be implemented with a bus architecture, represented generally by the bus 4216. The bus 4216 may include any number of interconnecting buses and bridges depending on the specific application of the processing circuit 4202 and the overall design constraints. The bus 4216 links together various circuits including one or more processors, represented generally by the processor 4212, line interface circuits 4218 configurable to communicate over connectors or wires of a serial bus 4220, and computer-readable media, represented generally by the processor-readable storage medium 4214. The bus 4216 may also link various other circuits such as timing sources, timers, peripherals, voltage regulators, and power management circuits. Depending upon the nature of the apparatus, a user interface 4222 (e.g., keypad, display, speaker, microphone, joystick) may also be provided. One or more clock generation circuits or modules may be provided within the processing circuit 4202 or controlled by processing circuit 4202 and/or one or more processors 4212.

The processor 4212 is responsible for managing the bus 4216 and general processing, including the execution of software stored on the processor-readable storage medium 4214. The software, when executed by the processor 4212, causes the processing circuit 4202 to perform the various functions described supra for any particular apparatus. In one example, the software is provided to configure, initiate, control and/or otherwise manage various functions, circuits and modules of the processing circuit 4202. The processor-readable storage medium 4214 may be used for storing data that is manipulated by the processor 4212 when executing software, including data decoded from symbols transmitted over the connectors or wires of the serial bus 4220, including data decoded from signals received on the connectors or wires of the serial bus 4220, which may be configured as data lanes and clock lanes.

In one configuration, the processing circuit 4202 may include modules and/or circuits 4204 for detecting an event related to a function of the apparatus 4200, modules and/or circuits 4206 for initiating a first counter in the apparatus 4200, modules and/or circuits 4208 for asserting an in-band interrupt request by driving at least one signal on the serial bus, and modules and/or circuits 4210 for transmitting content of the first counter to a bus master coupled to the serial bus during an interrupt handling procedure.

Figure 43:
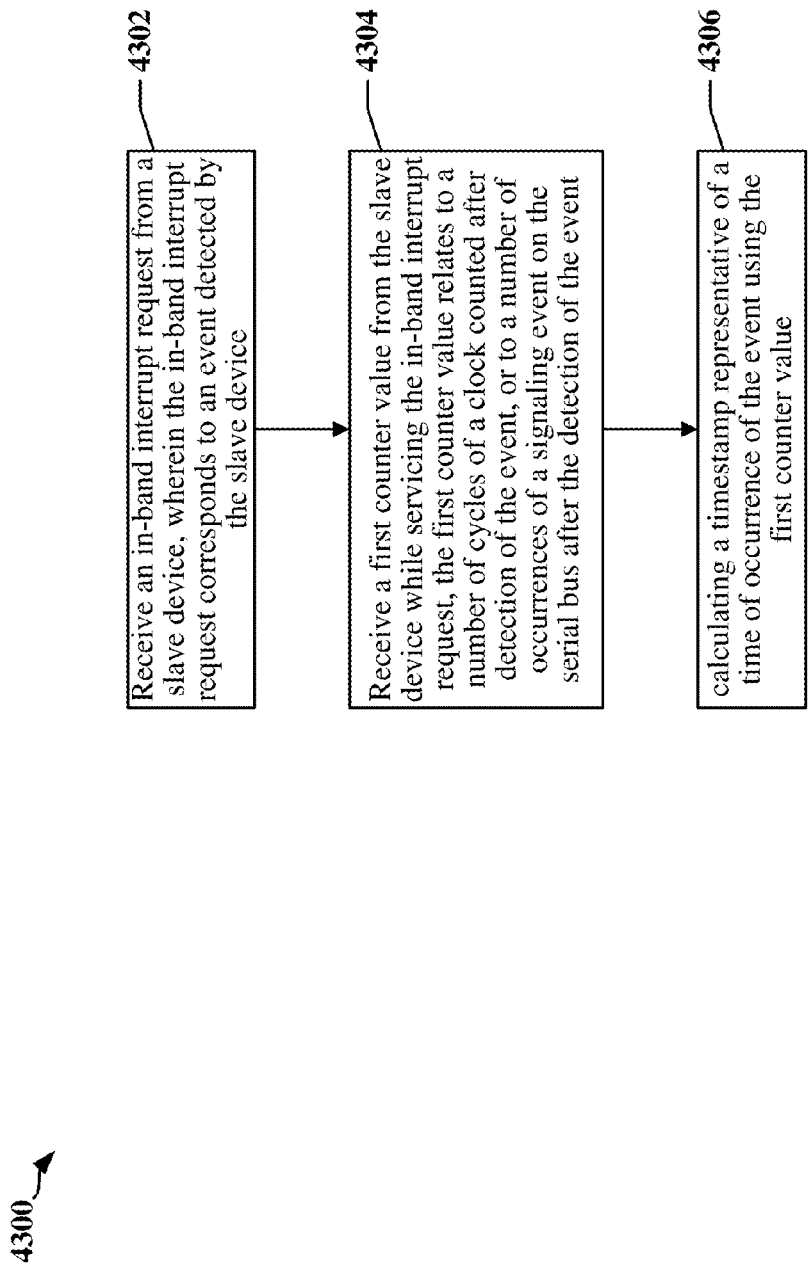
FIG. 43 is a flowchart of a method operable at a bus master for providing an in-band interrupt time stamp in accordance with certain aspects disclosed herein.

FIG. 43 conceptually illustrates a method 4300 used to operate a method performed by a master device coupled to a serial bus.

At step 4302, the master device may receive an in-band interrupt request from a slave device. The in-band interrupt request may correspond to an event detected by the slave device.

At step 4304, the master device may receive a first counter value from the slave device while servicing the in-band interrupt request. The first counter value may relate to a number of cycles of a clock counted after detection of the event. The first counter value may relate to a number of occurrences of a signaling state or condition on the serial bus after the detection of the event.

At step 4306, the master device may calculate a time stamp representative of a time of occurrence of the event using the first counter value. The time stamp may be calculated by applying an offset based on the first counter value to a time of assertion of the in-band interrupt request.

In one example, the first counter value may represent a number of cycles of an internal free-running clock of the slave device. In another example, the first counter value may represent a number of symbols transmitted on the serial bus after the detection of the event. In another example, the first counter value may represent a number of cycles or toggles of the SCL of the serial bus observed after detection of the event. In another example, the first counter value may represent a number of start conditions observed on the serial bus after detection of the event. In another example, the first counter value may represent a number of cycles of a receive clock generated by the slave device from transitions between symbols transmitted on the serial bus. A cycle time of a serial bus clock transmitted on the SCL may be adjusted by the bus master to obtain a consistent period of the serial bus clock.

In some instances, the method includes receiving a second counter value from the slave device while servicing the in-band interrupt request, determining a time of assertion of the in-band interrupt request, and calculating the time stamp using the time of assertion of the in-band interrupt and an offset based on the first counter value and the second counter value. The first counter value may represent a number of cycles of a receive clock generated by the slave device from transitions between symbols transmitted on the serial bus. The second counter value may represent a number of symbols transmitted on the serial bus after the detection of the event.

In some instances, the method includes stretching transmission of one or more symbols transmitted on the serial bus, recording a number of transmit clock cycles used to stretch transmission of each symbol of one or more symbols, and calculating the time stamp using the time of assertion of the in-band interrupt and an offset based on the first counter value and a number of transmit clock cycles used to stretch transmission of the one or more symbols. Calculating the time stamp may include averaging the number of transmit clock cycles used to stretch transmission of the one or more symbols to obtain an average symbol transmission time. Calculating the time stamp may include calculating a number of additional transmit clock cycles used after detection of the event and before receipt of the in-band interrupt request.

In some instances, start times for a plurality of symbols transmitted on the serial bus may be recorded. The start times may be determined using a real-time clock circuit. The time stamp may be calculated using a start time identified by the first counter value. A second counter value may be from the slave device while servicing the in-band interrupt request. The second counter value may be used as an offset when calculating the time stamp. In one example, the offset may correspond to a time between the occurrence of the event and the assertion of the in-band interrupt request.

In some instances, the master device may use an internal clock or a clock accessible to the master device to measure a duration of a transmission period on the serial bus that is stretched by the slave device. The master device may adjust the time stamp using the duration of the transmission period measured by the internal clock or other clock.

Figure 44:
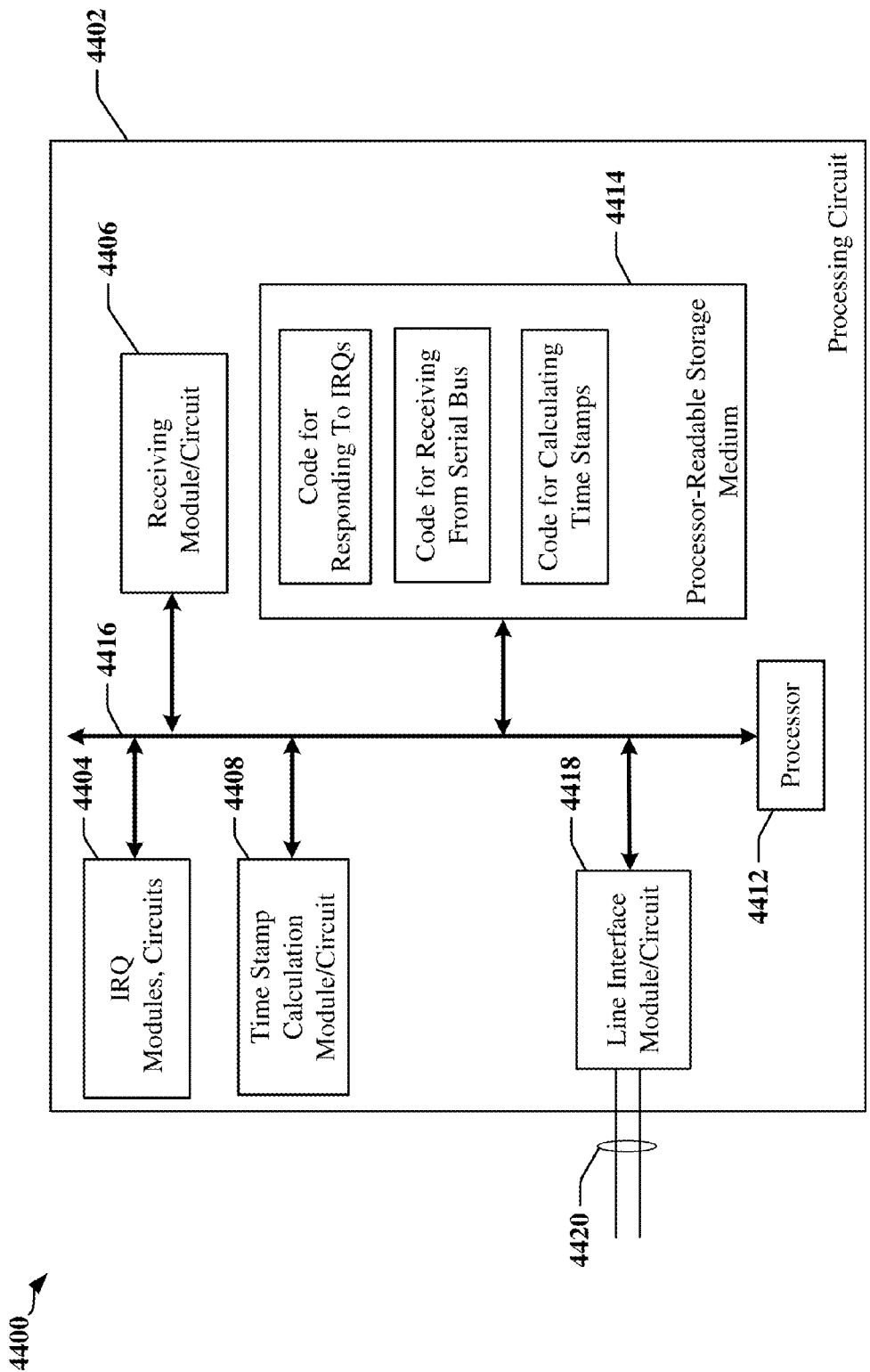
FIG. 44 illustrates an example of a hardware implementation of a bus master that receives and processes in-band interrupt time stamps in accordance with certain aspects disclosed herein.

FIG. 44 is a conceptual diagram illustrating an example of a hardware implementation for an apparatus 4400 employing a processing circuit 4402. In this example, the processing circuit 4402 may be implemented with a bus architecture, represented generally by the bus 4416. The bus 4416 may include any number of interconnecting buses and bridges depending on the specific application of the processing circuit 4402 and the overall design constraints. The bus 4416 links together various circuits including one or more processors, represented generally by the processor 4412, line interface circuits 4418 configurable to communicate over connectors or wires of a serial bus 4420, and computer-readable media, represented generally by the processor-readable storage medium 4414. The bus 4416 may also link various other circuits such as timing sources, timers, peripherals, voltage regulators, and power management circuits. Depending upon the nature of the apparatus, a user interface 4422 (e.g., keypad, display, speaker, microphone, joystick) may also be provided. One or more clock generation circuits or modules may be provided within the processing circuit 4402 or controlled by processing circuit 4402 and/or one or more processors 4412.

The processor 4412 is responsible for managing the bus 4416 and general processing, including the execution of software stored on the processor-readable storage medium 4414. The software, when executed by the processor 4412, causes the processing circuit 4402 to perform the various functions described supra for any particular apparatus. In one example, the software is provided to configure, initiate, control and/or otherwise manage various functions, circuits and modules of the processing circuit 4402. The processor-readable storage medium 4414 may be used for storing data that is manipulated by the processor 4412 when executing software, including data decoded from symbols transmitted over the connectors or wires of the serial bus 4420, including data decoded from signals received on the connectors or wires of the serial bus 4420, which may be configured as data lanes and clock lanes.

In one configuration, the processing circuit 4402 may include modules and/or circuits 4404 for receiving an in-band interrupt request from a slave device, wherein the in-band interrupt request corresponds to an event detected by the slave device, modules and/or circuits 4406 for receiving a first counter value from the slave device while servicing the in-band interrupt request, and modules and/or circuits 4406 for calculating a time stamp representative of a time of occurrence of the event using the first counter value.

Figure 45:
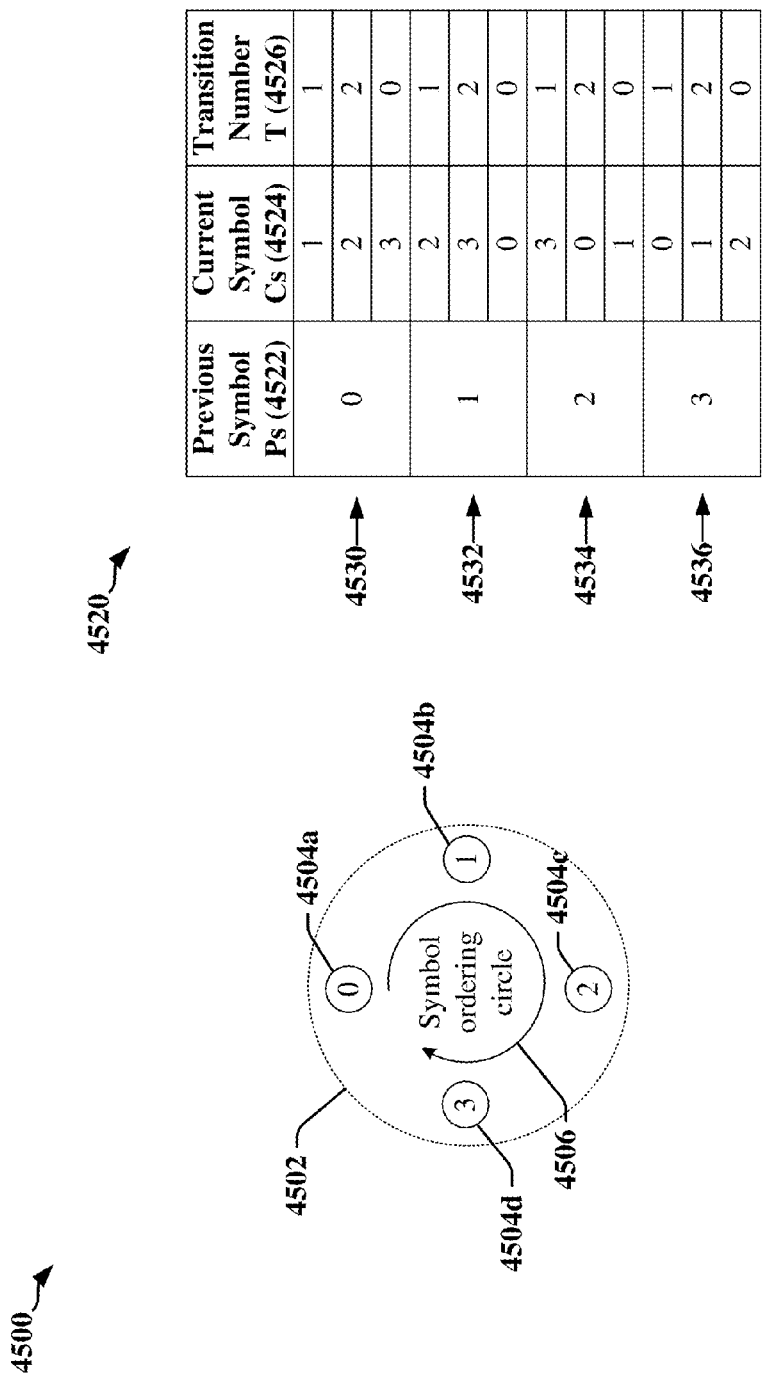
FIG. 45 illustrates an example of an encoding scheme used in a CCIe interface.

FIGS. 45-48 are diagrams that illustrate the generation of heartbeat signaling on a CCIe bus. FIG. 45 illustrates an example of an encoding scheme 4500 that may be used in a CCIe interface. In this example, the encoding scheme 4500 may be used by an encoder configured to produce a sequence of symbols for transmission on a two-wire CCIe interface. The encoding scheme 4500 is also used by a decoder to extract data from symbols received from signals transmitted on the signal wires of the interface. In the illustrated encoding scheme 4500, the use of two signal wires permits definition of 4 basic symbols S: {0, 1, 2, 3}. Any two consecutive symbols in the sequence of symbols have different states, and the symbol sequences 0,0, 1,1, 2,2 and 3,3 are invalid combinations of consecutive symbols. Accordingly, only 3 valid symbol transitions are available at each symbol boundary, where the symbol boundary is determined by the transmit clock and represents the point at which a first symbol (Ps) terminates and a second symbol (Cs) begins. The first symbol may be referred to as the preceding or previous symbol 4522 terminates and the second symbol may be referred to as the current symbol 4524.

The three available transitions are assigned a transition number (T) 4526 for each previous symbol 4522. The value of the transition number 4526 can be represented by a ternary number. In one example, the value of the transition number 4526 is determined by assigning a symbol-ordering circle 4502 for the encoding scheme. The symbol-ordering circle 4502 allocates locations 4504a-4504d on the symbol-ordering circle 4502 for the four possible symbols, and a direction of rotation 4506 between the locations 4504a-4504d. In the depicted example, the direction of rotation 4506 is clockwise. The transition number 4526 may represent the separation between the valid current symbols 4524 and the immediately preceding previous symbol 4522. Separation may be defined as the number of steps along the direction of rotation 4506 on the symbol-ordering circle 4502 required to reach the current symbol 4524 from the previous symbol 4522. The number of steps can be expressed as a single digit base-3 number. It will be appreciated that a three-step difference between symbols can be represented as $0_{base-3}$. The table 4520 in FIG. 45 summarizes this approach.

At the transmitter, the table 4520 may be used to lookup a current symbol 4524 to be transmitted, given knowledge of the previous symbol 4522 and an input ternary number, which is used as a transition number 4526. At the receiver, the table 4520 may be used as a lookup to determine a transition number 4526 that represents the transition between the previous symbol 4522 and the current symbol 4524. The transition number 4526 may be output as a ternary number.

Figure 46:
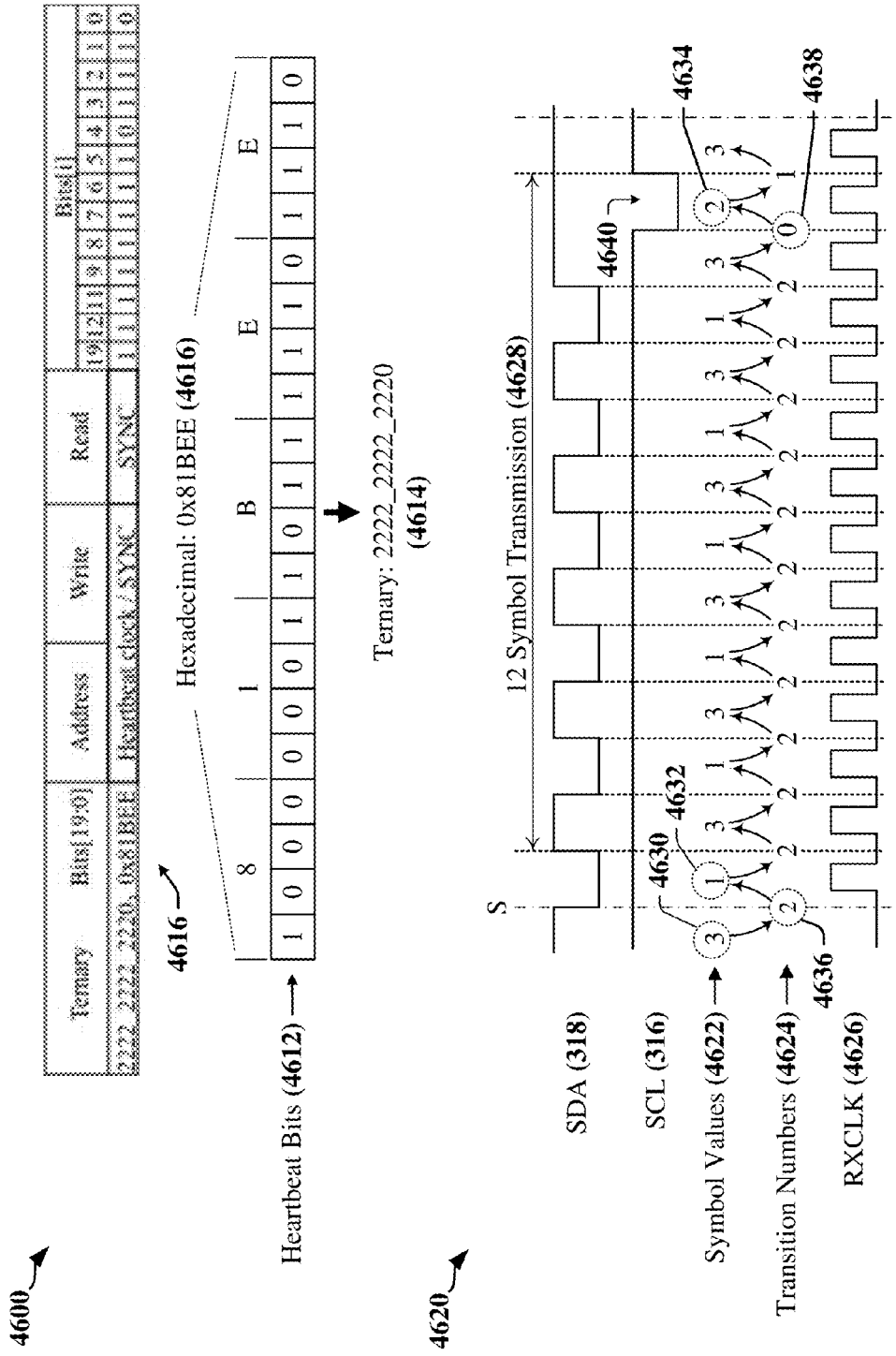
FIG. 46 illustrates a first example of a control word that may be transmitted such that CCIe devices can receive a heartbeat clock.

FIG. 46 illustrates an example 4600 of a control word 4616 that may be transmitted in compliance with CCIe protocols, and in a manner that enables the CCIe devices to receive a heartbeat clock. In one example, the control word 4616 may be expressed as the hexadecimal number 0x81BEE, which produces a bit pattern 4612 that is mapped to a transition number that may be expressed as a 12-digit ternary number 4614. The transition number that may be encapsulated with start condition values to produce a set of 14 transition numbers 4624 calculated to produce a 12-symbol sequence 4628 that is provided in a sequence of symbols 4622. As illustrated in the timing diagram 4620, every other symbol 4630 of the 12-symbol sequence 4628 has a value of '3' which results in a high voltage level on both the SDA 318 and the SCL 316. In the example, minimal currents may flow in the SDA 318 and the SCL 316 when both the SDA 318 and the SCL 316 are in the high state. A symbol value of '3' may minimize power consumption associated with the serial bus 330. The 12-symbol sequence of symbols 4622 also includes symbols 4632, 4634 that have the value '1' or '2,' which cause either the SDA 318 or the SCL 316 to be driven low, while the other of the SDA 318 or the SCL 316 remains high. In each 12-symbol sequence 4628, one symbol 4634 may be provided with a value of '2.' while the remaining symbols 4632 have a value of '1.' As a result, the heartbeat control word 4616 produces 6 pulses on the SDA 318 and one pulse on the SCL 316 each time the control word 4616 is transmitted. In one example, a 1.43 MHz clock may be provided on the SCL 316 by repetitively transmitting the heartbeat control word 4616.

Figure 47:
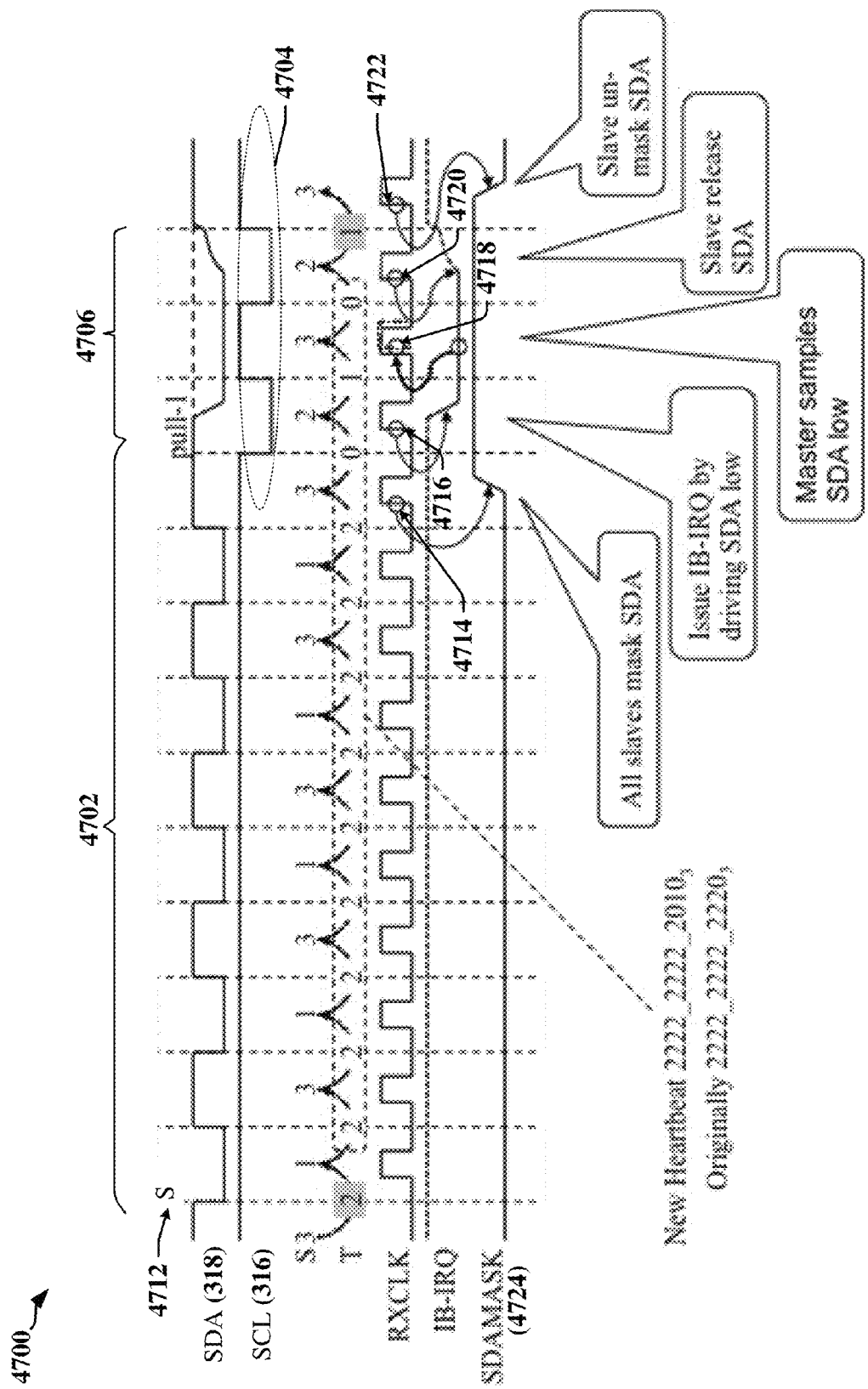
FIG. 47 illustrates a first example of a control word that may be transmitted such that CCIe devices can receive a heartbeat clock.

FIG. 47 illustrates another example of a heartbeat clock that may be transmitted over the SDA 318 and SCL 316. In this example, the heartbeat clock includes a first portion 4702 of the heartbeat clock is transmitted on the SDA 318, while a second portion 4706 of the heartbeat clock may be transmitted on the SCL 316. During the second portion 4706 of the heartbeat clock, the SDA 318 is in a high state, while a pair of pulses 4704 is provided on the SCL 316. In the example of FIG. 46, a single pulse 4640 is provided on the SCL 316. The transmission of a pair of pulses 4704 on the SCL 316 provides an increased period of time in which the in-band IRQ may be asserted using the SDA 318. According to the protocol, a receiving slave device may detect, for example, the $n^{th}$ RXCLK 4714 after the start S indicator 4712. The $n^{th}$ RXCLK 4714 may trigger an internal SDA mask 4724 within a receiving slave device to internally mask the SDA 318.

At the n+1 RXCLK 4716, the slave device may trigger an IRQ by pulling the SDA 318 low. The SDA 318 is pulled high by the master device or floats, so that when it is pulled low (by a slave device) this serves to indicate an in-band IRQ. At the n+2 RXCLK 4718, the master device may sample the SDA 318 to ascertain whether an in-band IRQ has been asserted. At the n+3 RXCLK 4720, the slave device may release the SDA 318, such that the in-band IRQ is de-asserted. Between n+3 and n+4 RXCLK 4722, the master device re-enables the SDA driver and starts driving the SDA 318 high. Accordingly, a receiving device (e.g., slave device) can safely release SDA mask 2824 at n+4 RXCLK 4722. At the n+4 RXCLK 4722, the slave device may release the SDA mask 4724. In this manner, an IRQ may be transmitted by a slave device during the IRQ period (the second portion 4706 of the heartbeat clock) defined on the SDA 318.

Figure 48:
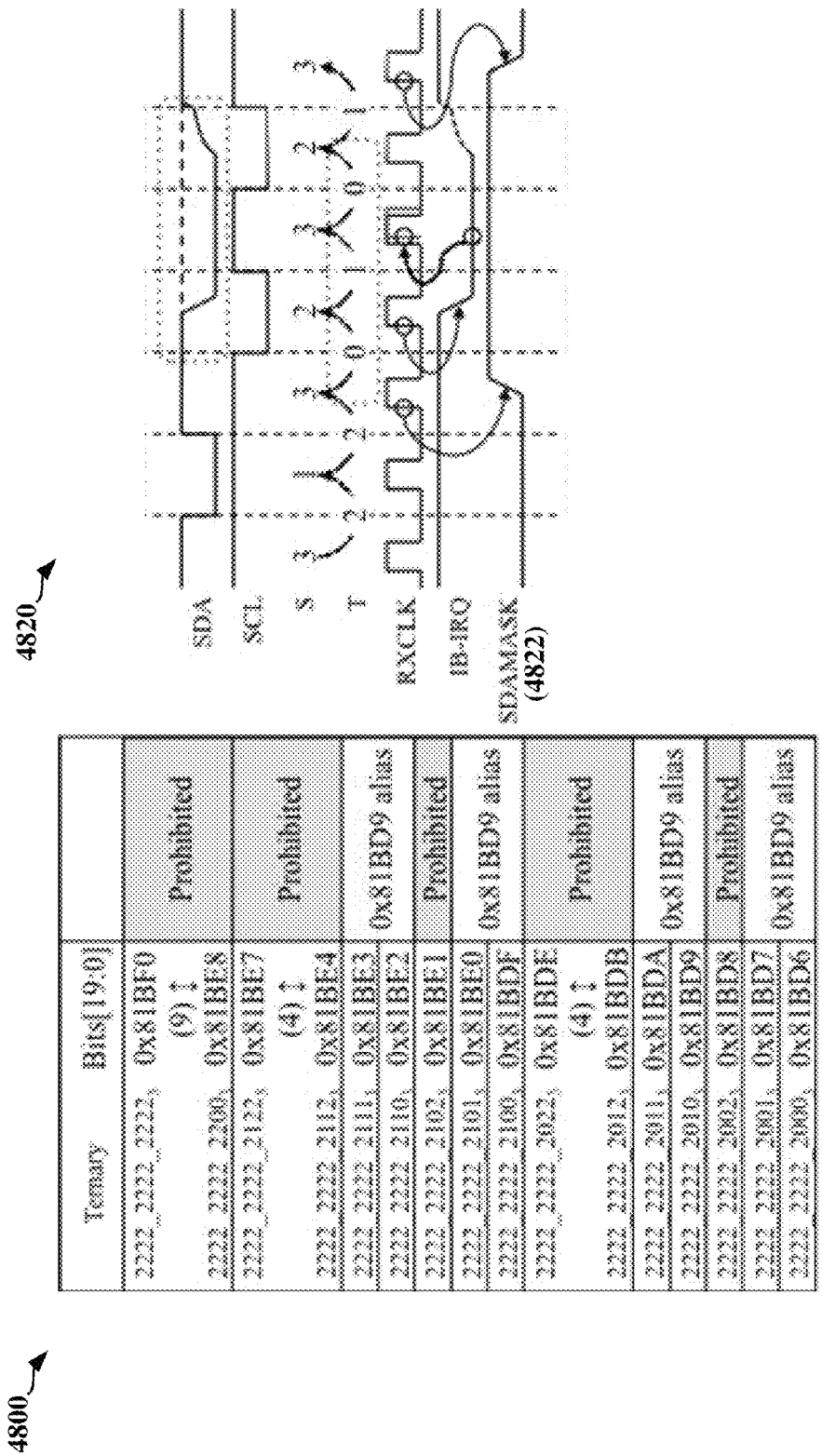
FIG. 48 illustrates certain aspects related to the use of a heartbeat clock for in-band IRQs.

FIG. 48 includes a table 4800 and timing diagram 4820 that illustrate certain aspects related to the use of a heartbeat clock for in-band IRQs. The heartbeat may be generated using values that occupy the number space 0x81BD6 through 0x81BF0 (i.e., 27 addresses) within the ternary number space. The fact that T=2 is prohibited and any other T combinations are aliased to T=010 while SDA Mask=1 means that a heartbeat word that supports in-band IRQ occupies not only one address, but it effectively occupies 27 addresses of Bit-19 region. The use of the particular heartbeat pattern prohibits use of the ternary number 2222_2222_2222, which is 81BF0 hex, and is very useful as the first word of the two-word CCIe synchronization. The ternary number 2222_2222_2222 facilitates absolute synchronization.

One or more of the components, steps, features, and/or functions illustrated in the Figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine-readable mediums for storing information. The term "machine readable medium" includes, but is not limited to portable or fixed storage devices, optical storage devices, wireless channels and various other mediums capable of storing, containing, or carrying instruction(s) and/or data.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method performed by a slave device coupled to a serial bus, comprising:
   detecting an event related to a function of the slave device;
   initiating a first counter in the slave device, wherein the first counter is adapted to count cycles of a first clock used by the slave device or occurrences of a signaling state on the serial bus;
   asserting an in-band interrupt request by driving at least one signal on the serial bus; and
   transmitting content of the first counter to a bus master coupled to the serial bus during an interrupt handling procedure, wherein the content of the first counter is used to determine a time stamp for the event.

2. The method of claim 1, further comprising:
   stopping the first counter when the in-band interrupt request is asserted.

3. The method of claim 1, wherein asserting the in-band interrupt request comprises:
   winning an interrupt arbitration process, wherein at least one other in-band interrupt request is asserted concurrently with the in-band interrupt request.

4. The method of claim 1, wherein the first clock is provided by a device other than the bus master.

5. The method of claim 4, further comprising:
   receiving a command from the bus master; and
   responsive to the command:
      starting the first counter upon detecting a first signaling state on the serial bus;
      capturing content of the first counter upon detecting a second, subsequent signaling state on the serial bus; and
      reporting the content of the first counter to the bus master,
   wherein the content of the first counter is used to calibrate the first clock.

6. The method of claim 5, wherein values corresponding to the content of the first counter provided in response to a plurality of commands may be averaged to obtain an estimate of period of the first clock.

7. The method of claim 1, wherein the first counter counts a number of cycles of the first clock between the event and a heartbeat pulse transmitted on the serial bus.

8. The method of claim 1, wherein the first counter counts a number of cycles of the first clock between the event and the assertion an in-band interrupt request.

9. The method of claim 1, wherein the first clock operates during a turnaround interval of the serial bus.

10. The method of claim 1, wherein the first counter is adapted to count cycles of a receive clock generated by the slave device from transitions between symbols transmitted on the serial bus.

11. The method of claim 1, wherein the first counter is configured to count words transmitted on the serial bus.

12. The method of claim 1, wherein the first counter is adapted to count cycles on a clock signal transmitted on the serial bus, where the cycles may commence and terminate on a rising edge of the clock signal, commence and terminate on a falling edge of the clock signal, or commence and terminate on either a rising edge or falling edge of the clock signal.

13. The method of claim 1, further comprising:
   initiating a second counter in the slave device, wherein the first counter is adapted to count cycles of a receive clock generated by the slave device from transitions between symbols transmitted on the serial bus, and wherein the second counter is adapted to count signaling states on the serial bus.

14. The method of claim 13, wherein the second counter is adapted to count words or symbols transmitted on the serial bus.

15. The method of claim 13, wherein the first counter is configured to count pulses on a clock signal transmitted over the serial bus when the serial bus is operated in a first mode of communication, and wherein the second counter is adapted to count pulses on a clock generated from transitions between symbols transmitted on the serial bus when the serial bus is operated in a second mode of communication.

16. A method performed by a master device coupled to a serial bus, comprising:
   receiving an in-band interrupt request from a slave device, wherein the in-band interrupt request corresponds to an event detected by the slave device;
   receiving a first counter value from the slave device while servicing the in-band interrupt request, wherein the first counter value relates to a number of cycles of a clock counted after detection of the event, or to a number of occurrences of a signaling state on the serial bus after the detection of the event; and calculating a time stamp representative of a time of occurrence of the event using the first counter value.

17. The method of claim 16, wherein calculating the time stamp includes:
determining a time of assertion of the in-band interrupt request; and
calculating the time stamp using the time of assertion of the in-band interrupt and an offset based on the first counter value, wherein the first counter value represents a number of cycles of an internal free-running clock of the slave device.

18. The method of claim 16, wherein calculating the time stamp includes:
determining a time of assertion of the in-band interrupt request; and
calculating the time stamp using the time of assertion of the in-band interrupt and an offset based on the first counter value, wherein the first counter value represents a number of symbols transmitted on the serial bus after the detection of the event.

19. The method of claim 16, wherein calculating the time stamp includes:
determining a time of assertion of the in-band interrupt request;
calculating the time stamp using the time of assertion of the in-band interrupt and an offset based on the first counter value, wherein the first counter value represents a number of cycles of a serial clock line (SCL) of the serial bus observed after detection of the event; and
adjusting a cycle time of a serial bus clock transmitted on the SCL to obtain a consistent period of the serial bus clock.

20. The method of claim 16, wherein calculating the time stamp includes:
determining a time of assertion of the in-band interrupt request; and
calculating the time stamp using the time of assertion of the in-band interrupt and an offset based on the first counter value, wherein the first counter value represents a number of start conditions observed on the serial bus after detection of the event.

21. The method of claim 16, wherein calculating the time stamp includes:
determining a time of assertion of the in-band interrupt request; and
calculating the time stamp using the time of assertion of the in-band interrupt and an offset based on the first counter value, wherein the first counter value represents a number of cycles of a receive clock generated by the slave device from transitions between symbols transmitted on the serial bus.

22. The method of claim 16, further comprising:
receiving a second counter value from the slave device while servicing the in-band interrupt request;
determining a time of assertion of the in-band interrupt request; and
calculating the time stamp using the time of assertion of the in-band interrupt and an offset based on the first counter value and the second counter value,
wherein the second counter value represents a number of symbols transmitted on the serial bus after the detection of the event.

23. The method of claim 16, further comprising:
stretching transmission of one or more symbols transmitted on the serial bus;
for each symbol of the one or more symbols, recording a number of transmit clock cycles used to stretch transmission of each symbol; and
calculating the time stamp using a time of assertion of the in-band interrupt and an offset based on the first counter value and a number of transmit clock cycles used to stretch transmission of the one or more symbols.

24. The method of claim 23, wherein calculating the time stamp comprises:
averaging the number of transmit clock cycles used to stretch transmission of the one or more symbols to obtain an average symbol transmission time.

25. The method of claim 23, wherein calculating the time stamp comprises:
calculating a number of additional transmit clock cycles used after detection of the event and before receipt of the in-band interrupt request.

26. The method of claim 16, further comprising:
recording start times for a plurality of symbols transmitted on the serial bus; and
calculating the time stamp using a start time identified by the first counter value.

27. The method of claim 26, further comprising:
receiving a second counter value from the slave device while servicing the in-band interrupt request;
recording start times for a plurality of symbols transmitted on the serial bus; and
calculating the time stamp using a start time identified by the first counter value and offset by the second counter value.

28. The method of claim 16, further comprising:
using an internal clock to measure a duration of a transmission period on the serial bus that is stretched by the slave device; and
adjusting the time stamp using the duration of the transmission period on the serial bus measured by the internal clock.

29. A slave device coupled to a serial bus, comprising:
means for detecting an event related to a function of the slave device;
means for initiating a first counter in the slave device, wherein the first counter is adapted to count cycles of a clock used by the slave device or occurrences of a signaling state on the serial bus;
means for asserting an in-band interrupt request by driving at least one signal on the serial bus; and
means for transmitting content of the first counter to a bus master coupled to the serial bus during an interrupt handling procedure, wherein the content of the first counter is used to determine a time stamp for the event.

30. A master device coupled to a serial bus, comprising:
means for receiving an in-band interrupt request from a slave device, wherein the in-band interrupt request corresponds to an event detected by the slave device;
means for receiving a first counter value from the slave device while servicing the in-band interrupt request, wherein the first counter value relates to a number of cycles of a clock counted after detection of the event, or to a number of occurrences of a signaling state on the serial bus after the detection of the event; and
means for calculating a time stamp representative of a time of occurrence of the event using the first counter value.

* * * * *